United States Patent [19]
Houlberg et al.

[11] Patent Number: 5,333,198
[45] Date of Patent: Jul. 26, 1994

[54] DIGITAL INTERFACE CIRCUIT

[76] Inventors: Christian L. Houlberg, 9524 Oneida St., Ventura, Calif. 93004; Jeffrey J. Pacl, 1024 E. Stroube St., Oxnard, Calif. 93030

[21] Appl. No.: 70,133

[22] Filed: May 27, 1993

Related U.S. Application Data

[63] Continuation-in-part of Ser. No. 993,777, Dec. 21, 1993.

[51] Int. Cl.$^5$ .............................................. H04L 9/00
[52] U.S. Cl. .......................................... 380/49; 380/9; 380/18; 380/52
[58] Field of Search .......................... 380/9, 18, 49, 52

[56] References Cited

U.S. PATENT DOCUMENTS

| | | | |
|---|---|---|---|
| 4,392,241 | 7/1983 | Hurst | 380/49 |
| 4,981,371 | 1/1991 | Gurak et al. | 380/49 |
| 5,166,977 | 11/1992 | Ross | 380/18 |

*Primary Examiner*—David C. Cain
*Attorney, Agent, or Firm*—John Forrest; Melvin J. Sliwka; David S. Kalmbaugh

[57] ABSTRACT

A digital interface for allowing a first device which receives and sends information serially to communicate with a second device which receives and sends information in parallel. The first device may be an encryption unit while the second device may be a relay/responder/reporter connected to a transmitter or a digital signal processing unit. The digital interface comprises an erasable programmable logic device which during an uplink data transfer performs the function of converting parallel logic signals, that is control signals and data words provided by the relay/responder/reporter, for example, to commands and data to be transmitted by a transmitter serially to the encryption unit. In a like manner, the erasable programmable memory device during a downlink data transfer converts serial commands and data received from the encryption unit by a receiver to a parallel format for transmission to the relay/responder/reporter. The protocol converter includes a dual port memory which is used for temporary storage of data during an information transfer from the encryption unit to the relay/responder/reporter. The protocol converter also includes a programmable array logic device for latching therein commands which are sent to the encryption unit and commands received from the encryption unit during a data transfer and a microcontroller which monitors the commands latched in the programmable array logic device. When the microcontroller fails to detect a send or receive command during an uplink or down link data transfer, the microcontroller will reset the protocol converter allowing for a restart of the data transfer.

10 Claims, 40 Drawing Sheets

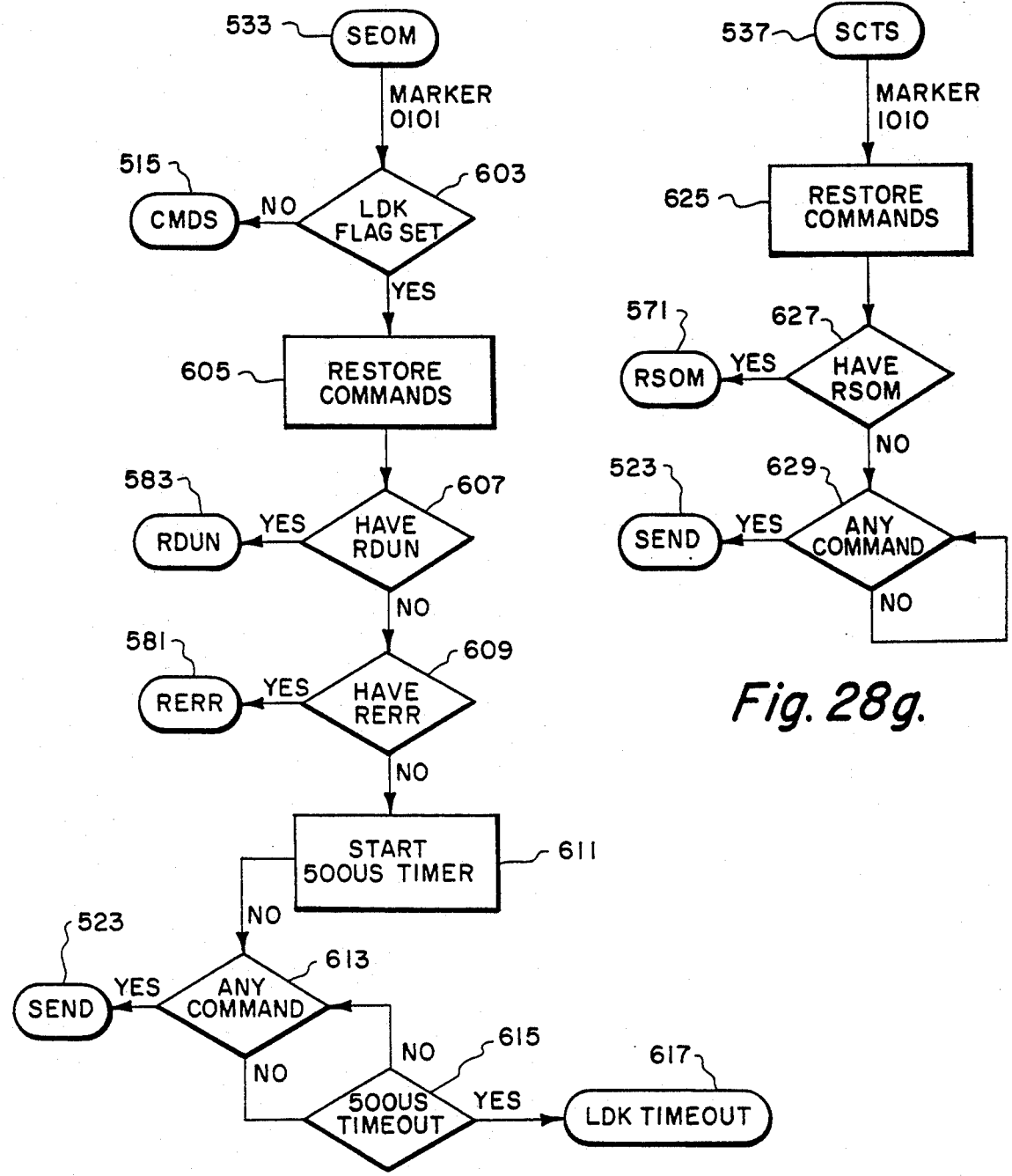
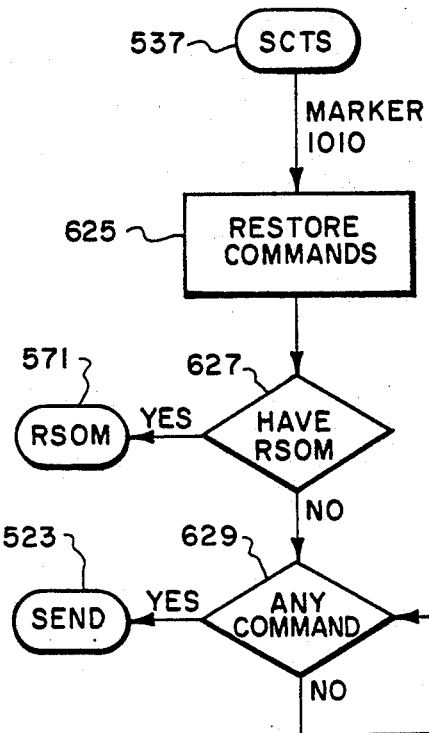
*Fig. 28g.*
*Fig. 28e.*
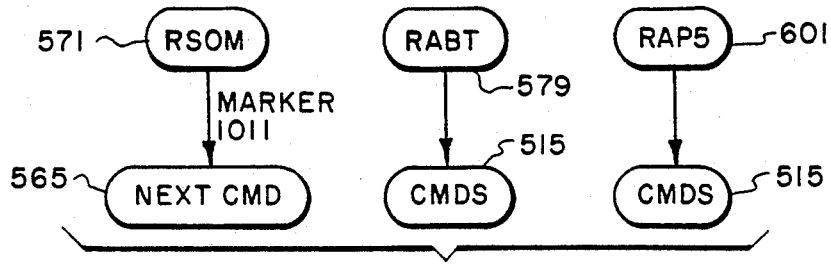
*Fig. 28i.*

DIGITAL INTERFACE CIRCUIT

This application is a continuation-in-part of application Ser. No. 07/993,777, filed Dec. 21, 1993.

BACKGROUND OF THE INVENTION

1. Field of the Invention

This invention relates generally to communications apparatus and, in particular, to a digital interface circuit between an encryption device using a serial input/output protocol and a logic device using a parallel input/output protocol.

2. Description of the Prior Art

The military currently uses a mobile sea range instrumentation system for communications and the transfer of data during the testing of weapons systems, ships, aircraft and the like. As is best illustrated in FIG. 1 the prior art mobile sea range instrumentation system comprised an antenna for transmitting and receiving data in the radio frequency range. Electrically coupled to the antenna is a relay/responder/reporter ($R^3$) which converts the data transmitted or received by the antenna to or from a digital format. The prior art mobile sea range also includes a digital processing unit which provides digital data to or receives digital data from the $R^3$.

There is, however, an undeniable limitation in the prior art system illustrated in FIG. 1 in that data transmitted between, for example, a ship and an aircraft during the testing of a weapons system may be of a sensitive nature or may even be classified. This, in turn, requires encryption of the data during transmission and decryption for processing by the digital processing unit. An encrypting device may be used to encrypt the data, however encrypting devices generally transmit data serially while the $R^3$ and digital processing unit transmit parallel bytes of data.

With the disadvantages inherent in the prior art mobile sea range of FIG. 1, that is the transmission and possible compromise of sensitive or classified information, the present invention was conceived and one of its objects is to provide a means for interfacing a first logic device which utilizes a serial input/output protocol with a second logic device which utilizes a parallel input/output protocol.

It is another object of the present invention to provide a means whereby unencrypted digital data to or from a logic device which utilizes a parallel input/output protocol may be converted to a serial input/output protocol employed by an encryption unit for encryption by an encryption unit.

It is yet another object of the present invention to provide a means whereby encrypted digital data provided to or from a logic device which utilizes a parallel input/output protocol may be converted to a serial input/output protocol for unencryption by an encryption unit.

Various other advantages and objects of the present invention will become apparent to those skilled in the art as a more detailed description of the invention is set forth below.

SUMMARY OF THE INVENTION

The subject invention overcomes the disadvantages of the prior art including those mentioned above in that it comprises a digital interface circuit/protocol converter for allowing a first device which receives and sends information serially to communicate with a second device which receives and sends information in parallel. The first device may be an encryption unit or a second protocol converter, while the second device may be a relay/responder/reporter connected to a transmitter, a digital signal processing unit or a radio frequency (RF) input/output (I/O) logic unit.

The digital interface circuit of the present invention comprises an erasable programmable logic device which during an uplink data transfer performs the function of converting parallel logic signals, that is control signals and data words provided by the relay/responder/reporter, for example, to commands and data to be transmitted by the interface circuit's transmitter serially to the encryption unit. In a like manner, the erasable programmable logic device during a downlink data transfer converts serial commands and data received from the encryption unit by the interface circuit's receiver to a parallel format for transmission to the relay/responder/reporter.

The digital interface circuit of the present invention includes a dual port memory which is used for temporary storage of data during an information transfer from the encryption unit to the relay/responder/reporter or the digital signal processor and which is required due to the slow data processing ability of the digital signal processor or relay/responder/reporter. The digital interface circuit also includes a programmable array logic device for latching therein commands which are sent to the encryption unit and commands received from the encryption unit during a data transfer and a microcontroller which monitors the commands latched in the programmable array logic device. When the microcontroller fails to detect a proper message sequence, that is the format of the message fails to conform to the encryption unit's protocol during an uplink or down link data transfer, the microcontroller will reset the interface circuit allowing for a restart of the data transfer.

DETAILED DESCRIPTION OF THE PREFERRED EMBODIMENT

Figure 1:
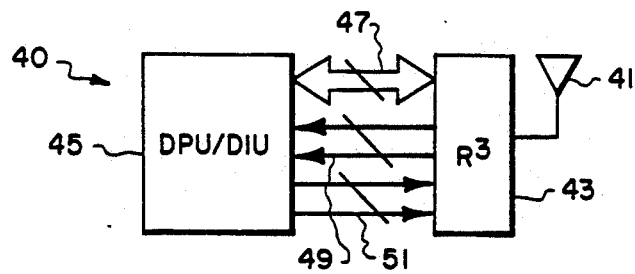
FIG. 1 is a schematic diagram showing a prior art information transfer configuration for the transfer of unencrypted data between first and second logic devices.

Referring to FIG. 1, there is shown the prior art configuration whereby the mobile sea range instrumentation system, designated generally by the reference numeral 40, communicates and transfers information during the testing of weapons systems, ships, aircraft and the like. As is best illustrated in FIG. 1 the prior art mobile sea range instrumentation system 40 comprised an antenna 41 electrically coupled to a relay/responder/reporter ($R^3$) 43 for transmitting and receiving data in the radio frequency range and converting the data transmitted or received thereby to or from a digital format, and a digital processing unit/digital interface unit 45 which provides digital data to or receives digital data from the relay/responder/reporter 43. Communications between the digital processing unit 45 and relay/responder/reporter 43 is via an eight bit parallel data bus 47, while control signals are transmitted from relay/responder/reporter 43 to digital processing unit 45 via an eight bit parallel control bus 49. In a like manner, control signals are transmitted from digital processing unit 45 to relay/responder/reporter 43 via a five bit parallel control bus 51.

Figure 2:
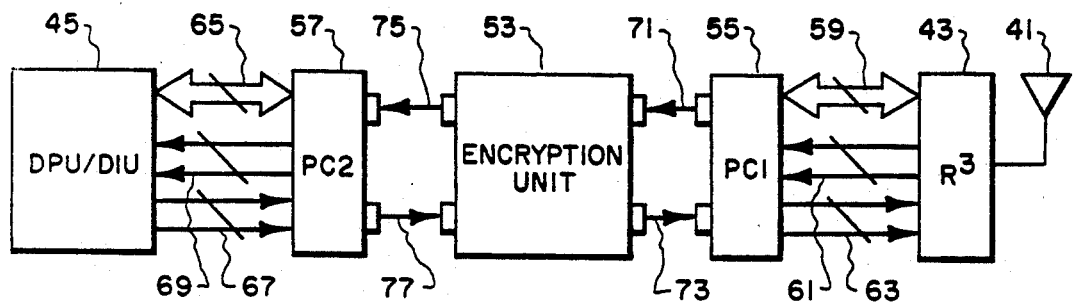
FIG. 2 is a schematic diagram showing the protocol converter of the present invention being configured to provide an interface between a serial input/output device and a parallel input/output device.

Referring to FIG. 2, mobile sea range instrumentation system 40 as presently configured comprises antenna 41, relay/responder/reporter 43 and digital processing unit 45. In addition, system 40 includes an encryption unit 53 which encryptes data provided by digital processing unit 45 to relay/responder/reporter 43 for transmission by antenna 41 and unencryptes data received by antenna 41 with the data then being provided to digital processing unit 45 for processing thereby.

At this time, it should be noted that encryption unit 53 may be a model made available to the Government of the United States such as an encryption device designated as a Message Orientated Data Security Module (MODSM). A typical encryption unit is assembled from a multiplicity of integrated circuit elements to electronically encrypt or decrypt digital data in a serial data stream. The exact constituency of one encryption unit as compared to another might be classified; however, all who are familiar with such units are well aware of a variety of encoding and decoding operations that can be routinely programmed to scramble and unscramble digital words. The details of the circuitry involved are not particularly germane to an appreciation of the inventive concept of the present invention for it could be any one of many data processors commercially available except for the fact that its specific use might make such an application a classified one.

There is electrically connected between encryption unit 53 and relay/responder/reporter 43 a digital interface circuit/protocol converter 55 (PC1). Encrypted data is transferred between protocol converter 55 and relay/responder/reporter 43 via an eight bit parallel data bus 59, while control signals are supplied to protocol converter 55 by relay/responder/reporter 43 via an eight bit parallel control bus 61. In a similar manner command and control signals are supplied to relay/responder/reporter 43 by protocol converter 55 via a five bit parallel control bus 63.

There is electrically connected between digital processing unit 45 and encryption unit 53 a protocol converter 57 (PC2). Unencrypted data is transferred between protocol converter 57 and encryption unit 53 via an eight bit parallel data bus 65, while control signals are supplied to protocol converter 57 by digital processing unit 45 via a five bit parallel control bus 67. In a similar manner control signals are supplied to digital processing unit 45 by protocol converter 57 via an eight bit parallel control bus 69. Encrypted data as well as command signals are transferred between protocol converter 55 and encryption unit 53 via serial data lines 71 and 73. Similarly, unencrypted data as well as command signals are transferred between protocol converter 57 and encryption unit 53 via serial data lines 75 and 77.

Referring to FIGS. 2 and 3a-3e there is shown an electronic circuit diagram of protocol converter 55 which provides the interface between relay/responder/reporter 43 and encryption unit 53. At this time, it should be noted that the electronic circuitry for digital interface circuits/protocol converters 55 and 57 are identical. Further, the operation of the protocol converters 55 and 57 with respect to processing data and command and control signals is very similar. Accordingly, the following discussion will be with respect to protocol converter 55 functioning as an interface between encryption unit 53 and relay/responder/reporter 43. Significant differences between the operation of protocol converter 55 and protocol converter 57 are included in the following discussion.

Figure 4:
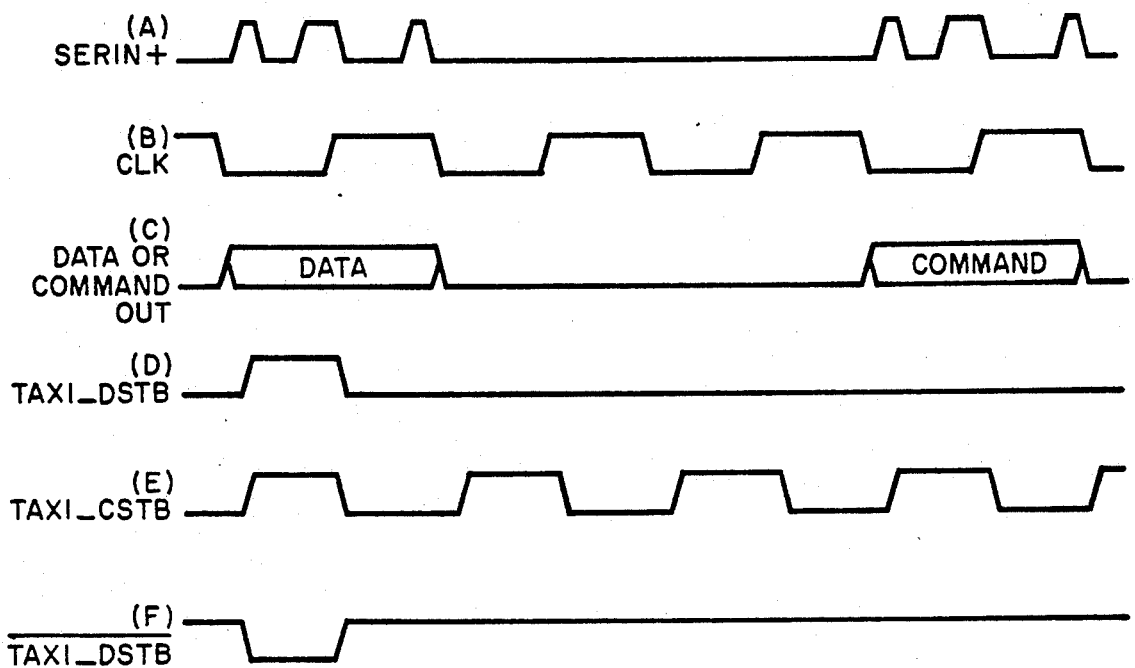
FIGS. 4 (A)-4(F) illustrate the timing waveforms occurring at the inputs and outputs of the receiver of the present invention.

Protocol converter 55 includes a receiver 81 which receives differential serial data and commands, FIG. 4(A), from encryption unit 53 through its SERIN+ and SERIN− inputs and a transmitter 83 which provides differential serial data and commands to encryption unit 53 through its SEROUT+ and SEROUT− outputs with the differential serial data and commands being referenced to +5.0 VDC.

Data received from encryption unit 53 by receiver 81 is converted to TTL compatible eight bit parallel data words, FIG. 4(C), and then transferred via a parallel data bus 85 to the D0-D7 inputs of a dual port memory 87. Receiver 81 also provides at its DSTRB output a taxi data strobe signal (TAXI_DSTB), FIG. 4(D), with the rising edge of this signal indicating the presence of an eight bit data word on data bus 85. The taxi data strobe signal, FIG. 4(D), is then supplied to the TAXI_STRB input of an erasable programmable logic device 89 for processing by device 89. In addition, receiver 81 provides at its CSTRB output a taxi command strobe signal (TAXI_CSTB), FIG. 4(E), with the rising edge of this signal indicating that command data, FIG. 4(C), may be present at the CO0-CO3 outputs of receiver 81. When present at the CO0-CO3 outputs of receiver 81 this command data is then provided via a receive command bus 91 to the RTC0-RTC3 inputs of erasable programmable logic device 89 and inputs zero through three (I0-I3) of a programmable array logic device 90. The command strobe signal of FIG. 4(E) is provided to the TAXI_STRB input of erasable programmable logic device 89 and input eight (I8) of programmable array logic device 90. It should be noted that the command strobe signal of FIG. 4(E) pulses at the rate of six pulses per microsecond regardless of whether data or commands are being supplied to receiver 81, while the data strobe signal of FIG. 4(D) occurs only when data is supplied to receiver 81.

The taxi command strobe signal (TAXI_CSTB) of FIG. 4(E) latches the command data (bits RTC0-RTC3) of FIG. 4(C) into programmable array logic device 90 which is programmed to function as a pair of four bit latches by conventional and well known programming techniques known to those skilled in the programming arts. The programmable array logic device used in the preferred embodiment of the present invention is an Advanced Micro Devices Model AmPAL20RA10 programmable array logic device. Appendix A (not printed, but incorporated by reference) is a program listing for programmable array logic device 90 which was generated using a computer software program entitled "PALASM" which is available from Advanced Micro Devices.

The +5 VDC supplied to the preload (/PL) input of device 90 inactivates the preload function of device 90 while the logic zero supplied to the not output enable (/OE) input of device 90 enables the 01-09 outputs of device 90. Programmable array logic device 90 is cleared by a strode signal (CMD_CLR) generated by a microcontroller 95.

Figure 5:
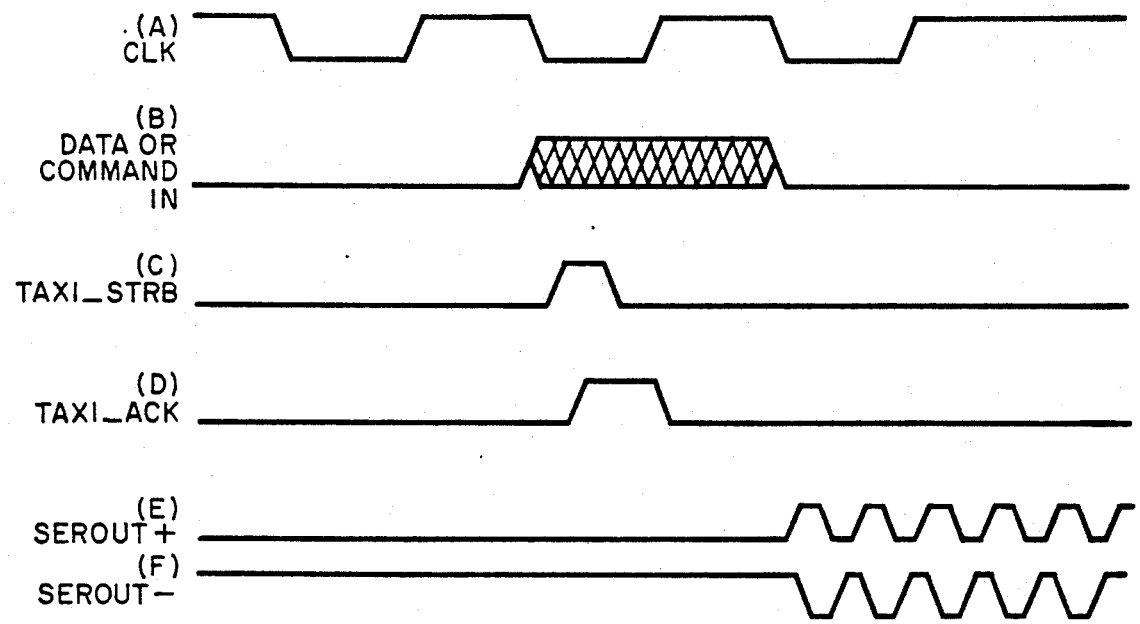
FIGS. 5 (A)-5(F) illustrate the timing waveforms occurring at the inputs and outputs of the transmitter of the present invention.
Figure 8A:
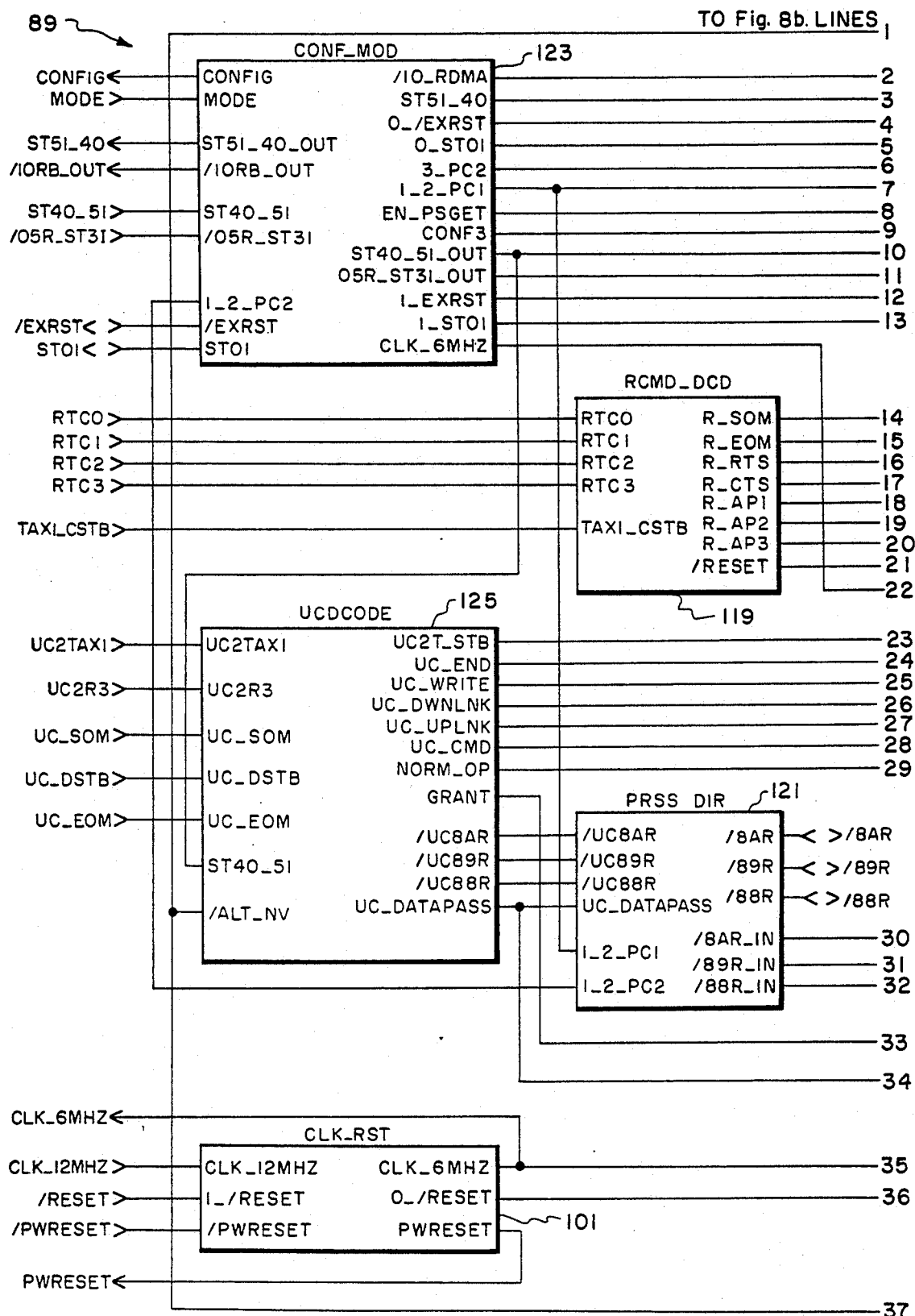
FIGS. 8a-8c is a top level electrical schematic diagram of the electrical programmable logic diagram of the present invention.
Figure 8B:
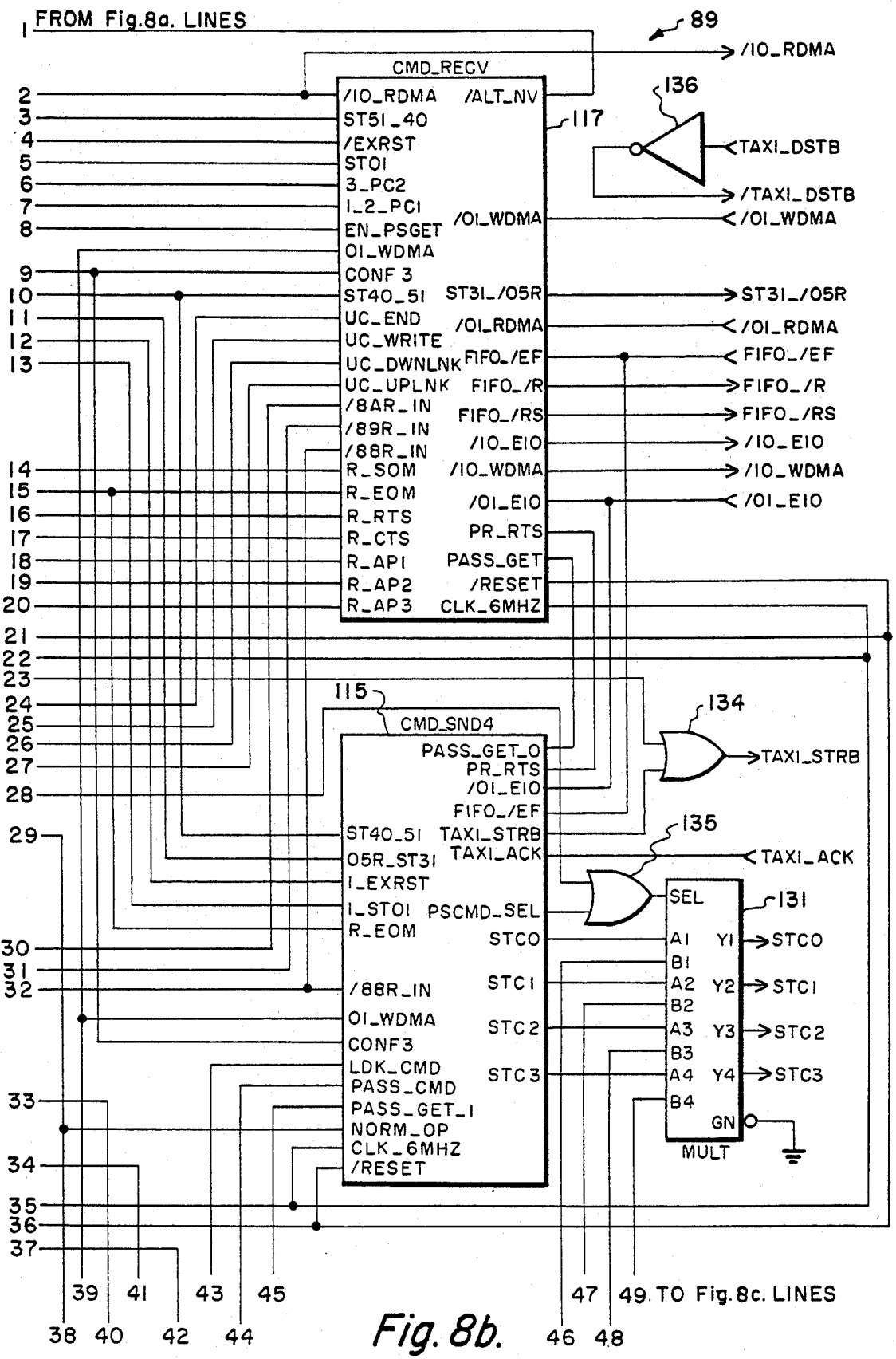
Figure 8C:
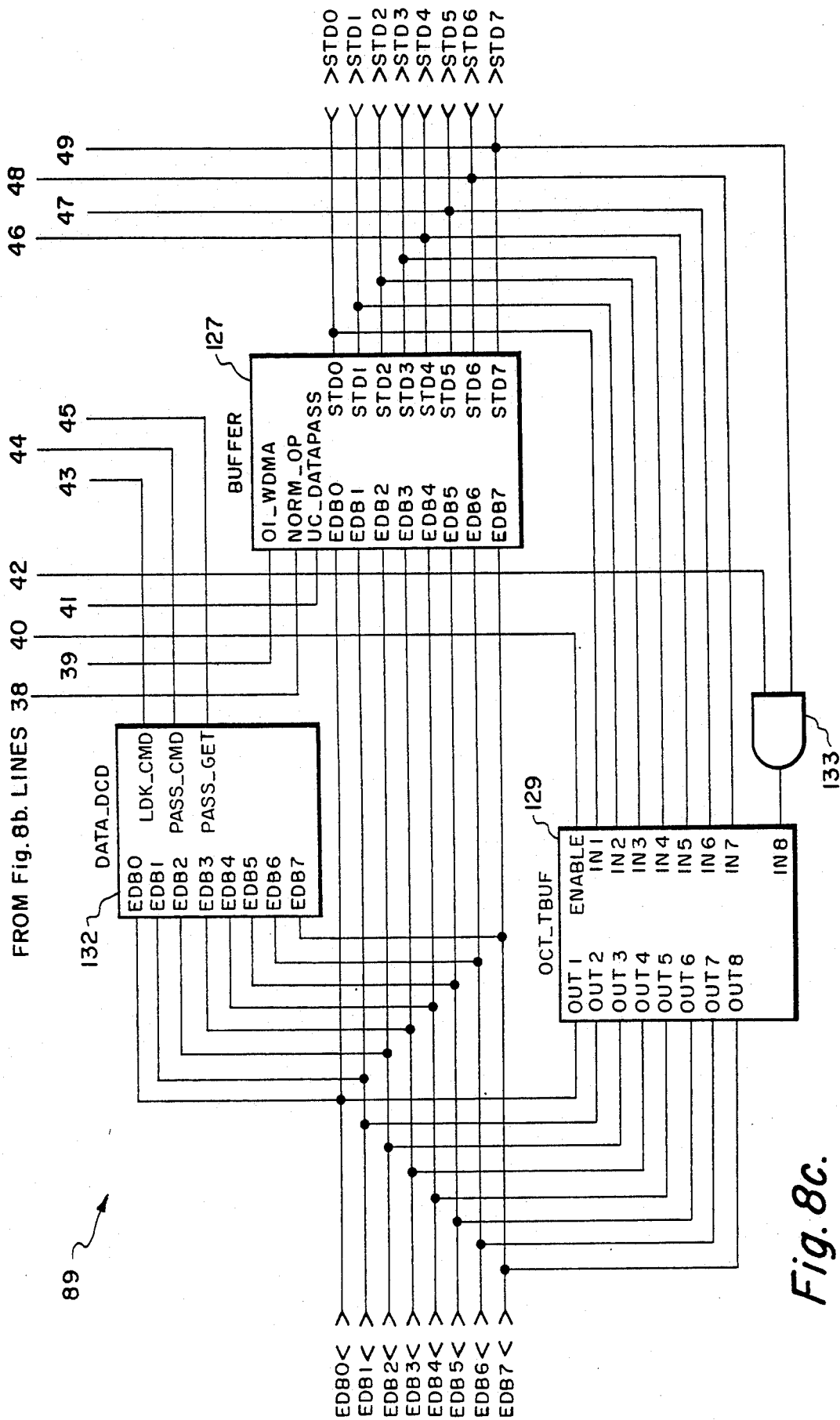

Eight bit parallel data words, FIG. 5(B), provided to data input zero through data input seven (DI0-DI7) of transmitter 83 are converted to differential serial data signals, FIGS. 5(E)-5(F), which are then supplied to encryption unit 53. Similarly, four bit parallel command words, FIG. 5(B), provided to command input zero through command input three (CI0-CI3) of transmitter 83 are converted to differential command signals, FIGS. 5(E)-5(F), which are next supplied to encryption unit 53. The rising edge of a taxi strobe signal (TAXI_STRB), FIG. 5(C), generated by erasable programmable logic device 89 is provided to the STRB input of transmitter 83 to latch into transmitter 83 the data and command words of FIG. 5(B) occurring at the DI0-DI7 and the CI0-CI3 inputs of transmitter 83. The TAXI_STRB signal of FIG. 5(C) is also provided to the input nine (I9) of programmable array logic device 90 to latch therein the four bit command words (bits STC0-STC3) generated by the command send circuit 115, FIG. 8 of erasable programmable logic device 89.

Transmitter 83 also generates an acknowledge signal (TAXI_ACK), FIG. 5(D) with the rising edge of the signal of FIG. 5(D) indicating that transmitter 83 is ready to accept additional commands and data, FIG. 5(B). The six megahertz system clock signal (CLK_6 MHZ), FIGS. 4(B) and 5(A), supplied to receiver 81 and transmitter 83 is provided by erasable programmable logic device 89. Erasable programmable logic device 89, in turn, receives a twelve megahertz clock signal from an oscillator 93, divides this twelve megahertz clock signal by two and supplies the signal to the X1 inputs of receiver 81 and transmitter 83.

The receiver 81 used in the preferred embodiment of the present invention is an Advanced Micro Devices Model Am7969 TAXichip Receiver, while transmitter 83 is an Advanced Micro Devices Model Am7968 TAXichip Transmitter. The dual port memory 87 is an Integrated Device Technology Inc. Model IDT7201S/L dual port memory and the erasable programmable logic device 89 is an Altera Corporation Model EPM5128J erasable programmable logic device. Microcontroller 95 is an Intel Model 87C51 microcontroller/microprocessor.

Figure 9:
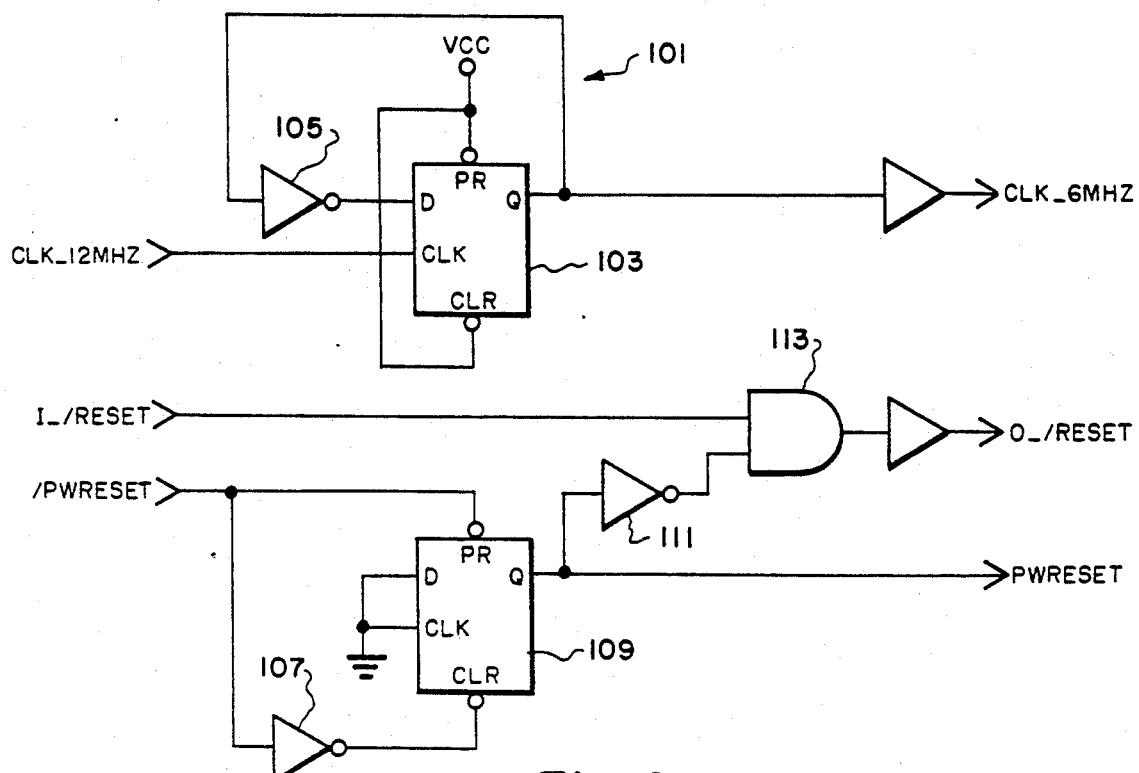
FIG. 9 is a detailed electrical schematic of the clock-reset circuit of FIG. 8.

Referring to FIGS. 3a-3e, 8a-8c and 9 the twelve megahertz clock signal generated by oscillator 93 is supplied to the clock input of a D Flip-Flop 103, FIG. 9, within the clock-reset circuit 101 of device 89. Flip-Flop 103 then divides the twelve megahertz clock signal by two resulting in a six megahertz system clock signal being provided at the CLK_6 MHZ output of erasable programmable logic device 89.

Figure 10A:
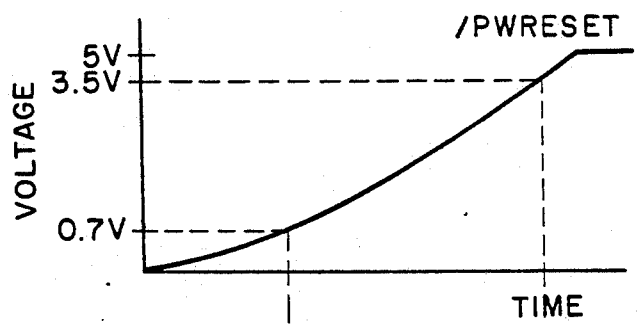
FIG. 10(A) and (B) illustrate the timing waveforms which occur when the protocol converter of FIG. 9 is initialized.
Figure 10B:
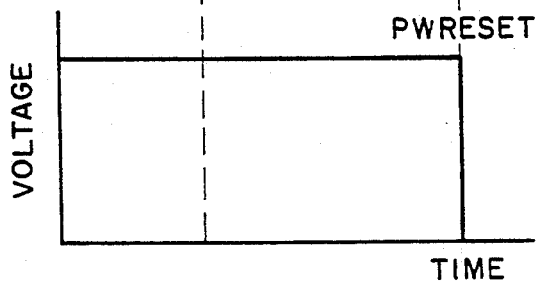
Figure 11:
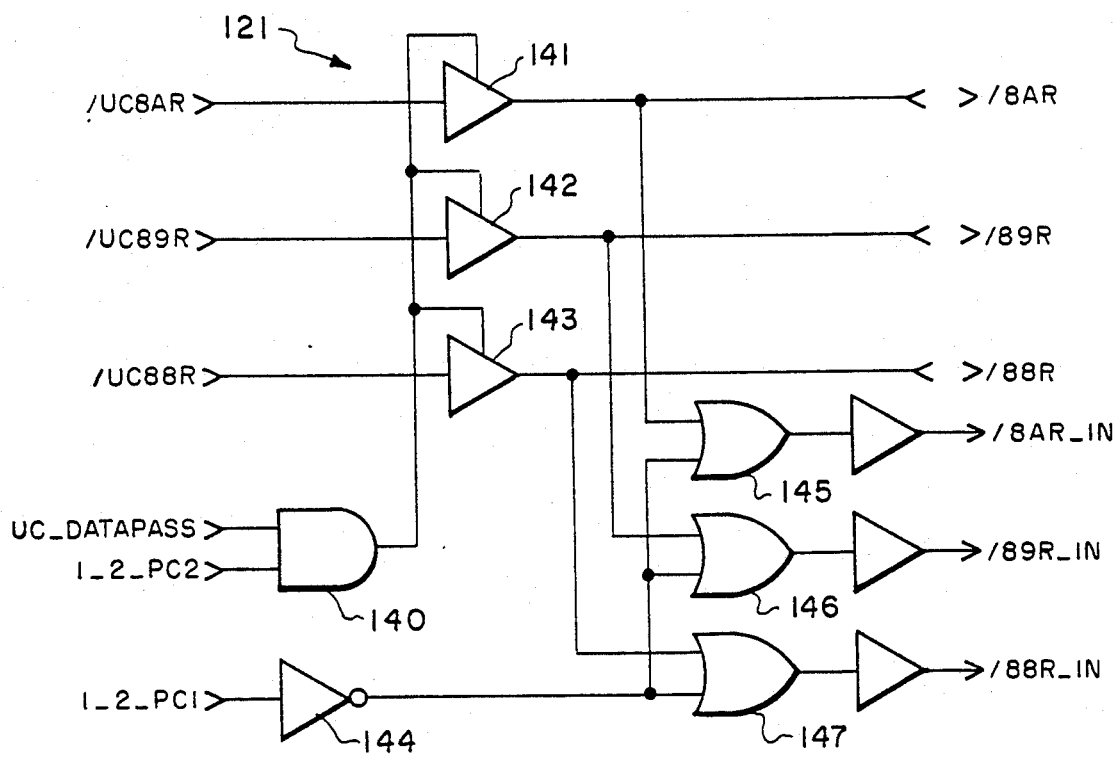
FIG. 11 is a detailed electrical schematic diagram of the pressure direction circuit of FIG. 8.

When power to digital interface circuit 55 is turned on a logic zero is supplied through the /PWRESET input of erasable programmable logic device 89 to the preset input of D Flip-Flop 109 presetting Flip-Flop 109 which results in a logic one occurring at the Q output of Flip-Flop 109. This logic one is supplied to reset input of microcontroller 95 resetting microcontroller 95. When the charge on capacitor C1 reaches approximately +3.5 VDC resulting in a logic one being supplied to the /PWRESET input of erasable programmable logic device 89, the output of inverter 107 will transition from a logic one to a logic zero clearing D Flip-Flop 109. This results in the Q output of Flip-Flop 109 transitioning from the logic one state to the logic zero state, FIG. 10(B), with the logic one being supplied to the reset input of microcontroller 95. After being reset by the logic one reset pulse illustrated in FIG. 10(b), microcontroller 95 provides a reset pulse of approximately one microsecond, which is active low, through the /RESET input of erasable programmable logic device 89 to AND Gate 113. Since the Q output of Flip-Flop 109 is at the logic zero state, the output of inverter 111 will be at the logic one state enabling AND gate 113 which allows the reset pulse from microcontroller 95 to pass through AND gate 113 to the RESET input of command send circuit 115, command receive circuit 117 and receive command decode circuit 119 resetting circuits 115, 117 and 119. Erasable programmable logic device 89 next resets dual port memory 87 by providing a logic zero to the/R input of dual port memory 87.

Referring to FIGS. 3a-3e, 8a-8c and 11 erasable programmable logic device 89 includes a pressure direction circuit 121 which is a hi-directional circuit dependent upon the mode and configuration under which protocol converter 55 or protocol converter 57 is operating. As shown in FIG. 2, protocol converter 55 is operating in configuration two, mode one, while protocol converter 57 is operating in configuration two, mode two. Removal of the encryption unit 53 from FIG. 2 results in protocol converter 55 operating in configuration one, mode one and protocol converter 57 operating in configuration one, mode two. When digital signal processor 45 is replaced by a radio frequency I/O logic unit, not shown, and encryption unit 53 is removed from the configuration illustrated in FIG. 2, protocol converter 55 operates in configuration three, mode one, while protocol converter 57 operates in configuration three, mode two. The following table illustrates the logic states occurring at the MODE input of erasable programmable logic 89 (most significant bit) and the CONFIG input of device 89 (least significant bit).

TABLE I

|  | Mode = PC2 | Mode = PC1 |
|---|---|---|
| Config = 3 | 0 0 | 1 0 |
| Config = 1 | 0 1 | 1 1 |

When a logic zero is supplied to the Mode input of configuration-mode circuit 123 and a logic one is supplied to the CONFIG input of circuit 133, the Y12 output of 2-Line to 4-Line Decoder 151 is at the logic zero state. This logic zero is inverted by inverter 157 to a logic one which is supplied to AND gate 140 enabling AND gate 140.

Figure 3A:
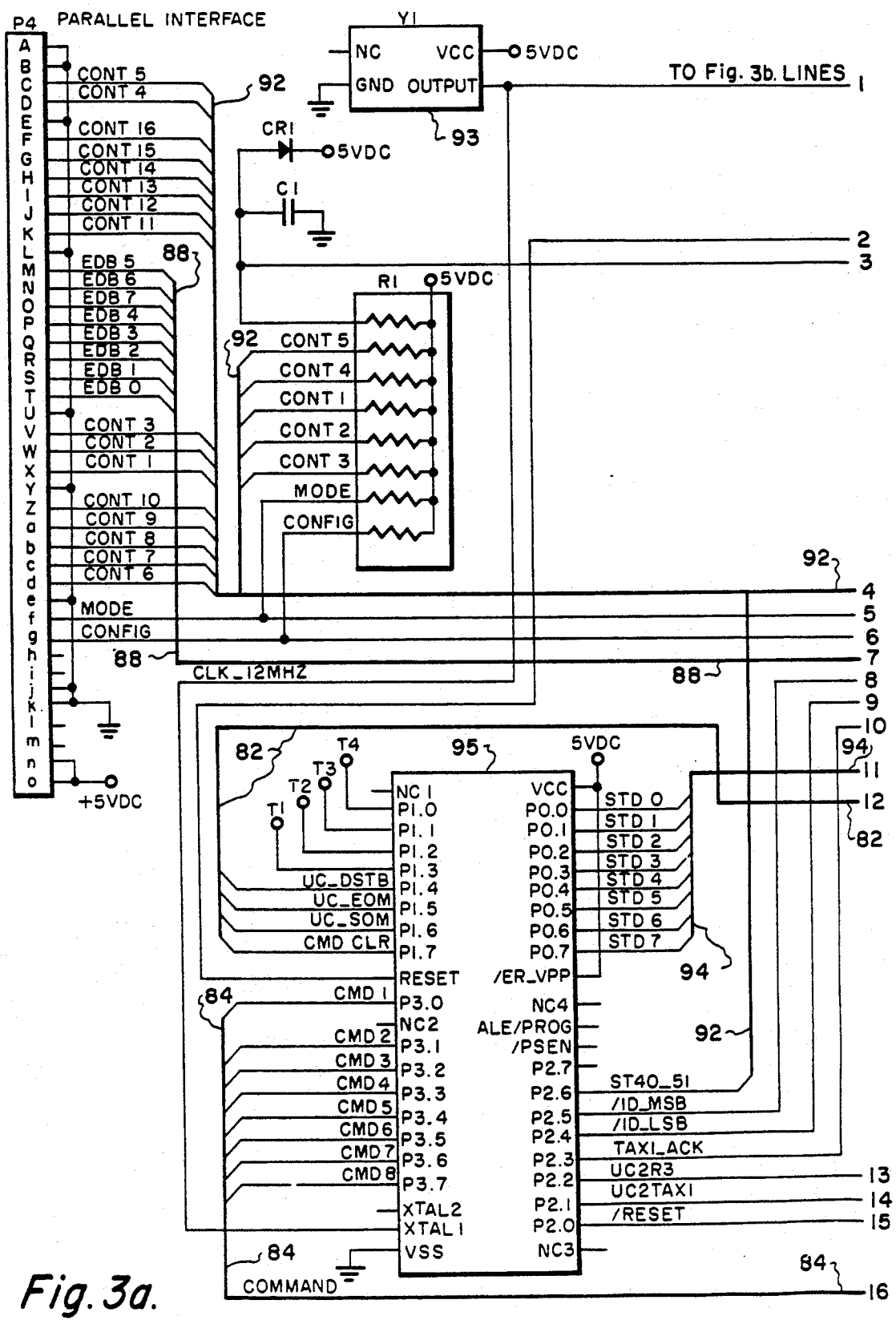
FIGS. 3a-3e is an electrical schematic diagram of the digital interface circuit/protocol converter constituting the present invention.
Figure 3B:
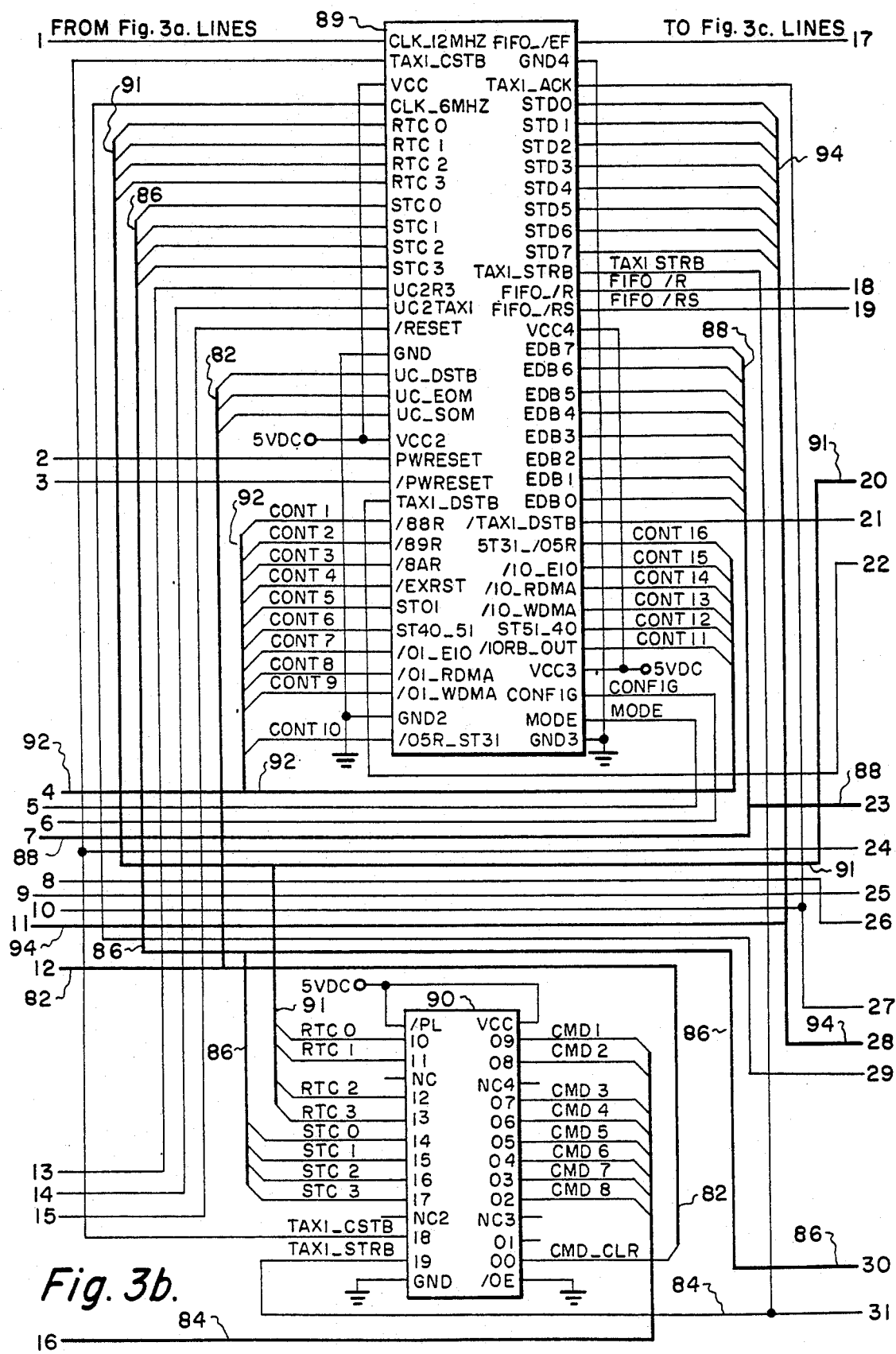
Figure 3C:
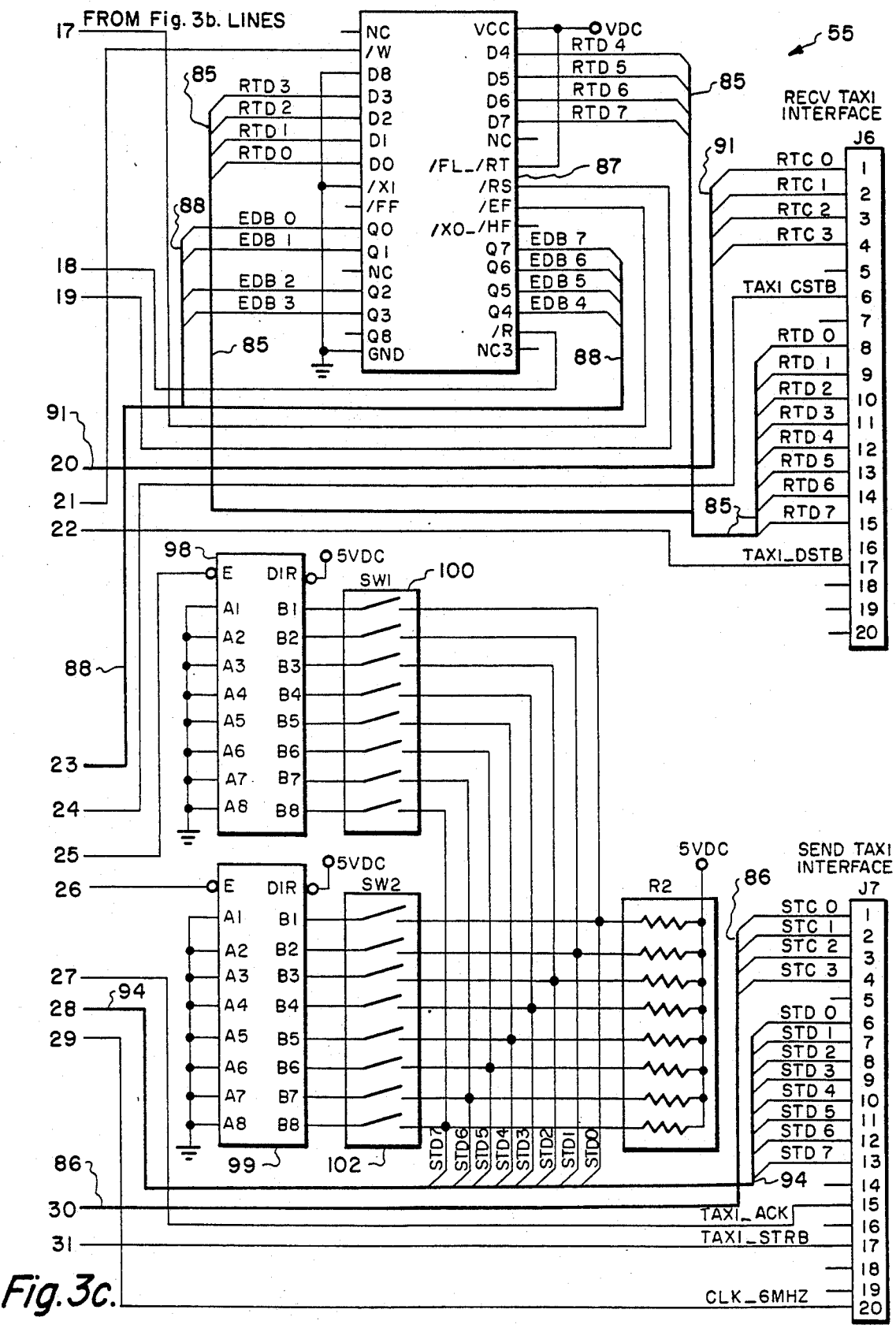
Figure 12A:
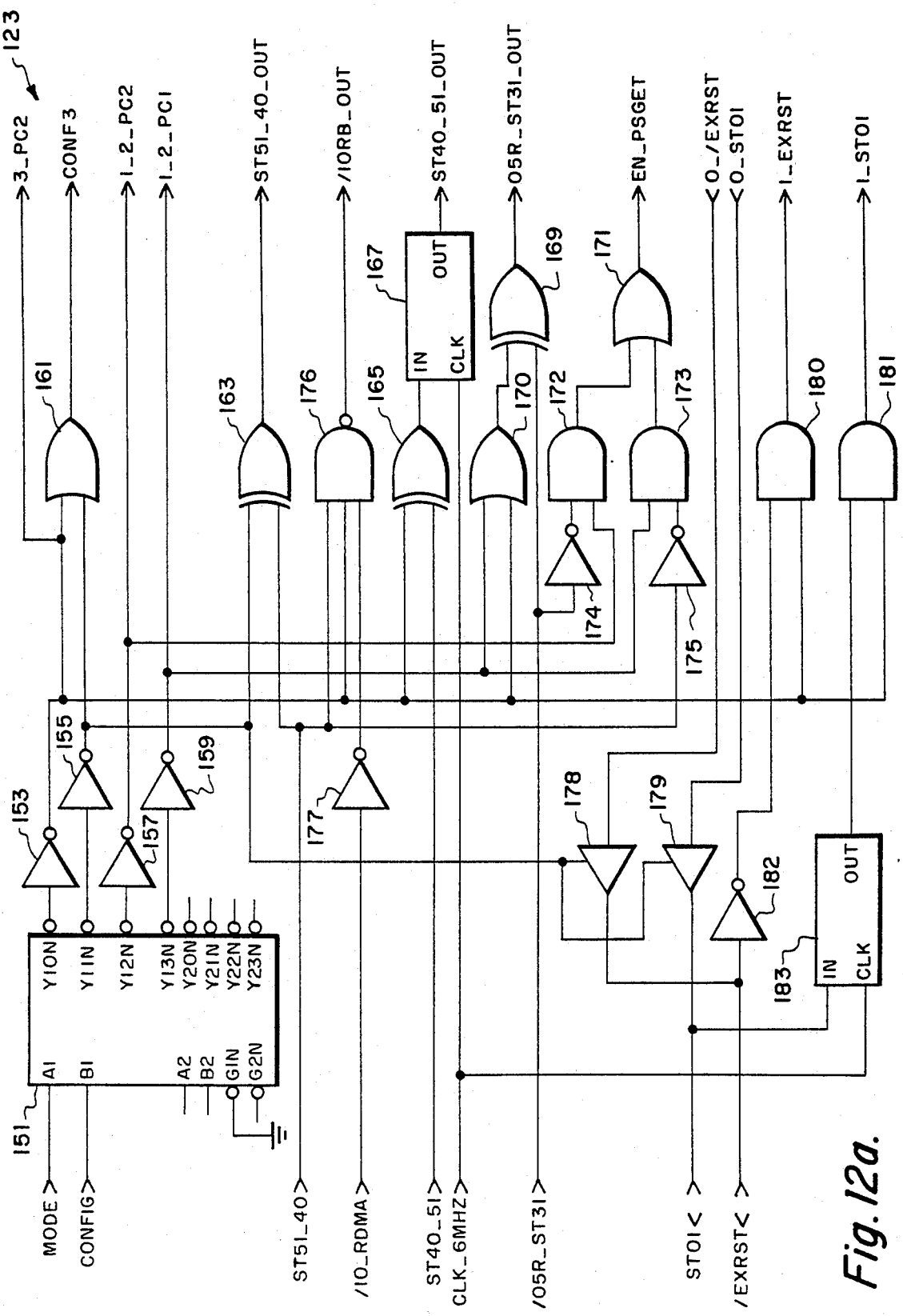
FIG. 12a-12c is a detailed electrical schematic diagram of the configuration mode circuit of FIG. 8.
Figure 12B:
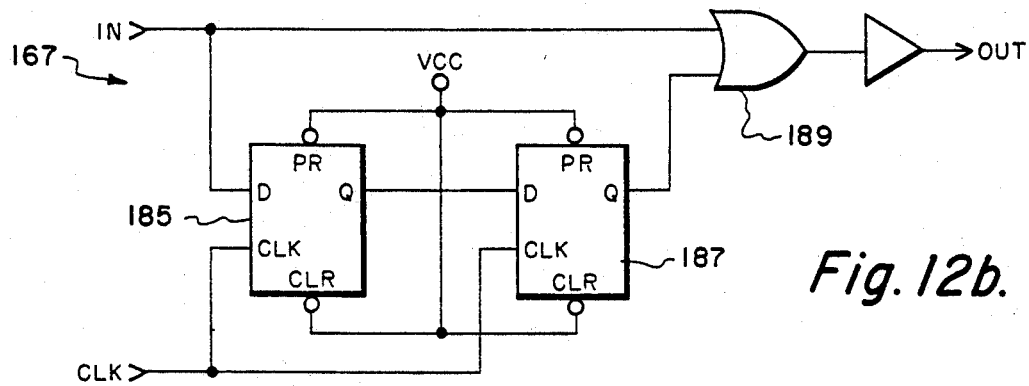
Figure 12C:
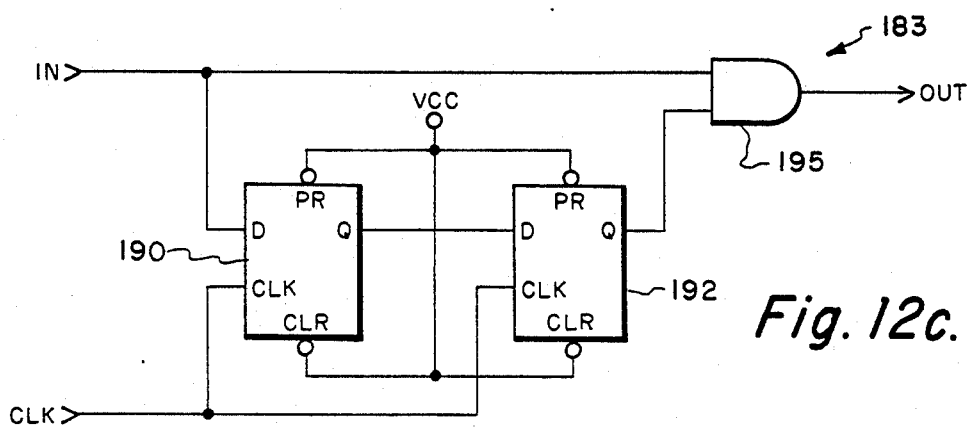
Figure 13:
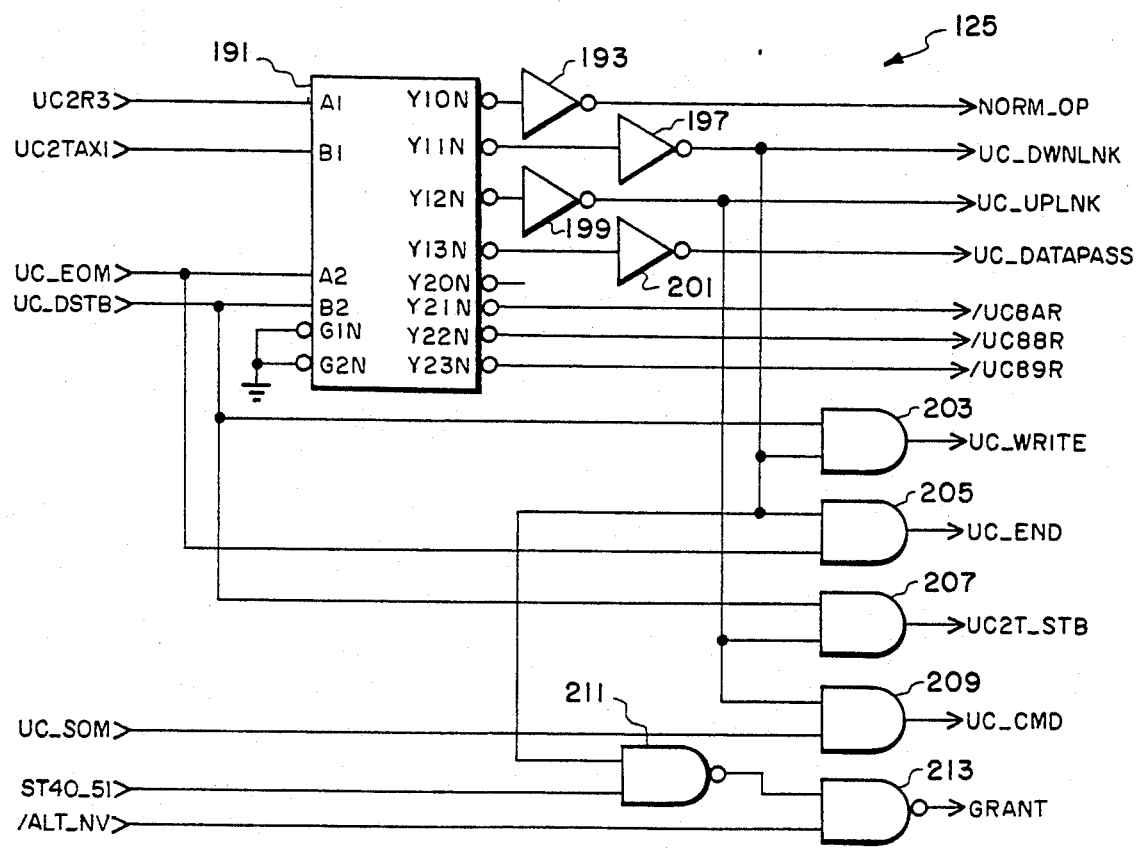
FIG. 13 is a detailed electrical schematic diagram of the microcontroller decode circuit of FIG. 8.
Figure 14:
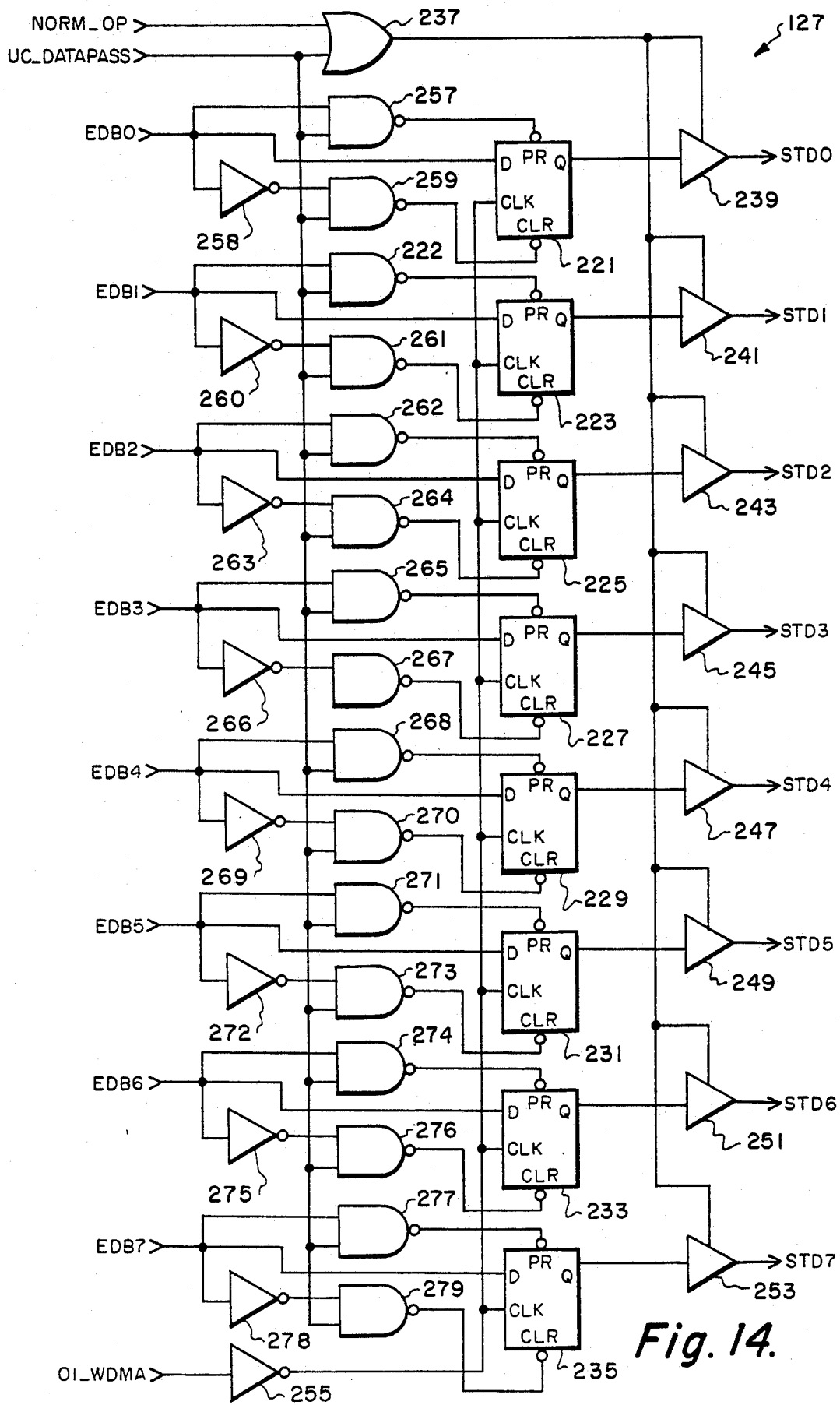
FIG. 14 is a detailed electrical schematic of the eight bit buffer circuit of FIG. 8.

Referring to FIGS. 3a, 12 and 13, when microcontroller 95 supplies a logic one to the UC2TAXI input of microcontroller decode circuit 125 and a logic one to the UC2R3 input of circuit 125, the Y13 output of 2-Line to 4-Line Line Decoder 191 is at the logic zero state. This logic zero is inverted by inverter 201 to a logic one which is supplied to AND gate 140 of pressure direction circuit 121 resulting in tri-state buffers 141, 142 and 143 being enabled. This allows logic zeros pulses /8AR, /89R and /88R (illustrated by FIGS. 24B, 24C and 24D) to pass from microcontroller decode circuit 125 through circuit 121 to digital signal processing unit 45. The logic zero pulses /88R, /8AR and/89R are utilized to effect the transfer of pressure data from digital signal processor 45 to encryption unit 53 and then from encryption unit 53 to relay/responder/reporter 43.

When a logic one is supplied to the Mode input of configuration-mode circuit 123 and a logic one is supplied to the CONFIG input of circuit 133, the Y13 output of 2-Line to 4-Line Decoder 151 is at the logic zero state. This logic zero is inverted by inverter 159 to a logic one which is supplied to inverter 144. Inverter 144 inverts the logic one to a logic zero which is supplied to OR gates 145, 146 and 147. This allows, for example, the logic zero pulse /88R provided by relay/responder/reporter 43 to pass through OR gate 147 to command receive circuit 117.

At this time it should be noted that whenever protocol converter 55 is operating in configuration 3, the mode input of configuration-mode circuit 123 is at the logic one state, while the configuration input is at the logic zero state. this results in the Y12 output of 2-Line to 4-Line Decoder 151 being at the logic zero state and the Y11 output of Decoder 151 being at the logic one state. Inverter 153 inverts the logic one supplied to its input to a logic zero which is supplied to OR gate 161, while inverter 155 inverts the logic zero supplied to its input to a logic one which is also supplied to OR gate 161 resulting in a logic one occurring at the CONF3 output of circuit 123 and a logic zero occurring at the 3_PC2 output of circuit 123. In a similar manner, whenever protocol converter 57 is operating in configuration three, the CONF3 as well as the 3_PC2 outputs of circuit 123 will be at the logic one state.

Referring now to FIGS. 2, 8a-8c, 13, 14 and 15 eight bit buffer circuit 127 comprises eight D Flip-Flops 221-235, each of which is adapted to receive one of the eight parallel data bits of each data word provided by relay/responder/reporter 43 to protocol converter 55 or digital processing unit 45 to protocol converter 57. When the UC2TAXI and the UC2R3 inputs of erasable programmable logic device 89 are at the logic zero state indicating that microcontroller 95 is not controlling a data transfer the Y10 output of 2-Line to 4-Line Decoder 191 is at the logic zero state. This logic zero is inverted to a logic one by inverter 193 and then supplied through the NORM_OP input of circuit 127 and OR gate 237 to the enable inputs of tri-state buffers 239-253 enabling buffers 239-253.

Figure 22:
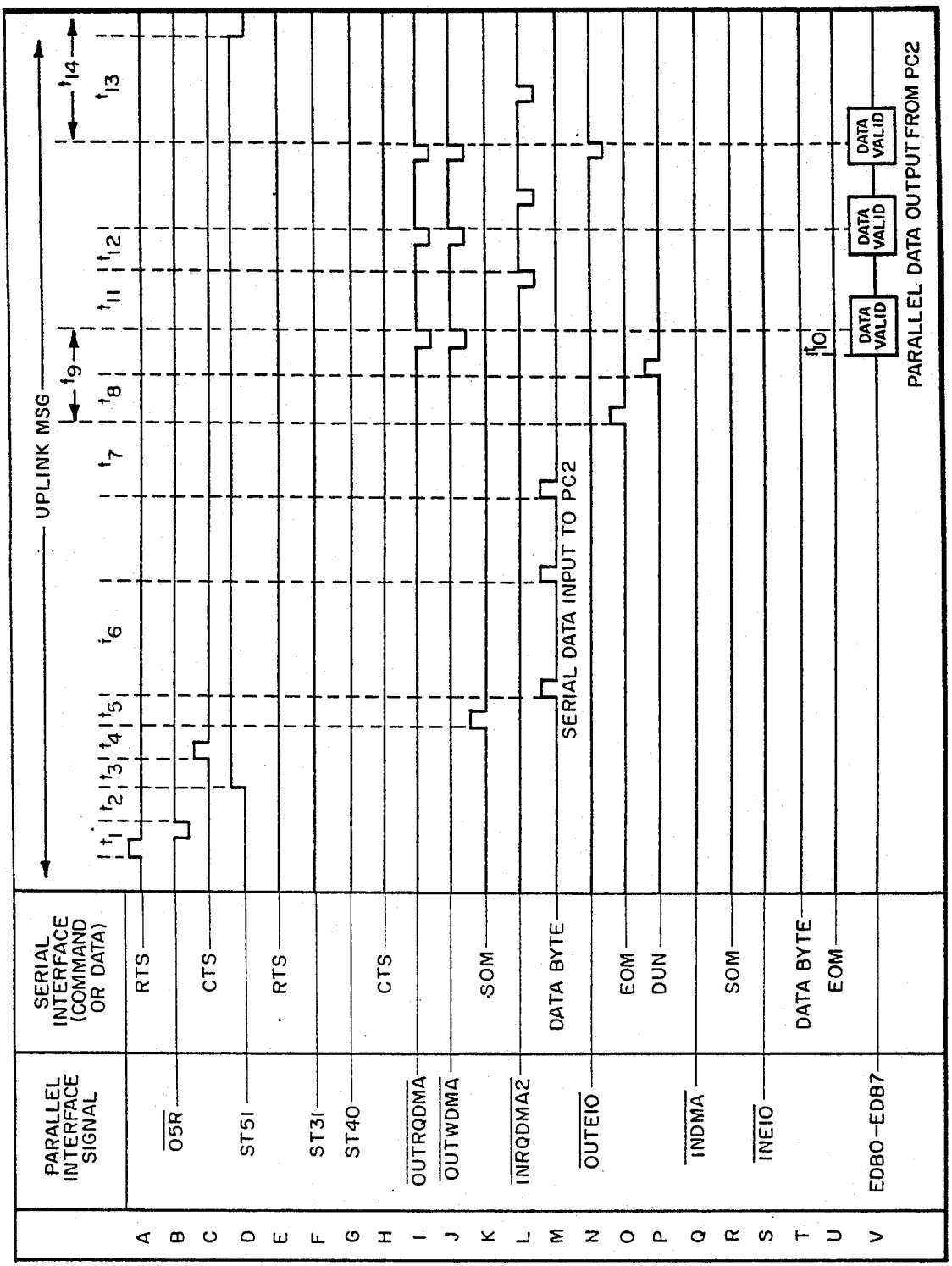
FIGS. 22A-22V illustrate the timing waveforms occurring during the transfer of data from the encryption unit via the protocol converter PC2 to the digital processing unit.

For protocol converter 55 the/OUTWDMA signal of FIG. 6J clocks data from relay/responder/reporter 43 through Flip-Flops 221-235 and the STD0-STD7 of erasable programmable logic device 89 to transmitter 83 for transmission to encryption unit 53. In a like manner, for protocol converter 57 the /INDMA signal of FIG. 22Q clocks data from digital processing unit 45 through Flip-Flops 221-235 and the STD0-STD7 of erasable programmable logic device 89 to transmitter 83 for transmission to encryption unit 53.

Referring now to FIGS. 2, 6A-6W, 8a-8c, 14, 15 and 16 when relay/responder/reporter 43 supplies the /O5R control signal of FIG. 6A to protocol converter 55, command-send circuit 115 of erasable programmable logic device 89 generates the request to send (RTS) command of FIG. 6B, which is hexadecimal three and occurs at the STC0-STC3 outputs of command-send circuit 115. It should be noted that the /O5R control signal of FIG. 6A functions as a request by relay/responder/reporter 43 to send data.

The request to send command of FIG. 6B is then provided via send command bus 86 to transmitter 83 for transmission to encryption unit 53. The encryption unit 53, in response to the request to send command of FIG. 6B, provides a clear to send command, FIG. 6H, (hexadecimal four) to protocol converter 55.

Figure 6:
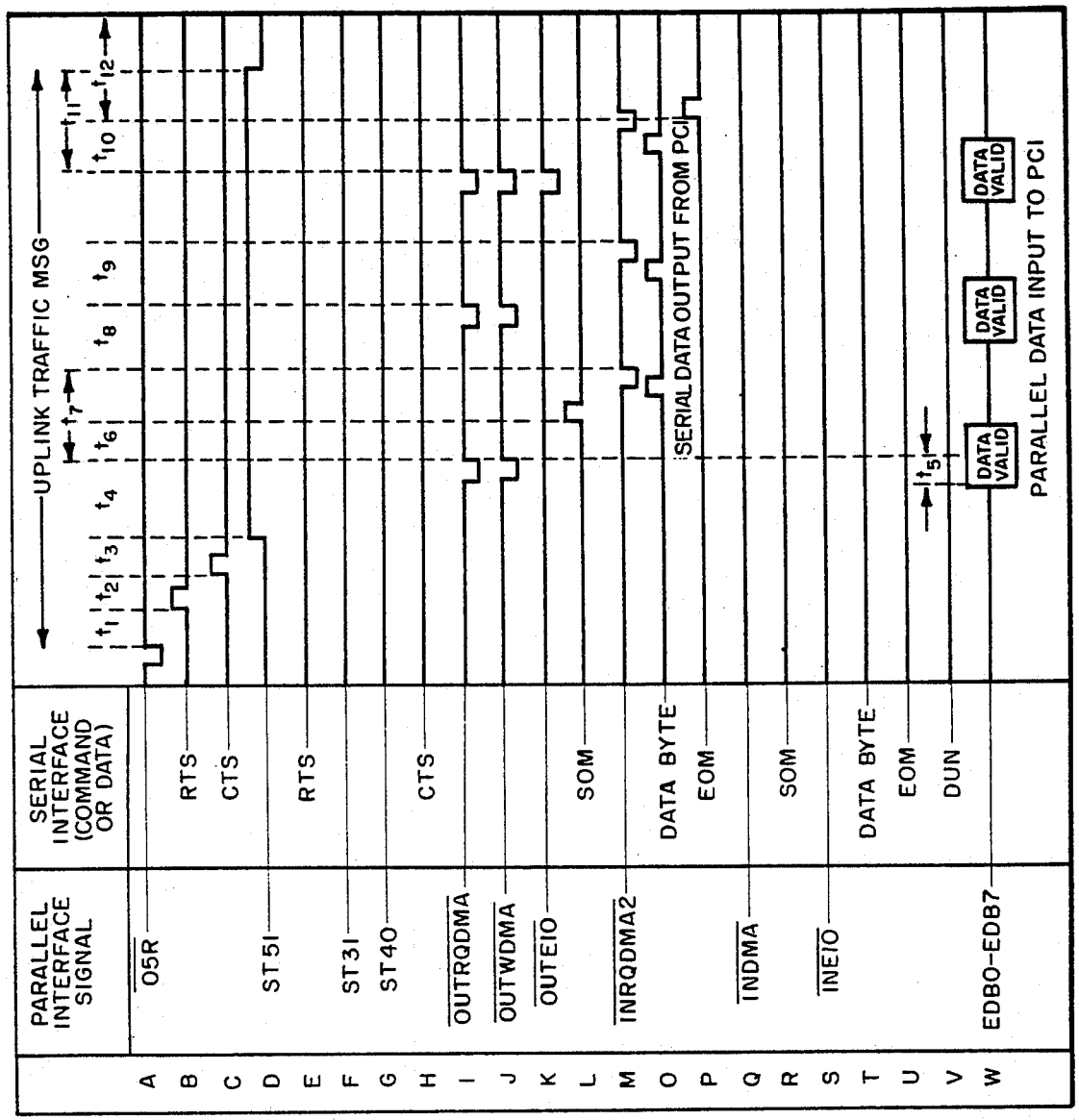
FIGS. 6A-6W illustrate the timing waveforms occurring during a transfer of data from the relay/responder/reporter via the protocol converter PC1 to the encryption unit.

Referring to FIGS. 2, 8a–8c, 15 and 16, the clear to send command of FIG. 6H is first provided to the RTC0-RTC3 inputs of receive command decode circuit 119 within erasable programmable logic device 89. Since the clear to send command is hexadecimal four only the RTC2 input to circuit 119 will transition to the logic one state resulting in the O4N output of 4-Line to 16-line decoder 120 transitioning from the logic one to the logic zero state. The TAXI_CSTB signal of FIG. 4(E) then clocks this logic zero into latch 122 which inverts the logic zero to a logic one resulting in logic zero to one transition occurring at the Q5 output of latch 122. This logic zero to one transition passes through the R_CTS output of circuit 119 and the R_CTS input of command receive circuit 117 to AND gate 305. Since microcontroller 95 is not normally active during the data transfer of FIG. 6 the UC_UPLINK input to command receive circuit 117 will be at the logic zero state. This logic zero is inverted by inverter 307 to a logic one which is supplied to AND gate 305 enabling AND gate 305 so as to allow the logic zero to one transition from the R_CTS output of circuit 119 to pass through AND gate 305 to the clock input of D Flip-Flop 309 clocking the logic one at the D input of Flip-Flop 309 to its Q output which is the logic zero to one transition of the ST5I control signal of FIG. 6D. The ST5I control signal, which functions as a clear to send signal, passes through the Exclusive-OR gate 163 of configuration mode circuit 123 to the ST5I_40 output of erasable programmable logic device 89 and is then supplied to relay/responder/reporter 43 indicating to relay/responder/reporter 43 that the clear to send command of FIG. 6(C) has been received from encryption unit 53 and that relay/responder/reporter 43 can now send data, FIG. 6W, to protocol converter 55. The ST5I signal of FIG. 6D remains at the logic one state during the uplink data transmission and is cleared by the /OUTEIO control signal of FIG. 6K which is provided to command receive circuit 117 of erasable programmable logic device 89 by relay/responder/reporter 43 and which is provided when relay/responder/reporter 43 transmits the last data byte of FIG. 6W to protocol converter 55. After the /OUTEIO control signal of FIG. 6K is inverted by an inverter 311, this signal is supplied to a delay circuit 313 which comprises series connected D Flip-Flops 302,304,306 and 308 and which delays the signal by four clock pulse of the six megahertz system clock signal. This delay of approximately 670 nanoseconds results from the six megahertz system clock signal, illustrated in FIG. 5(A), clocking the /OUTEIO control signal through D Flip-Flops 302, 304,306 and 308 to NOR gate 315. Since the /RESET input to command receive circuit 117 is at the logic one state, inverter 317 will supply a logic zero to NOR gate 315. The delayed /OUTEIO control signal is then inverted by NOR gate 315 thereby providing a logic zero pulse to the clear input of D Flip-Flop 309. This logic zero pulse clears Flip-Flop 309 resulting in a logic one to zero transition at the Q output of Flip-Flop 309 which is the one to zero transition at the ST5I_40 output of command receive circuit 117.

The /OUTWDMA control signal of FIG. 6(J), which is generated by relay/responder/reporter 43, is supplied to the command receive circuit 117 of device 89 via control bus 92 within protocol converter 55. The /OUTWDMA control signal of FIG. 6J is first inverted by an inverter 301 then passes through an AND gate 303 which is enabled by the logic one occurring at the output of Flip-Flop 309, that is the ST5I signal of FIG. 6(D). The inverted /OUTWDMA control signal is supplied to the OI_WDMA input and is again inverted by an inverter 255 and then supplied to the clock inputs of Flip-Flops Flops 221-235. The rising edge of each pulse of the /OUTWDMA control signal clocks the eight parallel data bits of each data word supplied to the EDB0-EDB7 of erasable programmable logic device 89 through Flip-Flops 221-235 to the STD0-STD7 outputs of buffer circuit 127.

Receive command circuit 117 also generates the /INRQDMA2 control pulses/signal of FIG. 6M which is an acknowledgement to relay/responder/reporter 43 that the parallel data bytes of FIG. 6W have been received by protocol converter 55. Since the UC_WRITE input, the UC_END input, the FIFO_/EF input and the R_EOM input of command receive circuit 117 are each at the logic zero state, the first three inputs to NOR gate 375 are at the logic zero state which allows the inversion of the /OUTWDMA control signal of FIG. 6J to be inverted by and pass through NOR gate 375 resulting in the /INRQDMA2 control signal of FIG. 6M occurring at the /IO_RDMA output of command receive decode circuit 117. In a similar manner, the /INDMA control signal of FIG. 23Q is used to generate the /OUTRQDMA control signal of FIG. 23I which is an acknowledgement to digital processing unit 45 that the parallel data bytes of FIG. 23V have been received by protocol converter 57.

Figure 3D:
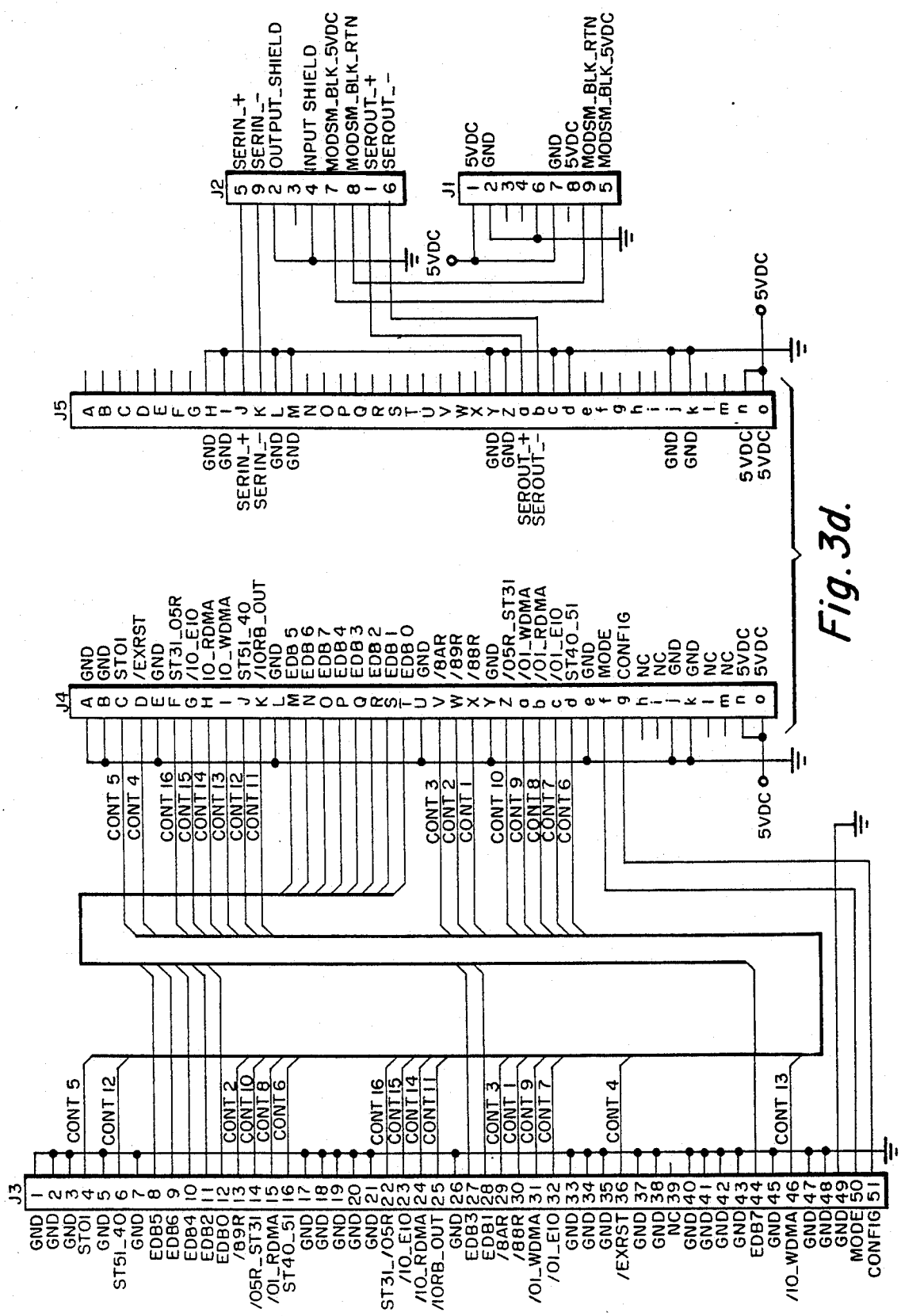
Figure 3E:
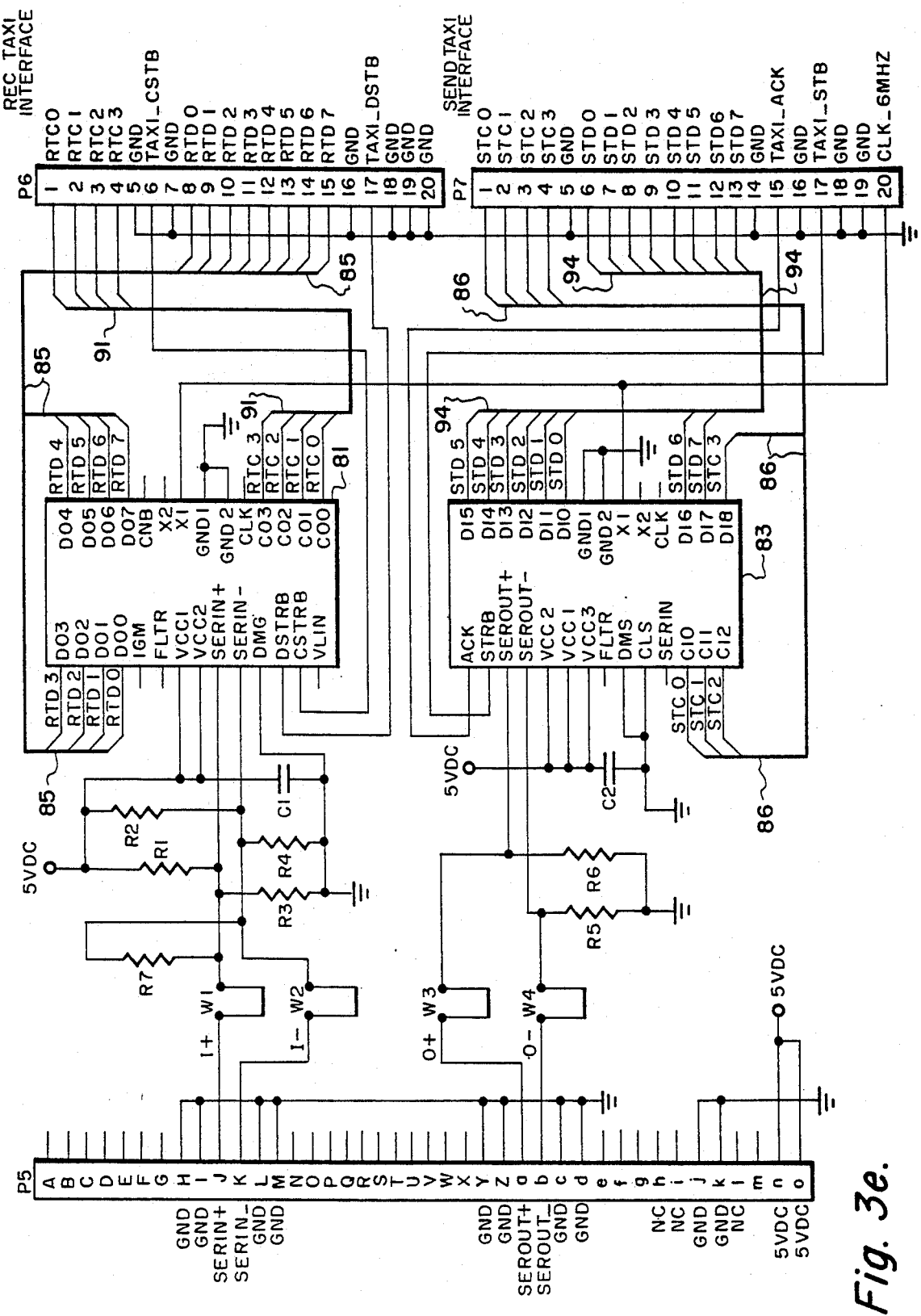

Referring now to FIGS. 2, 7A–7W, 8a–8c, 14, 15 and 16 when encryption unit 53 provides a request to send command (hexadecimal 3) to protocol converter 55, receiver 81, FIG. 3d, will convert the request to send command from serial to parallel and then supply the request to send command to the RTC0-RTC3 inputs of erasable programmable logic device 89. The request to send command is first provided to receive command decode circuit 119 which decodes the command resulting in its R_RTS output transitioning to the logic one state. The logic one is supplied through the R_RTS input of command receive circuit 117, OR gate 319, AND gate 321 to the clock input of D Flip-Flop 323 clocking the logic one at the D input of Flip-Flop 323 to its Q output. It should be noted that AND gate 321 is enabled since the Q output of D Flip-Flop 325 is at the logic zero state which then is inverted by inverter 327 resulting in the logic one being supplied to AND gate 321.

Since protocol converter 55 is operating in configuration 2, mode PC1, configuration mode circuit 123 will provide at its 1_2_PC1 output a logic one. This one is supplied through the 1_2_PC1 input of command receive circuit 117, OR gate 329 to AND gate 331 enabling AND Gate 331. This allows the logic one occurring at the Q Output of Flip-Flop 331 to pass through AND gate 331 and OR gate 333 thereby generating the ST3I control signal of FIG. 7F. The ST3I control signal of FIG. 7F is then supplied to relay/responder/reporter 43. The ST3I signal is, in turn, a request supplied protocol converter 55 to input data provided to relay/responder/reporter 43 by encryption unit 53.

Whenever relay/responder/reporter 43 receives the ST3I signal of FIG. 7F, relay/responder/reporter 43 will supply to the ST40_5I input of erasable programmable logic device 89 the ST40 signal of FIG. 7(G).

The ST40 signal of FIG. 7(G), which functions as a clear to send data signal, passes through Exclusive OR 165 and NGLITCH circuit 167 of configuration mode circuit 123, FIG. 12a, to NAND gate 343 within command receive circuit 117. The ST40 signal enables NAND gate 343 allowing the /OUTRQDMA control signal to pass through NAND gate 343.

It should be noted that the output of Flip-Flop 345 also must be at the logic one state to allow the /OUTRQDMA control signal of FIG. 7I to pass through NAND gate 343. When the end of message command of FIG. 7U (hexadecimal two) is supplied to protocol converter 55 by encryption unit 53, receive command decode circuit 119 of the erasable programmable logic device 89 will decode the end of message command transitioning its R_EOM from a logic zero to a logic one state which is supplied to Flip-Flop 345 within command receive circuit 117. This logic zero to one transition then clocks the logic one at the D input of Flip-Flop 345 to its Q output allowing the /OUTRQDMA control signal of FIG. 7I to pass through NAND gate 343 when NAND gate 343 is enabled by the ST40 signal of FIG. 7G.

In addition, it should be noted that command send circuit 115, in response to the ST40 signal of FIG. 7G, generates the clear to send signal of FIG. 7H which is then provided to encryption unit 53. Encryption unit 53 then generates the start of message command of FIG. 6R indicating that serial data, FIG. 6T, will be transferred from encryption unit 53 to protocol converter 55.

It should also be noted that NGLITCH circuit 167, FIG. 12b, comprises a pair of Flip-Flop 185 and 187 and a NOR gate 189 which, in combination, are used to filter out negative going glitches having a duration less than one clock cycle of the 6 MHz system clock signal, FIG. 5(A). For example, it was found that a negative going glitch less than 167 nanoseconds in duration may occur when the ST40_5I input to configuration mode circuit 123 is a logic one state during the downlink data transfer illustrated in FIG. 7.

In a like manner PGLITCH circuit 183, FIG. 12c, comprises a pair of Flip-Flop 190 and 192 and a AND gate 195 which, in combination, are used to filter out positive going glitches having a duration less than one clock cycle of the 6 MHz system clock signal, FIG. 5(A). The signal STOI, which is supplied to configuration mode circuit 123, allows for transmission of data by antenna 41 when protocol converter 55, relay/responder/reporter 43 and antenna 41 are located at a ground station. During data transmission it was found that positive going glitches may occur when the STOI signal is at the inactive logic zero state.

Referring now to FIGS. 2, 23A-23W, 8a-8c, 14, 15 and 16 digital processing unit 45 supplies to protocol converter 57 the ST3I control signal of FIG. 23F which initiates a parallel data transfer, FIG. 23V, from digital processing unit 45 to protocol converter 57 and then a serial data transfer, FIG. 23T, from protocol converter 57 to encryption unit 53. The ST3I signal of FIG. 23F is first supplied to /O5R_ST3I input of erasable programmable logic device 89 and then through the Exclusive-OR circuit 169 of configuration mode circuit 123, FIG. 12a, to O5R_ST3I input of the command send circuit 115. Command send circuit 115, in response to the ST3I signal of FIG. 23F, generates the request to send command of FIG. 23E (hexadecimal three). The request to send command of FIG. 23E is supplied through multiplexer 131 and send command bus 86 to transmitter 83 for transmission to encryption unit 53. Encryption unit 53, in response to the request to send command of FIG. 23E provides a clear to send command, FIG. 23H, via receiver 81 and receive command bus 91 to the RTC0-RTC3 inputs of erasable programmable logic device 89. Receive command decode circuit 119 decodes the clear to send command of FIG. 23H which causes its R_CTS output to transition from a logic zero state to a logic one state. This logic zero to one transition which is provided through AND gate 305 to the clock input of Flip-Flop 309, causes Flip-Flop 309 to clock the logic one at its D input to its Q output resulting in the generation of the ST40 control signal of FIG. 23G. It should be noted that the UC_UPLINK input to circuit 117 is at the logic zero state, causing the output of inverter 307 to be at the logic one state thereby enabling and gate 305.

The ST40 control signal passes through the Exclusive-OR gate 163 of configuration mode circuit 123 to the ST5I_40 output of erasable programmable logic device 89 and is then supplied to digital processing unit 45 indicating to digital processing unit 45 that the clear to send command of FIG. 23(C) has been received from encryption unit 53 and that digital processing unit 45 can now send data, FIG. 23V, to protocol converter 57.

Figure 23:
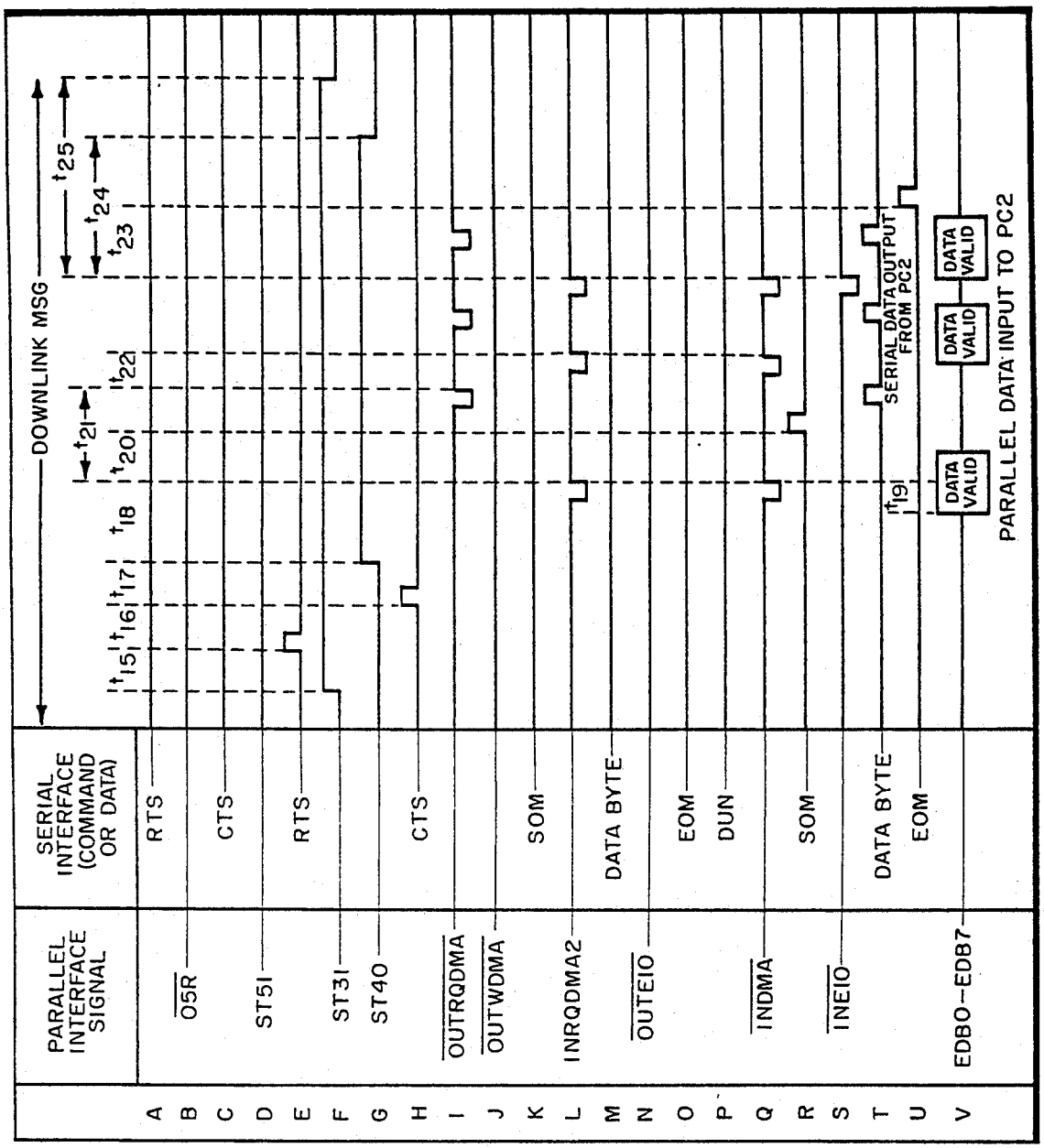
FIGS. 23A-23V illustrate the timing waveforms occurring during the transfer of data from the digital signal processing unit via the protocol converter PC2 to the encryption unit.

Digital processing unit 45 initiates the data transfer of FIG. 23 by supplying the /INDMA control signal of FIG. 23Q to protocol converter 57. The /INDMA control signal of FIG. 23Q is supplied to command receive circuit 117 of device 89 via control bus 92 within protocol converter 57. The /INDMA control signal of FIG. 23Q is first inverted by inverter 301 then passes through AND gate 303 which is enabled by the logic one occurring at the output of Flip-Flop 309, that is the ST40 signal of FIG. 23(Q). The inverted /INDMA control signal is supplied to the OI_WDMA input and is again inverted by an inverter 255 and then supplied to the clock inputs of Flip-Flops 221-235. The rising edge of each pulse of the /INDMA control signal clocks the eight parallel data bits of each data word supplied to the EDB0-EDB7 of erasable programmable logic device 89 through Flip-Flops 221-235 to the STD0-STD7 outputs of buffer circuit 127.

It should be noted that digital processing unit 45 provides the control signal INRQDMA2, FIG. 23L, in synchronous the /INDMA control signal of FIG. 23Q. However, this control signal, which is supplied to the /OI_RDMA input of NAND gate 343, will not change the state of the output of NAND gate 343 since the ST5I control signal of FIG. 23D, which is also supplied to NAND gate 343, is at the logic zero state.

The ST40 remains at the logic one state during the uplink data transmission and is cleared by the /INEIO control signal of FIG. 23S which is provided to command receive circuit 117 of erasable programmable logic device 89 by digital processing unit 45 and which is provided when digital processing unit 45 transmits the last data byte of FIG. 23V to protocol converter 57. After the /INEIO control signal of FIG. 23S is inverted by inverter 311, this signal is supplied to delay circuit 313 which delays the /INEIO control signal of FIG. 23S by approximately 670 nanoseconds and then supplies the signal to NOR gate 315. Since the /RESET input to command receive circuit 117 is at the logic one state, inverter 317 will supply a logic zero to NOR gate 315. The delayed /INEIO control signal of FIG. 23S is inverted by NOR gate 315 thereby providing a logic zero pulse to the clear input of D Flip-Flop 309. This logic zero pulse clears Flip-Flop 309 resulting in a logic one to zero transition at the Q output of Flip-Flop 309 which is the one to zero transition of ST40.

Referring now to FIGS. 2, 22A-22V, 8a-8c, 14, 15 and 16, FIGS. 22A-22V illustrate the timing waveforms for a data transfer from encryption unit 53 through protocol converter 57 to digital processing unit 45. Encryption unit 53 supplies the request to send command of FIG. 22A (hexadecimal three) to receive command decode circuit 119 of erasable programmable logic device 89 to initiate a data transfer from the encryption unit 53. Receive command decode circuit 119 decodes the request to send command of FIG. 22A transitioning its R_RTS output from the logic zero state to the logic one state. This logic zero to one transition passes through OR gate 319 within command receive circuit 117 and AND gate 321 to the clock input of D Flip-Flop 323 clocking the logic one at its D input to its Q output resulting in a logic zero to one transition at the Q output of Flip-Flop 323. Since the 3_PC2 and 1_2_PC1 inputs to command receive circuit 117 are at the logic zero state the output of OR gate 329 is at the logic zero state with this logic zero being supplied to inverter 341. Inverter 341 inverts this logic zero to a logic one enabling AND gates 335 and 337. The logic zero to one transition at the Q output of Flip-Flop 323 is inverted by inverter 339 to a logic one to zero transition which passes through AND gate 335 and OR gate 333 to the ST3I_/O5R output of circuit 117.

The logic one at the Q output of Flip-Flop 323 also passes through AND gate 337 and OR gate 347 to the input of a delay circuit 349. Delay circuit 349 which is identical to delay circuit 313 delays this logic one by approximately 670 nanoseconds and then supplies the logic one to a NOR gate 351 which inverts the logic one to a logic zero. The logic is next supplied to the reset input of Flip-Flop 323 resetting Flip-Flop 323 thereby causing a logic one to zero transition which is inverted by inverter 339 to a logic zero to one transition. This logic zero to one transition passes through AND gate 335 and OR gate 333 to the ST3I_/O5R output of circuit 117. This, in turn, is the /O5R control pulse/signal of FIG. 22B which is supplied to digital processing unit 45 indicating that encryption unit 53 is ready to send data. Digital processing unit 45, in response to the /O5R control pulse, provides the ST5I control signal of FIG. 22D indicating that digital processing unit 45 is ready to receive data from encryption unit 45. The ST5I control signal of FIG. 22D is provided through the ST40-5I input of erasable programmable logic device 89 and then through Exclusive-OR circuit 165 and through NGLITCH circuit 167 within configuration mode circuit 123 to command send circuit 115 and command receive circuit 117. Command send circuit 115, in response, to the ST5I control signal of FIG. 22D generates the clear to send command of FIG. 22D (hexadecimal four) which is supplied to encryption unit 53 and indicates that data from encryption unit 53 can be supplied to protocol converter 53, when the R_EOM signal is a logic one.

The ST5I control signal of FIG. 22D, which is at the logic one state, is supplied to the ST40_5I input of command receive circuit 117. This logic one is supplied though OR gate 354 to AND gate 355. Since the logic one at the /RESET input, which is connected to AND gate 355, is also at the logic one state, the ST5I control signal will pass through AND gate 355 to the clear input of Flip-Flop 345 allowing the logic one at the D input of Flip-Flop 345 to be clocked to its Q output, when the R_EOM signal is a logic one.

The ST5I control signal of FIG. 22D is also supplied to NAND gate 343 which results in its output remaining at the logic one state. It should be noted that the/OI-_RDMA input of command receive circuit 117 is at a logic one state and the Q output of Flip-Flop 345 is at the logic zero state when the ST5I control signal of FIG. 22D transitions from a logic zero to a logic one.

Since the/8AR_IN input and the/89R_IN inputs to command receive circuit 117 are both at the logic one state, the outputs of inverters 356 and 357 will be at the logic zero state causing the outputs of AND gates 359 and 361 to be at the logic zero state. These logic zeros are supplied to NOR gate 363 which then provides at its output a logic one which is supplied to AND gate 353. This logic one allows the logic one at the output of NAND gate 343 to pass through AND gate 353 to the FIFO_/R output of erasable programmable logic device 89. The logic one at the FIFO_/R output of erasable programmable logic device 89 is supplied to /R (Read) input of dual port memory 87 so as to allow for the storage of serial data, FIG. 22M into dual memory 87 from encryption unit 53.

Since the CONF3 input is at the logic zero state, that is protocol converter 57 is not operating in configuration three, a logic one will be supplied to AND gate 365 by inverter 367 enabling AND gate 365. The CONF3 input is also connected to an AND gate 369 resulting in a logic zero being provided to the first input of a NOR gate 371. The /RESET input is connected to NOR gate 371 through inverter 317 resulting in a logic zero being provided to the second input of a NOR gate 371. The logic zero at the R_SOM input is provided to the third input of NOR gate 371 resulting in a logic one at the output of NOR gate 371.

When the start of message command of FIG. 22K (hexadecimal one) is supplied to protocol converter 57 by encryption unit 53, receive command decode circuit 119 will decode this command and set its R_SOM output to the logic one state. This logic one is supplied to the R_SOM input of command receive circuit 117 and then passes through AND gate 365 to the third input of NOR gate 371 causing the output of NOR gate 371 to transition from the logic one state to the logic zero state. This logic zero is then supplied to the /RS (Reset) input of dual port memory 87 so as to clear dual port memory 87.

Serial Data from encryption unit is written into dual port memory 87 by the /TAXI_DSTB signal of FIG. 4(F). It should be noted that the TAXI_DSTB signal of FIG. 4(D) from receiver 81 is supplied to the TAXI-_DSTB input of erasable programmable logic device 89, inverted by inverter 136, and then supplied to the /W (Write) input of dual port memory 87. It should further be noted that an entire data message is stored in dual port memory 87 before the first data byte is retrieved from dual port memory 87 and that dual port memory 87 operates as a first in first out device which loads and empties data on a first in first out basis.

After the last byte of serial data from encryption unit 53 is written into dual port memory 87, encryption unit 53 supplies to protocol converter 57 the end of message command of FIG. 220 (hexadecimal two). Protocol converter 57 next sends the DUN command of FIG. 22P to encryption unit 53.

Referring now to FIGS. 2, 7A-7W, 8a-8c, 14, 15 and 16, FIGS. 7A-7W illustrate the timing waveforms for a data transfer from encryption unit 53 through protocol converter 57 to relay/responder/reporter 43. It should be noted that a data transfer from encryption unit 53 to dual port memory 87 and then from dual port memory 87 to relay/responder/reporter 43 is essentially identical to the data transfer illustrated in FIG. 22 and therefore will be discussed only with respect to those features of the protocol converter constituting the present invention which are pertinent to an understanding of the data transfer illustrated by FIG. 7.

Encryption unit 53 first provides the request to send command of FIG. 7E (hexadecimal three) to protocol converter 55. The logic zero to one transition supplied to command receive circuit by receive command decode circuit 119 upon decoding the request to send command clocks the Q output of D Flip-Flop 323 to the logic one state. This logic one, which passes through AND gate 331, OR gate 333 to the ST3I_/O5R output of command receive circuit 117. It should be noted that the 1_2_PC1 input of command receive circuit is a logic one which is supplied through OR gate 329 to AND gate 331 enabling AND gate 331.

This logic one is the ST3I control signal of FIG. 7F and is provided by erasable programmable logic device 89 via control bus 92 to relay/responder/reporter 43. Relay/responder/reporter 43 responds with the ST40 control signal of FIG. 7G which is provided via configuration mode circuit 123 to command send circuit 115 and command receive circuit 117. Command send circuit, in response to the ST40 control signal of FIG. 7G generates the clear to send command of FIG. 7H (hexadecimal four) which is supplied to encryption unit 43 via transmitter 83. The clear to send command of FIG. 7H, in turn initiates a data transfer from encryption unit 53 to relay/responder/reporter 43.

Encryption unit 53 next supplies the start of message command of FIG. 7R (hexadecimal one) to protocol converter 55. Receive command decode circuit 119 upon receiving the start of message command of FIG. 7R decodes the command transitioning its R_SOM output from the logic zero sate to the logic one state. This logic zero to one transition is supplied to the R_SOM input of command receive decode circuit 117 and then passes through AND gate 365 to NOR Gate 371. Since the output of inverter 317 is at the logic zero state and the output AND gate 369 is at the logic zero state, the first two inputs to NOR gate 371 will be at the logic zero state resulting in the logic zero to one transition occurring at the third input of NOR gate 371 transitioning the output of NOR gate 371 from a logic one to a logic zero. This logic zero is supplied to the /RS input of dual port memory 87 resetting dual port memory 87.

At this time it should be noted that dual port memory 87 is reset initiated by a start of message command when the protocol converter of the present invention is operating in configuration one or two or by a request to send command when the protocol converter is operating in configuration three.

After the start of message command has reset dual port memory 87, serial Data, FIG. 7T, is strobed into dual port memory by the/TAXI_DSTB signal of FIG. 4(F). When serial data is written into dual port memory 87, the /EF (Empty Flag) output of dual port memory 87 will transition to the logic one state. This logic one is supplied through the FIFO_/EF input of circuit 117 to inverter 377 which inverts the logic one to a logic zero thereby inhibiting AND gate 373. In addition, the logic one is supplied to AND gate 379 enabling AND gate 379.

After the last byte of serial data from encryption unit 53 is written into dual port memory 87, encryption unit 53 supplies to protocol converter 57 the end of message command of FIG. 7U. The end of message command of FIG. 7U is first decoded by receive command decode circuit 119 which transitions its R_EOM output from a logic zero to a logic one. This logic zero to one transition is next supplied through the R_EOM input of command receive circuit 117 to the clock input of D Flip-Flop 345 causing Flip-Flop 345 to clock the logic one at its D input to its Q output. This logic one is, supplied to AND gate 373 enabling AND gate 373 and NAND gate 343.

Since the ST40_5I of command receive circuit 117 is at the logic one state, that is the ST40 signal of FIG. 7G is a logic one, and the Q output of Flip-Flop 345 is at the logic one state, the /OUTRQDMA control signal, FIG. 7I, will pass through and be inverted by NAND gate 343 and then pass through AND gate 353 to the FIFO_/R output of command receive circuit 117.

The inverted /OUTRQDMA control signal is next supplied to /R (Read) input of dual port memory 87 with the logic zero portion of the inverted /OUTRQDMA control signal being utilized to clock each data byte from dual port memory 87 onto parallel data bus 88 with the data bytes being latched to the Q0-Q7 outputs of dual port memory 87. It should be noted that the first data byte provided to parallel data bus 88 from dual port memory 87 is latched to the Q0-Q7 outputs of dual port memory 87 prior to command receive circuit 117 generating the /INRQDMA2 and the /INDMA control pulses/signals respectively of FIGS. 7M and 7Q. These /INRQDMA2 and /INDMA control pulses are, in turn, used to write data from parallel data bus 88 into relay/responder/reporter 43. It should also be noted that the /OUTRQDMA control signal, FIG. 7I, is an acknowledgement from relay/responder/reporter 43 that it has received a parallel byte of data, FIG. 7W from protocol converter 55.

Figure 7:
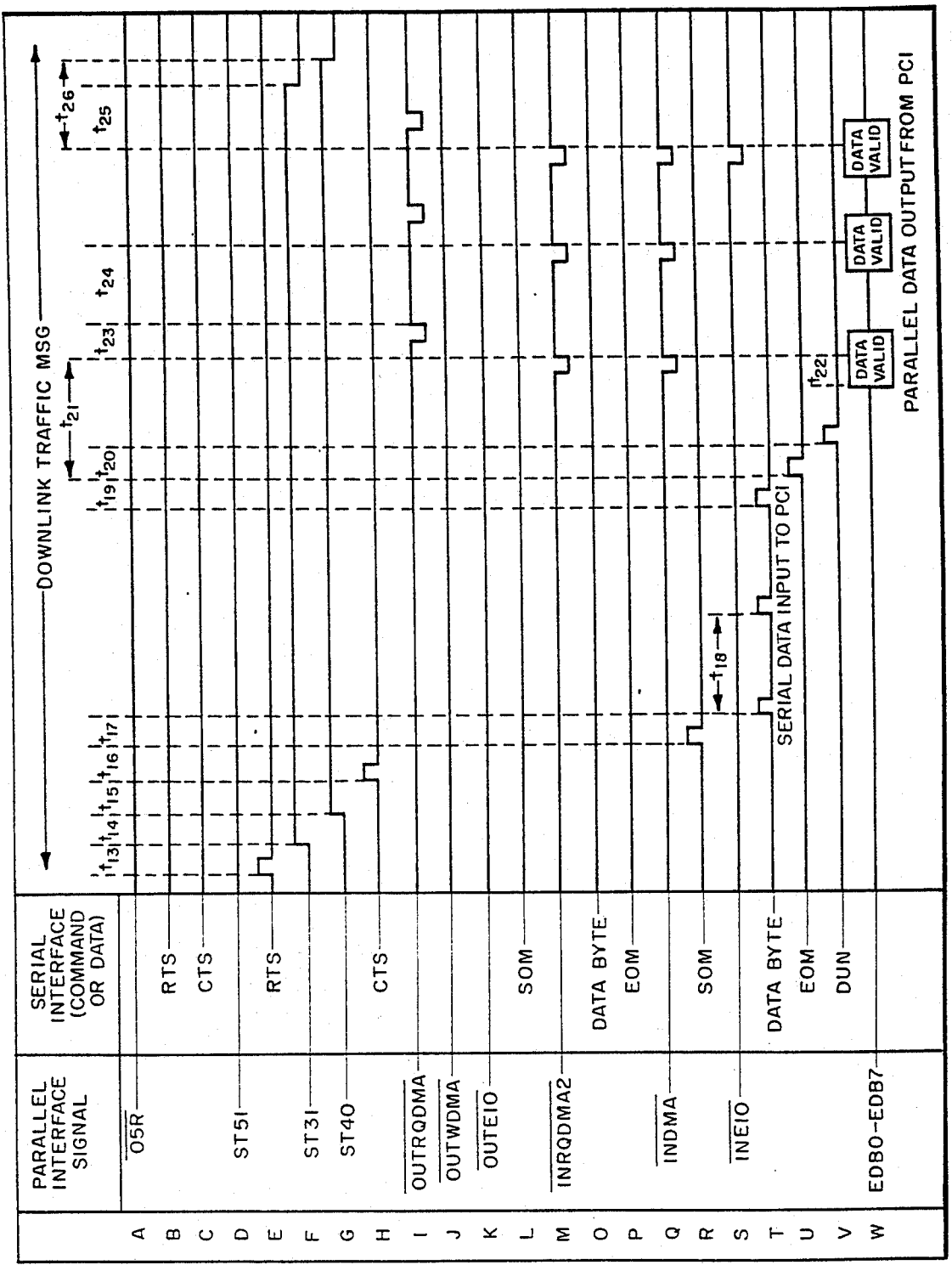
FIGS. 7A-7W illustrate the timing waveforms occurring during a transfer of data from the encryption unit via the protocol converter PC1 to the relay/responder/reporter.
Figure 18:
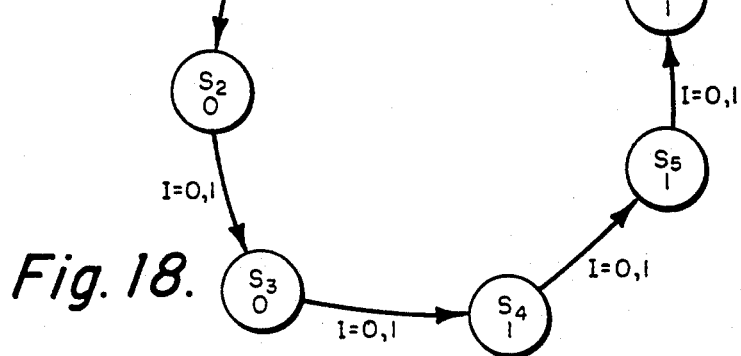
FIG. 18 is a state machine diagram for the D pulse circuit of FIG. 15.

The /INRQDMA2 and /INDMA control signals of FIG. 7 are generated by the D_PULSE circuit 383 of FIG. 15 with the state machine for D_PULSE circuit 383 being illustrated in FIG. 18. Appendix B (not printed, incorporated by reference) is a program listing for the state machine of FIG. 18 which was generated using a computer software program entitled "MAX+PLUS AHDL (Altera High-level Description Language)" and which is available from Altera Corporation of San Jose, Calif., the manufacturer of erasable programmable logic device 89.

After the last byte of serial data, FIG. 7T, from encryption unit 53 is written into dual port memory 87, encryption unit 53 supplies to protocol converter 55 the end of message command of FIG. 7U (hexadecimal two). The end of message command of FIG. 7U is first decoded by receive command decode circuit 119 which transitions its R_EOM output from a logic zero to a logic one. This logic zero to one transition is next supplied through the R_EOM input of command receive circuit 117 to the clock input of D Flip-Flop 345 causing Flip-Flop 345 to clock the logic one at its D input to its Q output. This logic one is supplied to AND gate 373 and NAND gate 343.

When NAND gate 343 receives this logic one from Flip-Flop 345, the output of NAND gate 343 transitions from a logic one to a logic zero, since the ST40_5I input, FIG. 7G, and /OI—RDMA input, FIG. 7I, of command receive circuit 117 are at the logic one state. This logic one to zero transition is inverted by inverter 381 resulting in a logic zero to one transition occurring at the input of D—PULSE circuit 383.

As is best illustrated by FIG. 18, upon receiving a logic zero to one transition at its input, the output of D—PULSE circuit 383 will remain at a logic zero for four clock pulses of the 6 MHz (megahertz) clock signal of FIG. 5(A) which is approximately 670 nanoseconds and then transition to the logic one state for three clock pulses of the 6 MHz clock signal of FIG. 5(A) which is approximately 500 nanoseconds. It should be noted that each transition between states $S_0$ to $S_7$ is one clock pulse of the 6 MHz clock signal and the output of each state $S_0$ through $S_7$ each shown below each state, while the input between states is designated by the reference letter I.

This 500 nanosecond pulse generated by $D_{13}$ PULSE circuit 383 is supplied through AND gate 379 to NOR gate 375 and 376 which invert the pulse thereby generating the first logic zero pulse of the /INRQDMA2 and /INDMA control signals of FIG. 7.

Relay/responder/reporter 43, responsive to the /INRQDMA2 and /INDMA control signals of FIG. 7, supplies the /OUTRQDMA control signal of FIG. 7I to protocol converter 55.

The /OUTRQDMA control signal of FIG. 7I, which is inverted by NAND gate 343 is again inverted by inverter 381 and then supplied to the input of D— PULSE circuit 383. In response to the first logic one pulse of the inverted /OUTRQDMA control signal of FIG. 7I, D—PULSE circuit 383 provides a second 500 nanosecond pulse which upon passing through NOR gates 375 and 376 is the second logic zero pulse of the /INRQDMA2 and /INDMA control signals of FIG. 7.

When the last byte of data, FIG. 7W, is read from dual port memory 87, the/EF (empty flag) output of dual port memory 87 transitions to the logic zero state. This logic zero is then supplied through the FIFO—/EF input of command receive circuit to inverter 377 which inverts the logic zero to a logic one causing the output of AND gate 373 to transition from a logic zero to a logic one. The logic zero to one transition next passes through OR gate 384 to the input of PULSE3 circuit 386.

Figure 15A:
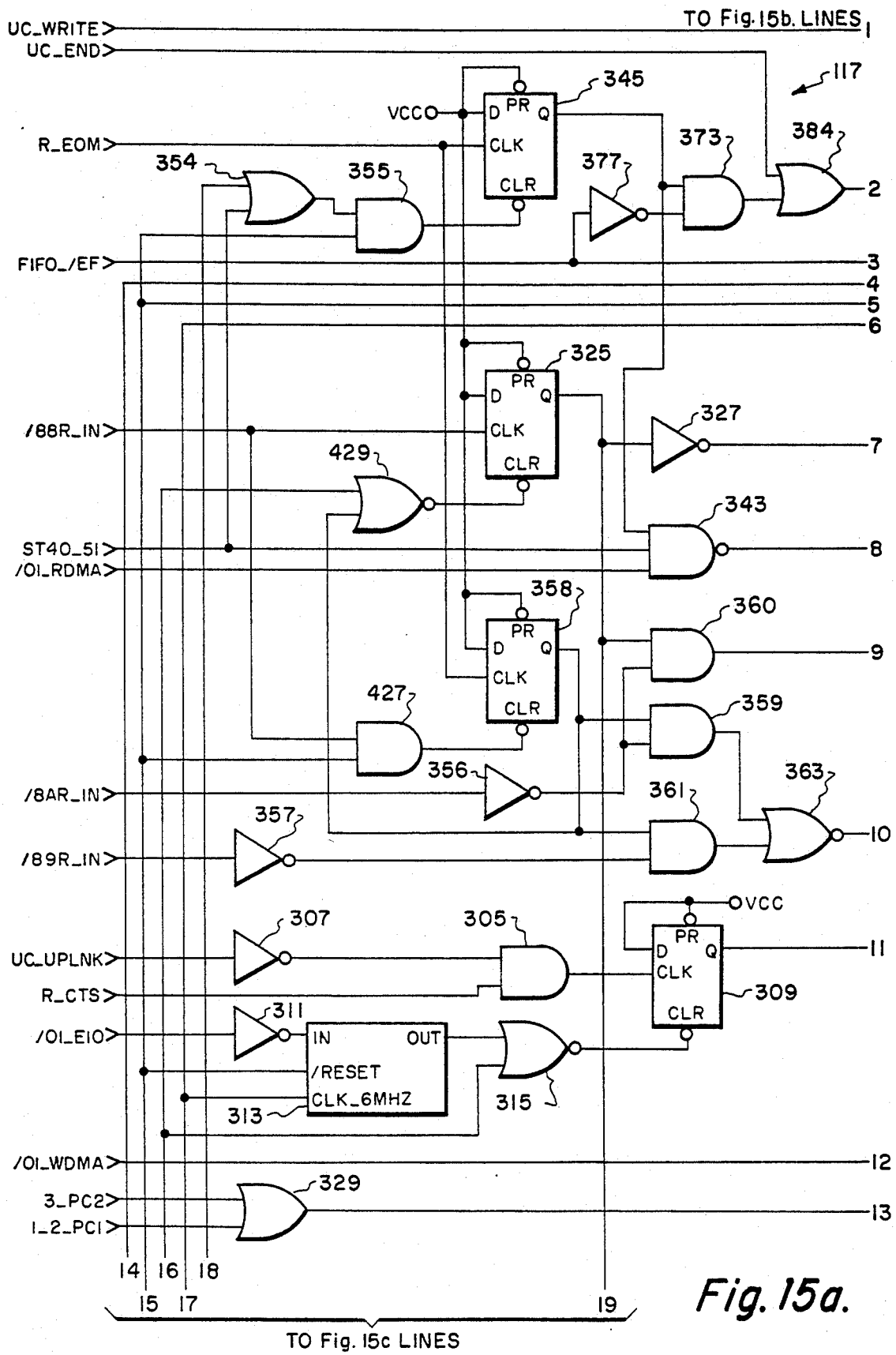
FIG. 15a-15e is a detailed electrical schematic of the command receive circuit of FIG. 8.
Figure 15B:
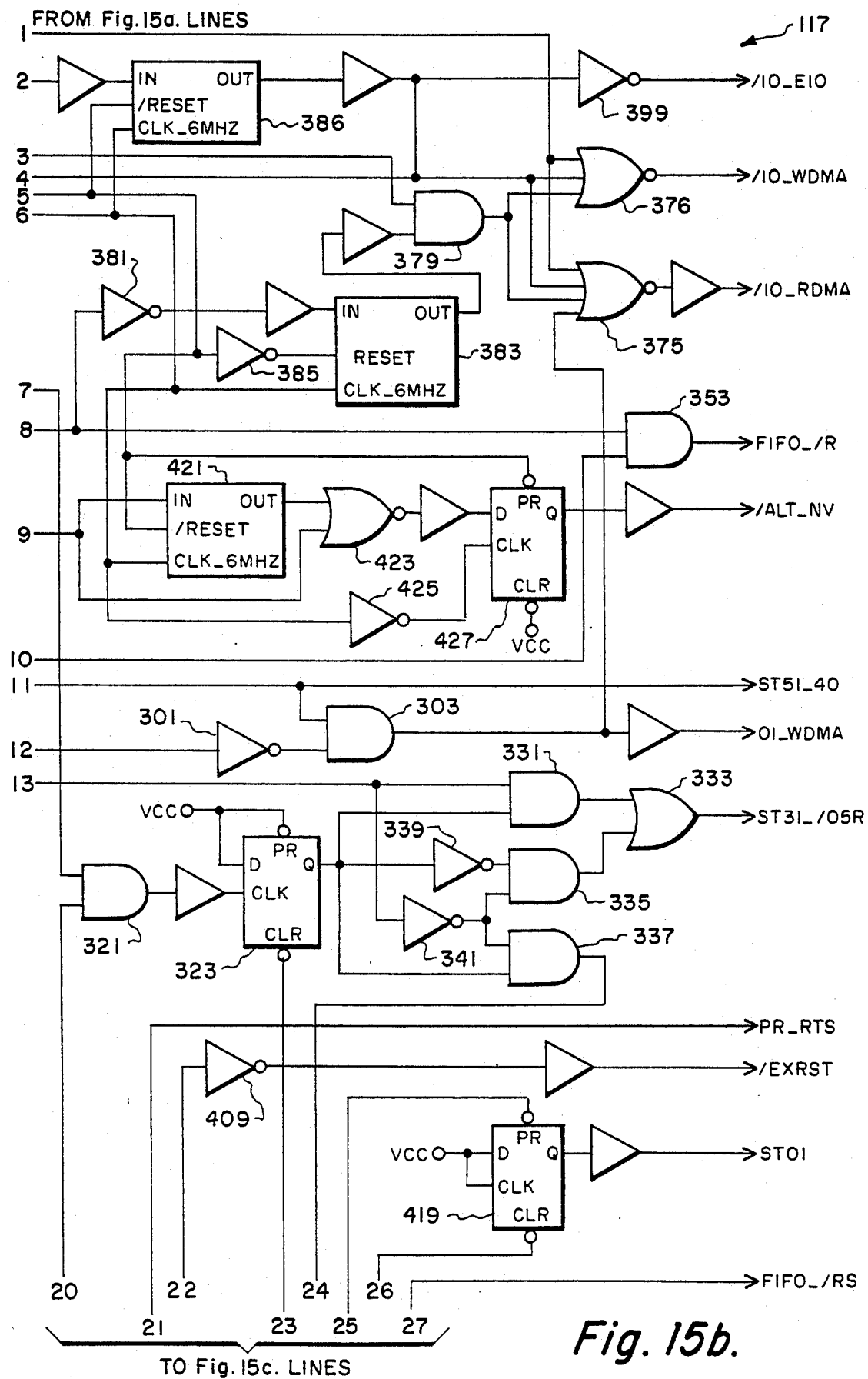
Figure 15C:
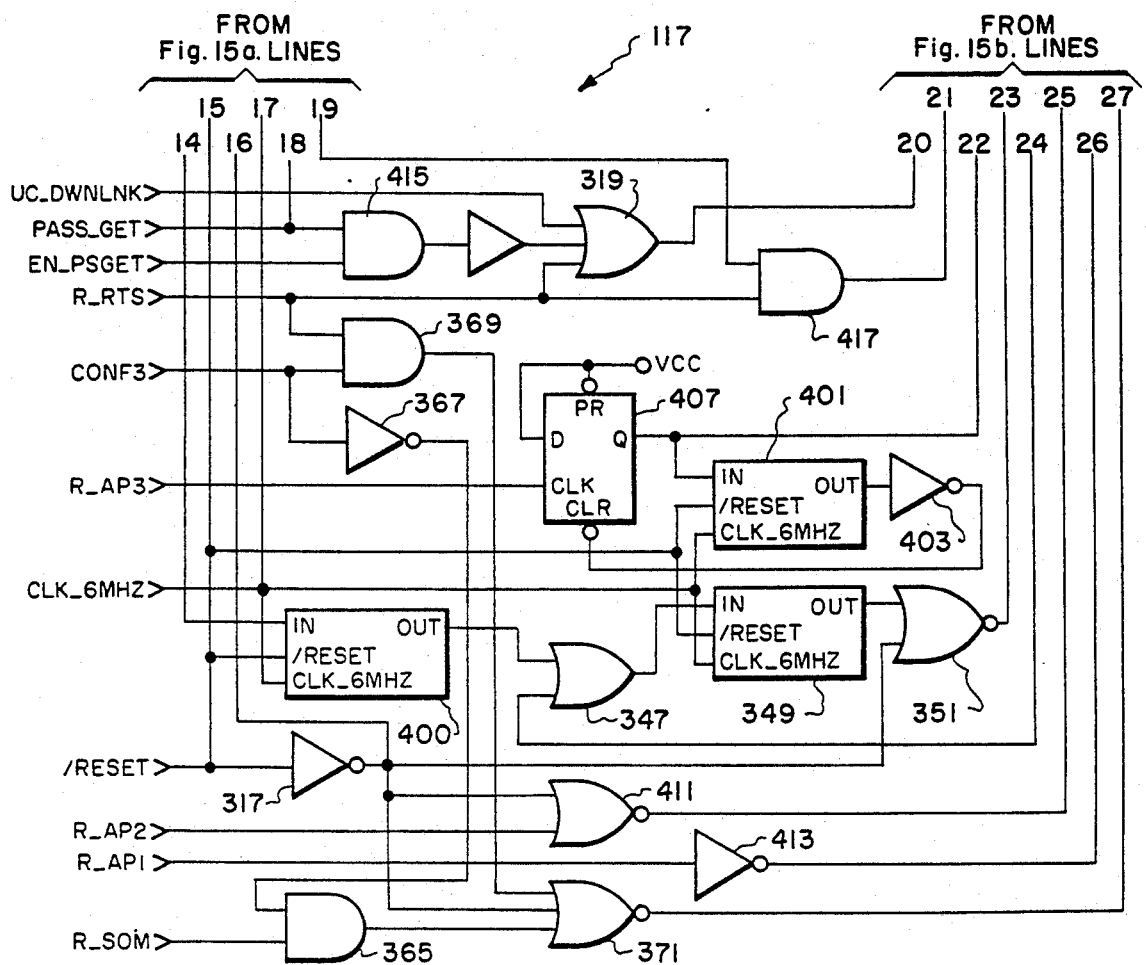
Figure 15D:
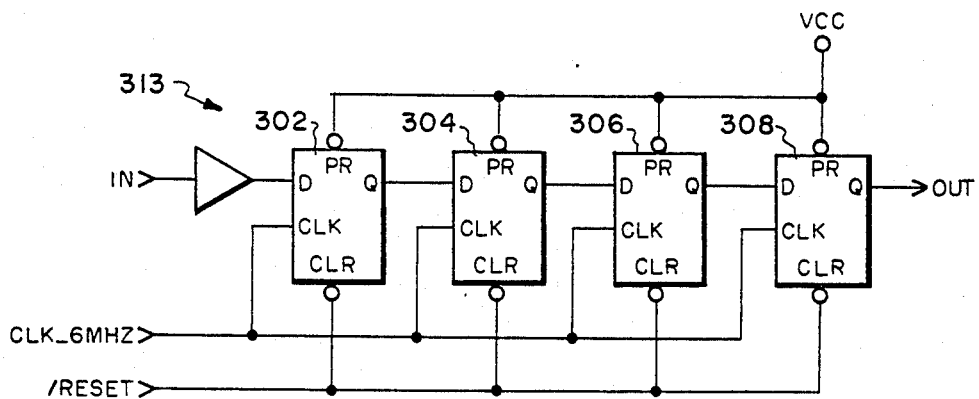
Figure 15E:
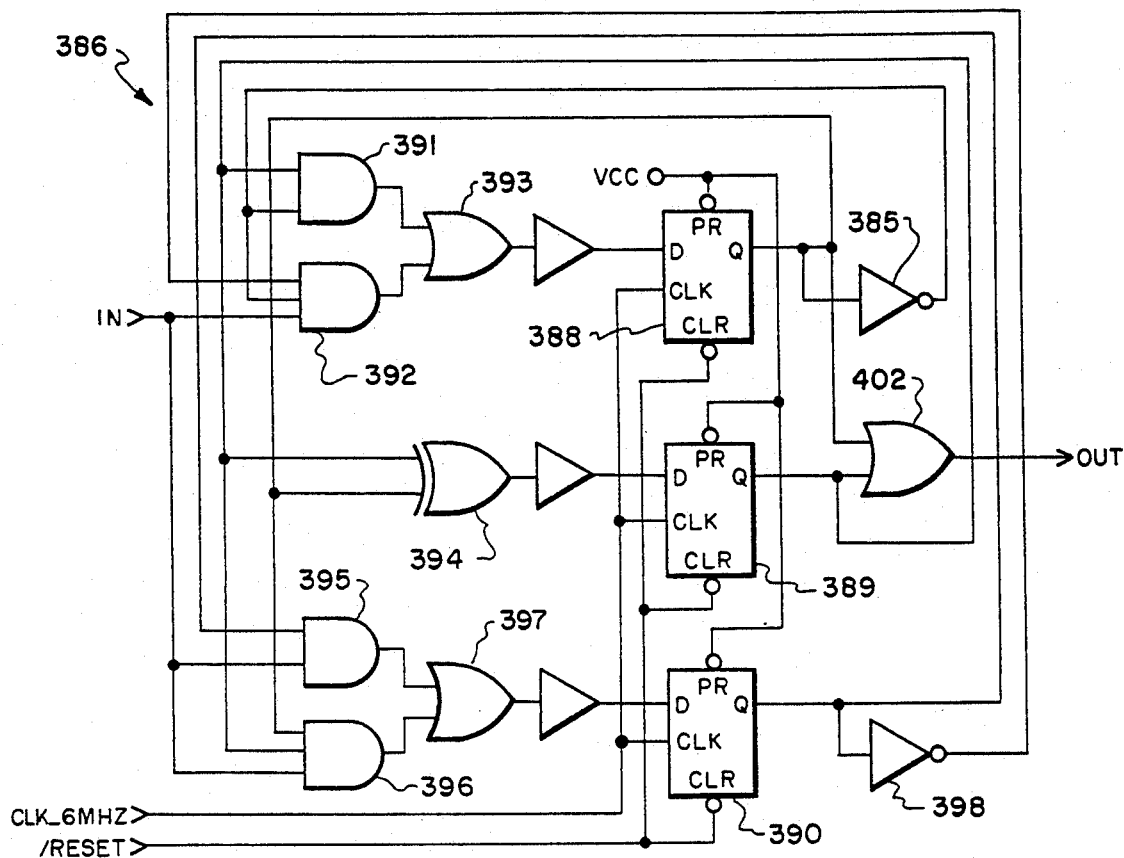
Figure 16:
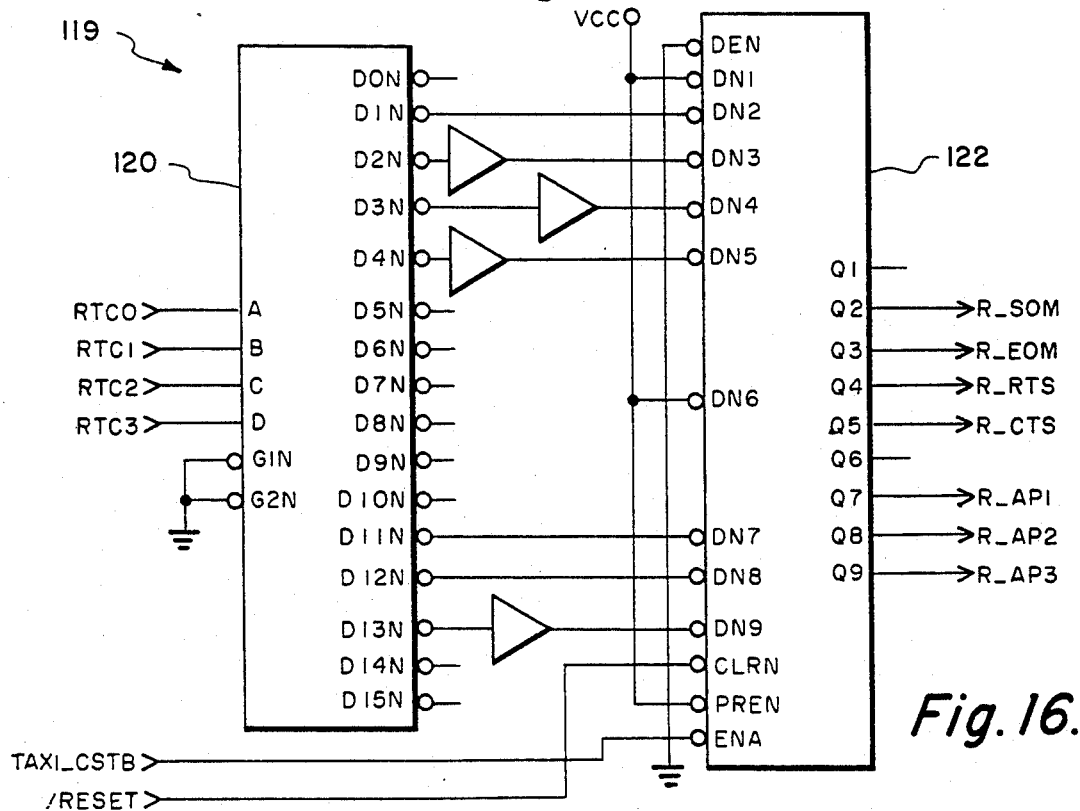
FIG. 16 is a detailed electrical schematic of the receive command decode circuit of FIG. 8.

As shown in FIG. 15e, PULSE3 circuit 386 comprises three D Flip-Flops 388, 389 and 390 which are used in combination with the logic circuitry of PULSE3 circuit 386 to generate a 500 nanosecond pulse upon receiving a logic one at its input. The logic equations for PULSE3 circuit 386 are set forth as follows:

$$D_1 = /Q_1 Q_2 + /Q_1 /Q_3 I \quad (1)$$

$$D_2 = Q_1 \oplus Q_2 \quad (2)$$

$$D_3 = Q_3 I + Q_1 Q_2 I \quad (3)$$

$$OUT = Q_1 + Q_2 \quad (4)$$

where $D_1$ is the output of OR gate 393, $D_2$ is the output of Exclusive-OR circuit 394, $D_3$ is the output of OR gate 397 and $Q_1$, $Q_2$ and $Q_3$ are respectively the Q outputs of Flip-Flop 388, 389 and 390.

Figure 17:
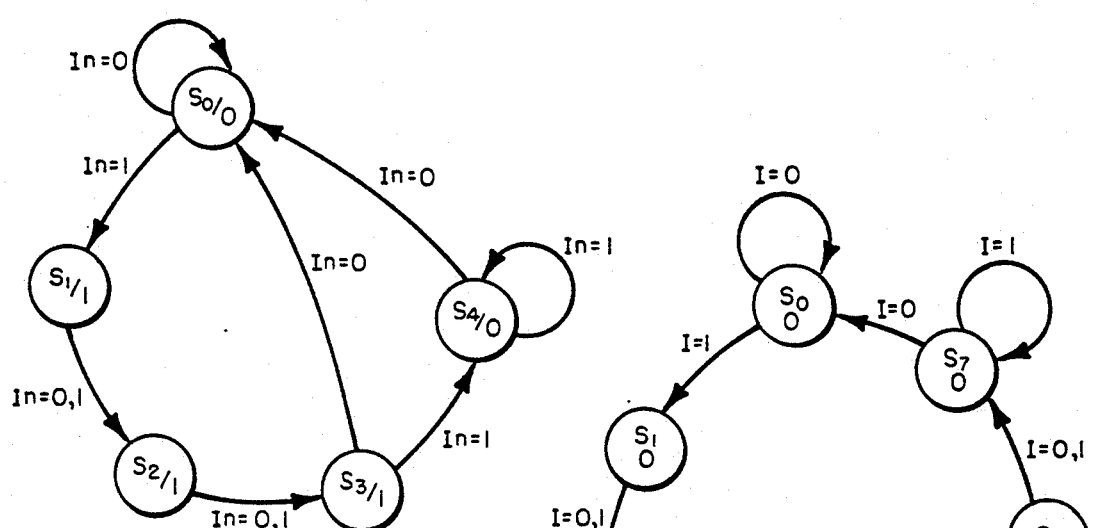
FIG. 17 is a state machine diagram for the pulse three circuit of FIG. 15.

As is best illustrated by the state machine diagram of FIG. 17 when the input to PULSE3 circuit 386 transitions to the logic, the output of PULSE3 circuit 386 transitions to the logic one state and will remain at the logic one state for three clock pulses of the 6 MHz clock signal of FIG. 5(A), thereby providing at its output a 500 nanosecond pulse. This duration of this pulse will be 500 nanoseconds irregardless of whether the input is a logic one ($S_3$ to $S_4$ transition) or a logic zero ($S_3$ to $S_0$ transition). It should also be noted that the of Flip-Flops 390, 389 and 388 are respectively 0,0,0 during state $S_0$, 0,0,1 during state $S_1$, 0,1,0 during state $S_2$, 0,1,1 during state $S_3$ and 1,0,0 during state $S_4$.

The 500 nanosecond pulse generated by PULSE3 circuit. 386 is supplied to inverter 399 which inverts the pulse thereby providing at the/IO—EIO output of command receive circuit 117, the INEIO control pulse of FIG. 7S, which functions as an end of message signal. The INEIO control pulse of FIG. 7S, is next supplied to relay/responder/reporter 43 so as to indicate to relay/responder/reporter 43 that the last byte of data, FIG. 7W, from dual port memory 87 is being transferred to relay/responder/reporter 43.

The 500 nanosecond pulse generated by PULSE3 circuit 386 is also supplied to NOR gates 375 and 376 which each invert the pulse thereby providing at the/IO—WDMA and /IO—RDMA outputs of command receive circuit 117 respectively the last pulse of the /INDMA, FIG. 7Q and /INREQDMA, FIG. 7M, control signals.

The logic zero from the /EF output of dual port memory 87 is also supplied through the FIFO—/EF input of command receive circuit to AND gate 379 inhibiting AND gate 379. This inhibiting of AND gate 379 prevents the last 500 nanosecond pulse generated by D—PULSE circuit 383 in response to the last pulse of /OUTRQDMA, FIG. 7I, from passing through AND gate 379 to NOR gates 375 and 376.

The 500 nanosecond pulse generated by PULSE3 circuit 386 is also supplied to delay circuit 400 which is identical to circuit 313, FIG. 15d, and which delays the pulse by approximately 670 nanoseconds. The delayed pulse then passes through OR gate 347 to delay circuit 349 which also delays the 500 nanosecond pulse again by 670 nanoseconds and then supplies the delayed pulse to NOR gate 351. NOR gate 351 inverts the delayed pulse and supplies the inverted pulse to the clear input of D Flip-Flop 323 thereby clearing Flip-Flop 323 which causes its Q output to transition from a logic one to a logic zero. This logic zero when supplied to AND gate 323 causes AND gate 323 to transition to the logic zero state which, in turn, causes OR gate 333 to go to a logic zero, thereby providing the logic one to zero transition of the ST3I control signal of FIG. 7F. Relay/responder/reporter 43 will then transition the ST40 control signal to the logic zero state as is best illustrated by FIG. 7G.

Figure 19B:
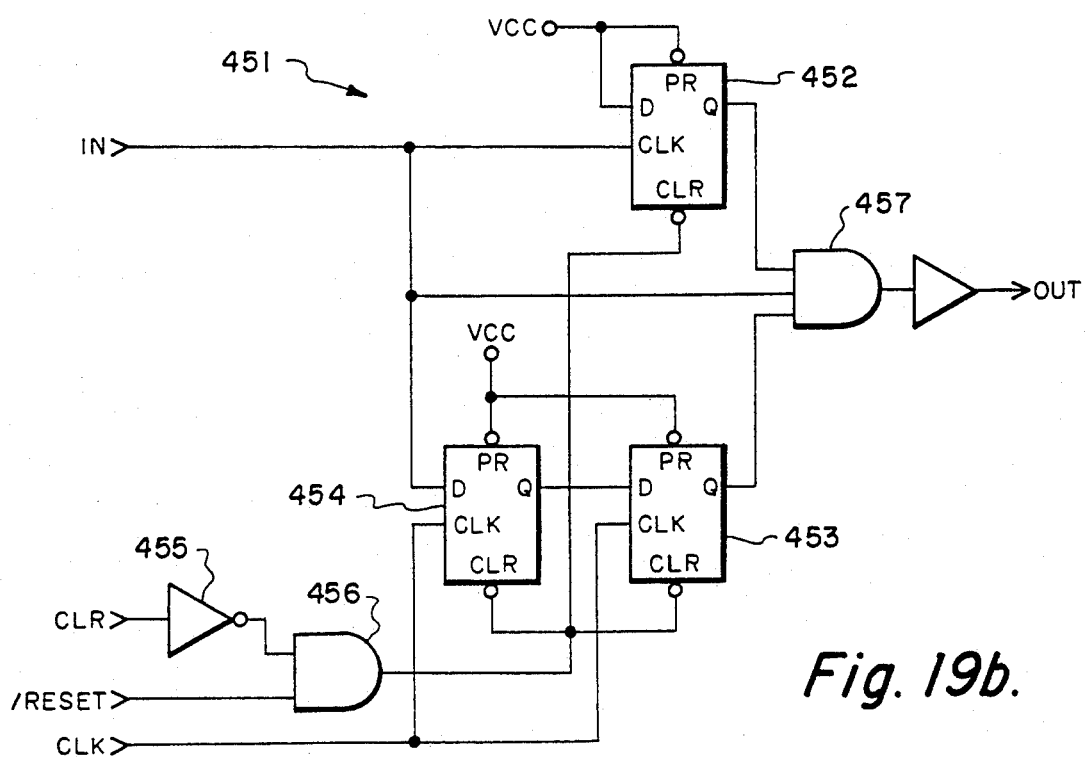
FIGS. 19a-19c are a detailed electrical schematic of the command send circuit of FIG. 8.
Figure 19A:
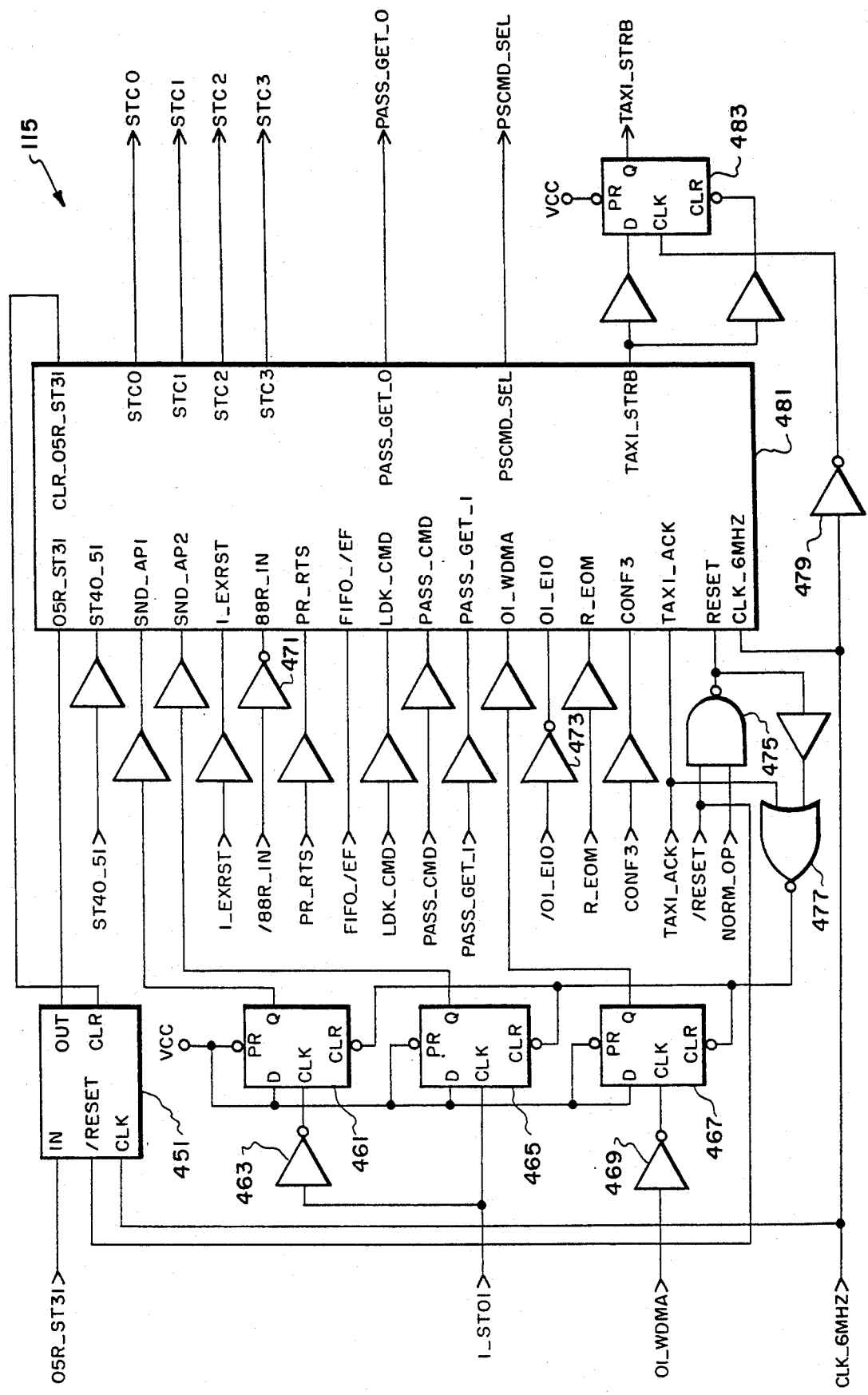
Figure 20:
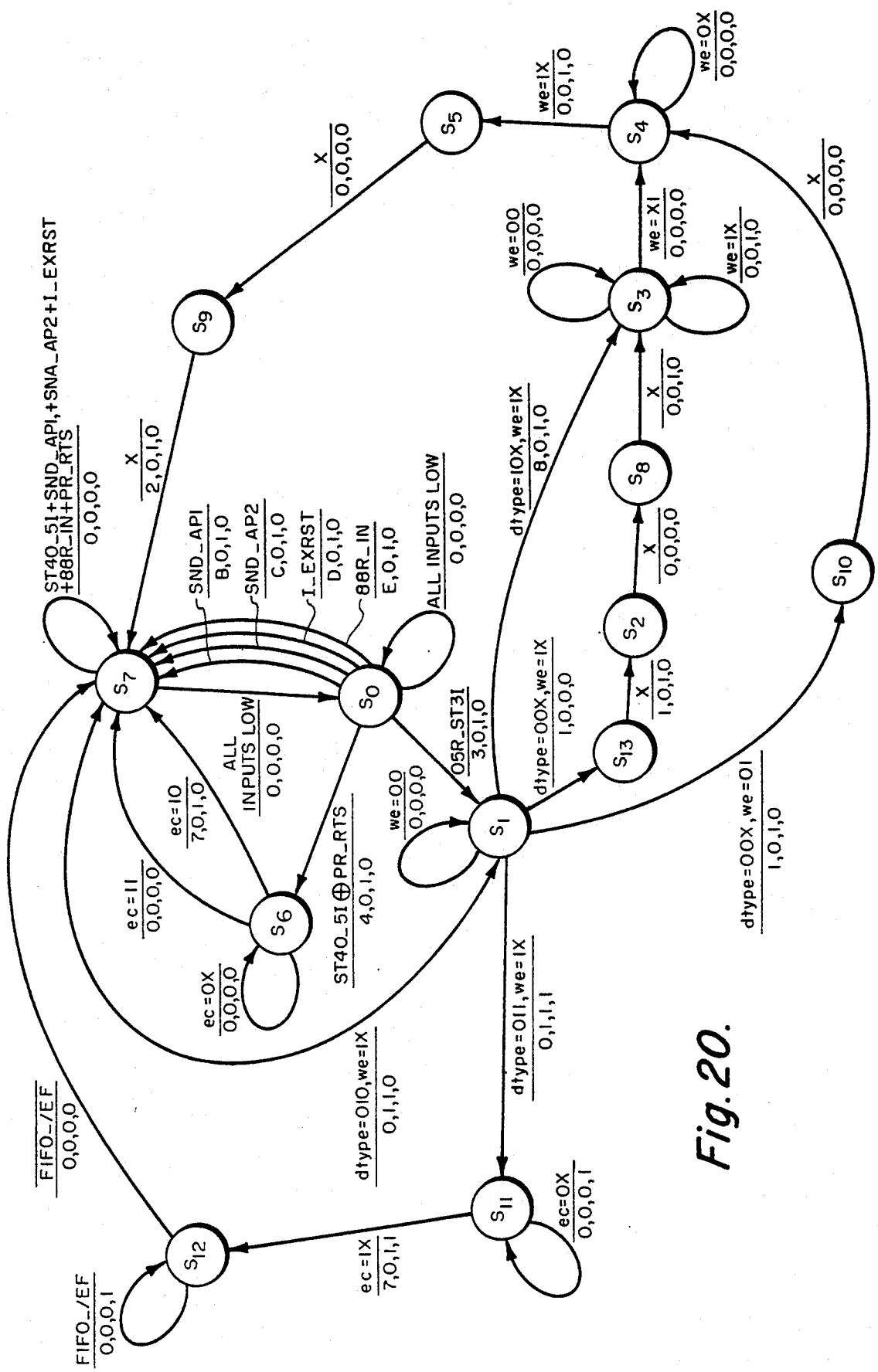
FIG. 20 is a state machine diagram for the command send circuit of FIG. 19.

Referring now to FIGS. 2, 6A–6W, 8a–8c, 19a, 19b and 20, the /O5R control signal of FIG. 12A is provided by relay/responder/reporter 43 through Exclusive-OR circuit 169, FIG. 12a, which inverts the/O5R control signal and to the signal input of a SET-CLEAR circuit 451. The logic zero to one transition of the O5R control signal when supplied to the clock input of Flip-Flop 452, clocks the logic one at the D input of Flip-Flop 452 to the Q output thereof. This logic one is then supplied to the first input of AND gate 457. The O5R control signal is also supplied to the second input of AND gate 457, while the 6 MHz system clock signal of FIG. 5(A) clocks the logic one state of the O5R control signal through Flip-Flops 454 and 453 to the third input of AND gate 457 causing the output of SET-CLEAR circuit 451 to transition to the logic one state. This logic one is then supplied to the O5R_ST3I input of send command circuit 481, the state machine for which is illustrated by FIG. 20.

At this time it should be noted SET-CLEAR circuit 451. functions as a filter by not allowing positive going glitches less than one clock cycle in duration, that is less than 167 nanoseconds from passing through SET-CLEAR circuit 451. It should also be noted that SET-CLEAR circuit 451 may be reset by logic one clear pulse provided by send command circuit 481 which is inverted by inverter 455 and then supplied through AND gate 456 to the clear inputs of Flip-Flips 452, 453 and 454. In addition, Flip-Flips 452, 453 and 454 are reset by the reset pulse from clock-reset circuit 101 which is supplied to the /RESET input to command send circuit 115.

The control signal STOI will either set D Flip-Flop 461 on a high to low transition or D Flip-Flop 465 on a low to high transition. In a like manner, the logic one to zero transition of the /OUTWDMA control signal of FIG. 6J or the /INDMA control signal of FIG. 23Q sets the Q output of Flip-Flop 467 to the logic one state. It should be noted that Flip-Flop 467 is clocked by a logic zero to one transition provided by inverter 469 which inverts the/OUTWDMA control signal of FIG. 6J or the/INDMA control signal of FIG. 23Q. In addition, it should be noted that Flip-Flops 461, 465 and 469 are cleared by the reset pulse from clock-reset circuit 101 or the TAXI_ACK signal of FIG. 5(D).

Send command circuit 115 has four outputs STC0-STC3 which provide four bit hexadecimal commands such as the request to send of FIG. 6B to encryption unit 53. Send command circuit 115 also has a PASS_GET_0 output for providing a logic one Pass-_Get_0 signal; a PSCMD_SEL output for providing a logic Pass Command Select signal and a TAXI_STRB output for providing the TAXI_STRB signal of FIG. 5(C) to transmitter 83. The TAXI_STRB signal from send command circuit 481 is, in turn, clocked through Flip-Flop 483 by the trailing edge of the 6 MHz clock signal of FIG. 5(A).

The Pass Command Select logic one signal is supplied through an OR gate 135 to the SEL input of multiplexer 131 allowing a four bit command at the B1, B2, B3 and B4 inputs to pass through multiplexer 131 to its Y1, Y2, Y3 and Y4 outputs. A logic one from the UC_CMD output of microcontroller decode circuit 125 will also allow a four bit command at the B1, B2, B3 and B4 inputs to pass through multiplexer 131 to its Y1, Y2, Y3 and Y4 outputs. This allows for essentially direct communications between microcontroller 95 and relay/responder/reporter 43 or digital processing unit 45 and encryption unit 45.

When the select input is at the logic zero state the four bit command from command send circuit 115 will pass through multiplexer 131 to the STC0-STC3 outputs of erasable programmable logic device 89.

At this time it should be noted that the MAX+PLUS AHDL software, Version 2.51, used to program erasable programmable logic device 89 has the capability to implement the functional equivalent of SN74157 Quadruple 2-Line to 4-Line Selectors/multiplexers available from Texas Instruments and several other well known manufacturers of logic circuits. Other examples of commercially available logic circuits implemented by erasable programmable logic device 89 are the SN74154 4-Line to 16-Line Decoder Multiplexer (decoder 120), the SN74844 9-Bit Bus Interface D-Type Latches with 3-State Outputs (latch 122) and the SN74139 Dual 2-Line to 4-Line Decoders/Demultiplexers also available from Texas Instruments and several other well known manufacturers of logic circuits.

Figure 19C:
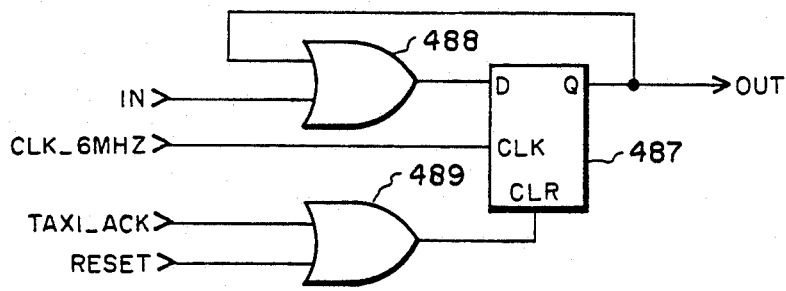

Referring now to FIGS. 19a 19c and 20 each output from circuit 481, except the CLR_O5R_ST3I and PASS_GET_0 outputs, is the logic equivalent of the logic circuit diagram illustrated by FIG. 19c. For example, when the state machine of FIG. 20 generates a logic one TAXI_STRB pulse, this pulse passes through the first input of OR gate 488 to the D input of Flip-Flop 487. The 6 MHz system clock signal, FIG. 5(A) then clocks the TAXI_STRB pulse to the Q output of Flip-Flop 487 with the logic one being supplied to the second input of OR gate 488. The Q output of Flip-Flop 487 will remain at the logic one state until the TAXI_ACK pulse of FIG. 5(D) or the reset pulse from clock-reset circuit 101 is supplied through OR gate 849 to the clear input of Flip-Flop 487.

Referring to FIG. 20 the key for the state machine of FIG. 20 is set forth in the following table.

TABLE II

KEY FOR STATE MACHINE, FIG. 20 dtype = LDK_CMD, PASS_CMD, PASS_GET_I
we = OI_WDMA, OI_EIO
ec = R_EOM, CONF3
X - DON'T CARE
⊕ - EXCLUSIVE OR
OUTPUT = STC3-STC0, PSCMD_SEL, TAXI_STRB, PASS_GET_0
INPUT/OUTPUT (STATE TRANSITION FORMATS)
CLR_O5R_ST3I = 1 $S_7 + S_6 + S_1$
CLR_O5R_ST3I = 0 $\overline{S_7} \cdot \overline{S_6} \cdot \overline{S_1}$ With respect to the uplink message transfer of FIG. 6, the state machine of FIG. 20 operates in the following manner. Upon receiving an O5R logic one signal at the input O5R_ST3I input of send command circuit 481 the state machine of FIG. 20 transitions from state $S_0$ to state $S_1$ providing at the STC0-STC3 outputs of send command circuit 481 the request to send command of FIG. 6B (hexadecimal 3). The TAXI_STRB signal of FIG. 5(C), which clocks the request to send command into transmitter 83 for transmission to encryption unit 53 is generated by send command circuit 481 during the state $S_0$ to state $S_1$ transition.

The trailing edge of the /OUTWDMA control signal is used to clock a logic one from the D input to the Q output of Flip-Flop 467 which when supplied to the OI_WDMA input of circuit 481 transitions the state machine of FIG. 20 from state $S_1$ to state $S_{13}$. Send command circuit 481 will then provide at its STC0-STC3 outputs the start of message command of FIG. 6L (hexadecimal 1). The TAXI_STRB signal of FIG. 5(C), which clocks the start of message command into transmitter 83 is generated by send command circuit 481 during the state $S_{13}$ to state $S_2$ transition. The TAXI_STRB signal for the first byte of data, FIG. 5(C), to be latched into transmitter 83 is generated by send command circuit 481 during the state $S_8$ to state $S_3$ transition, while the TAXI_STRB signals for succeeding data bytes, FIG. 5(C), are generated by send command circuit 481 in response to the /OUTWDMA control signal of FIG. 6J during state $S_3$.

When the control signal /OUTEIO, FIG. 6K, is supplied to the/OI_EIO input of command send circuit 115 inverter 473 inverts the signal and then supplies the inverted /OUTEIO control signal to send command circuit 481. On the leading edge of the inverted /OUTEIO control signal send command circuit 481 transitions from state $S_3$ to state $S_4$. When the output of Flip-Flop 467 transitions from the logic zero state to the logic one state (on the trailing edge of the last pulse of the /OUTWDMA control signal) send command circuit 481 transitions from state $S_4$ to state $S_5$ generating the TAXI_STRB signal for the last byte of data, FIG. 5(C), to be latched into transmitter 83. During the transition from state $S_5$ to state $S_9$ the TAXI_STRB signal transitions to the logic zero state. During the transition from state $S_9$ to state $S_7$ send command circuit 481 generates the end of message command of FIG. 6P (hexadecimal 2) and the TAXI_STRB signal to latch the end of message command into transmitter 83. It should be noted that Flip-Flop 483 provides the delay (one half clock cycle of the 6 MHz system clock signal) to allow the end of message command to arrive at transmitter 83 before being latched into transmitter 83. The state machine of FIG. 20 next transitions to state $S_0$.

For the downlink data transfer illustrated by FIG. 7, encryption unit 53 supplies the request to send command (hexadecimal 3) of FIG. 7E to protocol converter 55, indicating that encryption unit 53 is ready to transfer data to relay/responder/reporter 43. Command receive circuit 117 of erasable programmable logic device 89 in response to the request send command of FIG. 7E sets the ST3I control signal to the logic one state and then protocol converter 55 supplies the ST3I control signal of FIG. 7F to relay/responder/reporter 43. Relay/responder/reporter 43 next supplies the ST40 control signal of FIG. 7G to erasable programmable logic device 89 within protocol converter 55.

Upon receiving the ST40 control signal of FIG. 7G at the input ST40_5I of send command circuit 481 the state machine of FIG. 20 transitions from state $S_0$ to state $S_6$ providing at the STC0-STC3 outputs of send command circuit 481 the clear to send command of FIG. 7H (hexadecimal 4). The TAXI_STRB signal of FIG. 5(C), which clocks the clear to send command into transmitter 83 for transmission to encryption unit 53 is generated by send command circuit 481 during the state $S_o$ to state $S_6$ transition.

The state machine of FIG. 20 next waits for the R_EOM input to send command circuit 481 to transition to the logic one state indicating an end of message command, FIG. 7U, (hexadecimal 2) has been supplied to protocol converter 55 by encryption unit 53. Upon receiving the logic one at the R_EOM input to send command circuit 481, the state machine of FIG. 20 transitions from state $S_6$ to $S_7$ generating the DUN command of FIG. 7V and the TAXI_STRB signal to clock the DUN command into transmitter 83 for transmission to encryption unit 53. The DUN command of FIG. 7V is an acknowledgement to the encryption unit 53 that encryption unit 53 received data, FIG. 7T from encryption unit 53. When the ST40_5I input of send command circuit 481 transitions to the logic zero state the state machine of FIG. 20 transitions from state $S_7$ to $S_0$.

It should be noted that the state machine of FIG. 20 can also transition from state $S_6$ to state $S_7$ whenever the protocol converter of the present invention is operating in configuration three. In addition, Appendix C (not printed, incorporated by reference) is a program listing for the state machine of FIG. 20 which was generated using the computer software program "MAX+PLUS AHDL (Altera High Description Language)".

Figure 26:
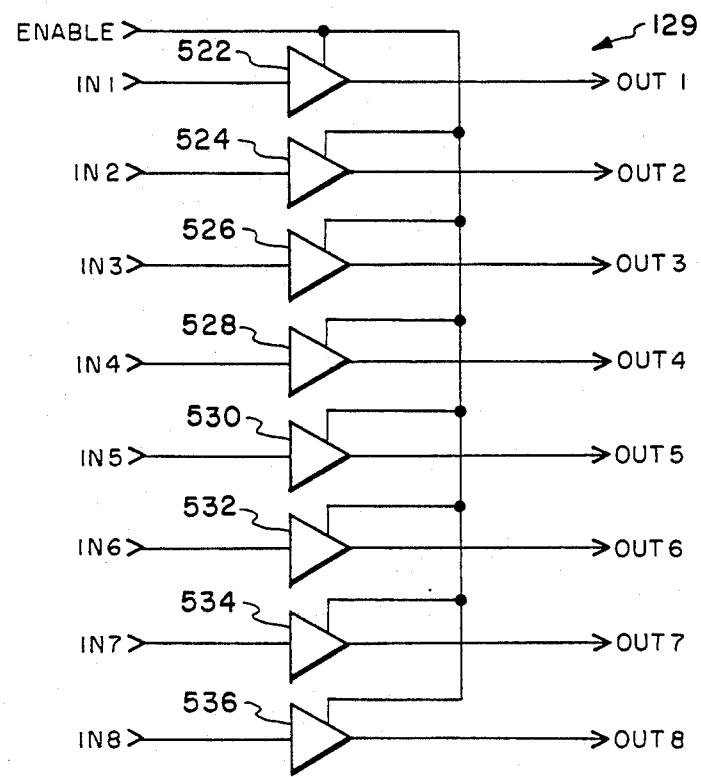
FIG. 26 is a detailed electrical schematic of the octal buffer circuit of FIG. 8.

Referring now to FIGS. 8, 13 and 26 there is shown in FIG. 26 an octal T buffer circuit 129 comprising eight tri-state buffers 522, 524, 526, 528, 530, 532, 534 and 536 which are enabled by a logic one grant signal provided by microcontroller decode circuit 125. Whenever tri-state buffers 522-536 are enabled data can pass from the STD0-STD7 inputs/outputs of erasable programmable logic device 89 to the EDB0-EDB7 inputs/outputs of device 89. This, in turn, allows microcontroller 95 within protocol converter 55 to communicate with relay/responder/reporter 43 or microcontroller 95' within protocol converter 57 to communicate with digital processing unit 45. For example, when the output of inverter 197 is a logic one, indicating communication between microcontroller 95 and digital processing unit 45 or relay/responder/reporter 43, and the ST40_5I input to decode circuit 125 is high the output of NAND gate 211 will be at the logic zero state resulting in a logic one at the output of NAND gate 213.

Figure 21:
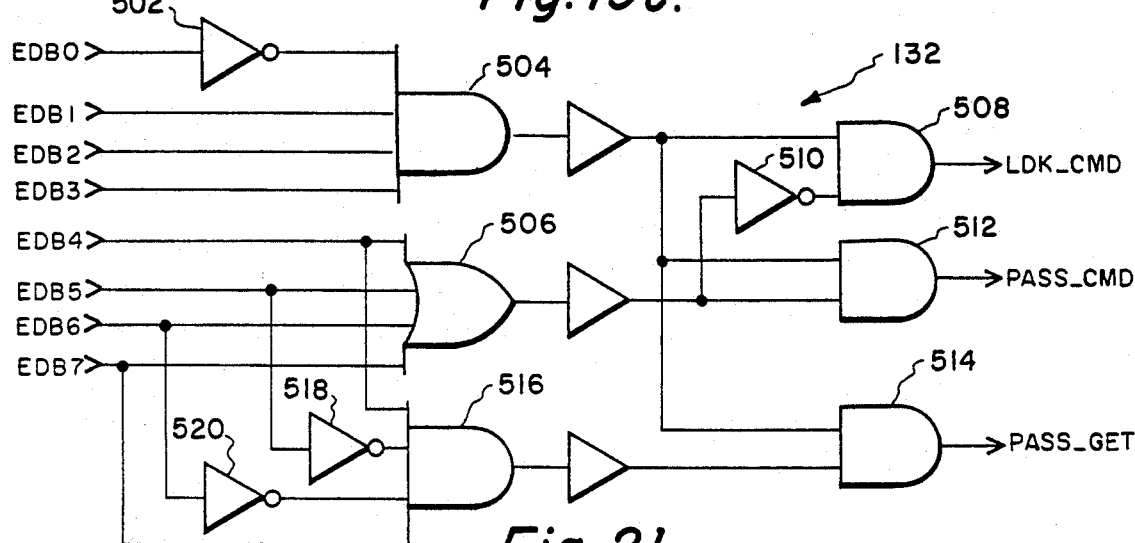
FIG. 21 is a detailed electrical schematic of the data decode circuit of FIG. 8.

Referring to FIGS. 8 and 21, data decode circuit decodes the first byte of a message, that is the first eight data bits of a message which are supplied to its EDB0-EDB7 inputs. Data decode circuit 132 then provides a logic one at its LDK_CMD output, its PASS_CMD output or its PASS_GET output. Whenever a hexadecimal 0 is supplied to inputs EDB7-EDB4 of circuit 132 and a hexadecimal E is supplied to inputs EDB3-EDB0 of circuit 132 the LDK_CMD output of circuit 132 will transition to the logic one state. Similarly, whenever hexadecimal 1 through F is supplied to inputs EDB7-EDB4 of circuit 132 and a hexadecimal E is supplied to inputs EDB3-EDB0 of circuit 132 the PASS_CMD output of FIG. 21 will transition to the logic one state. In a like manner, whenever a hexadecimal 9 is supplied to inputs EDB7-EDB4 of circuit 132 and a hexadecimal E is supplied to inputs EDB3-EDB0 of circuit 132 the PASS_GET output of circuit 132 will transition to the logic one state.

Referring to FIGS. 6, 8, 19a, 20 and 21, upon receiving an inverted /O5R control signal, FIG. 6A, the state machine of FIG. 20 will generate the request to send command of FIG. 6B during an state $S_0$ to state $S_1$ transition. The state machine of FIG. 20 then waits for a logic one at the OI_WDMA input of send command circuit 481 before transitioning from state $S_1$. Since the first data byte has been decoded by data decode circuit 132 prior to the logic zero to one transition at the Q output of Flip-Flop 467 (the time differential $T_5$ being approximately 500 nanoseconds), the LDK_CMD, PASS_CMD and/or PASS_GET inputs of circuit 481 will be at the logic one state prior to the occurrence of a logic zero to one transition at the OI_WDMA input of circuit 481. When, for example, LDK_CMD input to circuit 481 is at the logic one state and the OI_WDMA input to circuit 481, the state machine of FIG. 20 will transition from state $S_1$ to state $S_3$ causing circuit 481 to provide at the STC0-STC3 of circuit 481 a load key command which has a hexadecimal value of eight and a TAXI_STRB pulse, FIG. 5(C), which latches the load key command into transmitter 83 for transmission to encryption unit 53. The load key message is utilized to arm encryption unit 53 to allow for message transfer.

When relay/responder/reporter 43 or digital processing unit 45 sends a one byte message to encryption unit 53, the state machine of FIG. 20 will transition from state $S_1$ to state $S_{10}$ causing circuit 481 to provide a start of message command and a TAXI_STRB pulse, FIG. 5(C). The state machine will next proceed from state $S_{10}$ to state $S_4$ causing the TAXI_STRB output of circuit 481 to transition to the logic zero state with the logic zero being clocked through Flip-Flop 483 to its Q output by the 6 MHz system clock signal. The state machine then proceeds through states $S_4$, $S_5$, $S_9$ and $S_7$ to $S_0$.

When relay/responder/reporter 43 supplies a pass command to protocol converter 55, data decode circuit 132 will decode this command setting its PASS_CMD output at the logic one state. This logic one is then supplied through the PASS_CMD input of command send circuit 115 to PASS_CMD input of send command circuit 481. The state machine of FIG. 20 will the transition from state $S_1$ to state $S_7$ causing the PASCMD_SEL output of circuit 481 to transition to the logic one state. This logic is then supplied through OR gate 135 to the select (SEL) input of multiplexer 131 allowing the pass command (bits EDB7-EDB4) to pass through multiplexer 131 to transmitter 83. The state machine also generates a TAXI_STRB pulse, FIG. 5(C), during the transition from state $S_1$ to state $S_7$ with the TAXI_STRB pulse being used to latch the pass command into transmitter 83.

Figure 27:
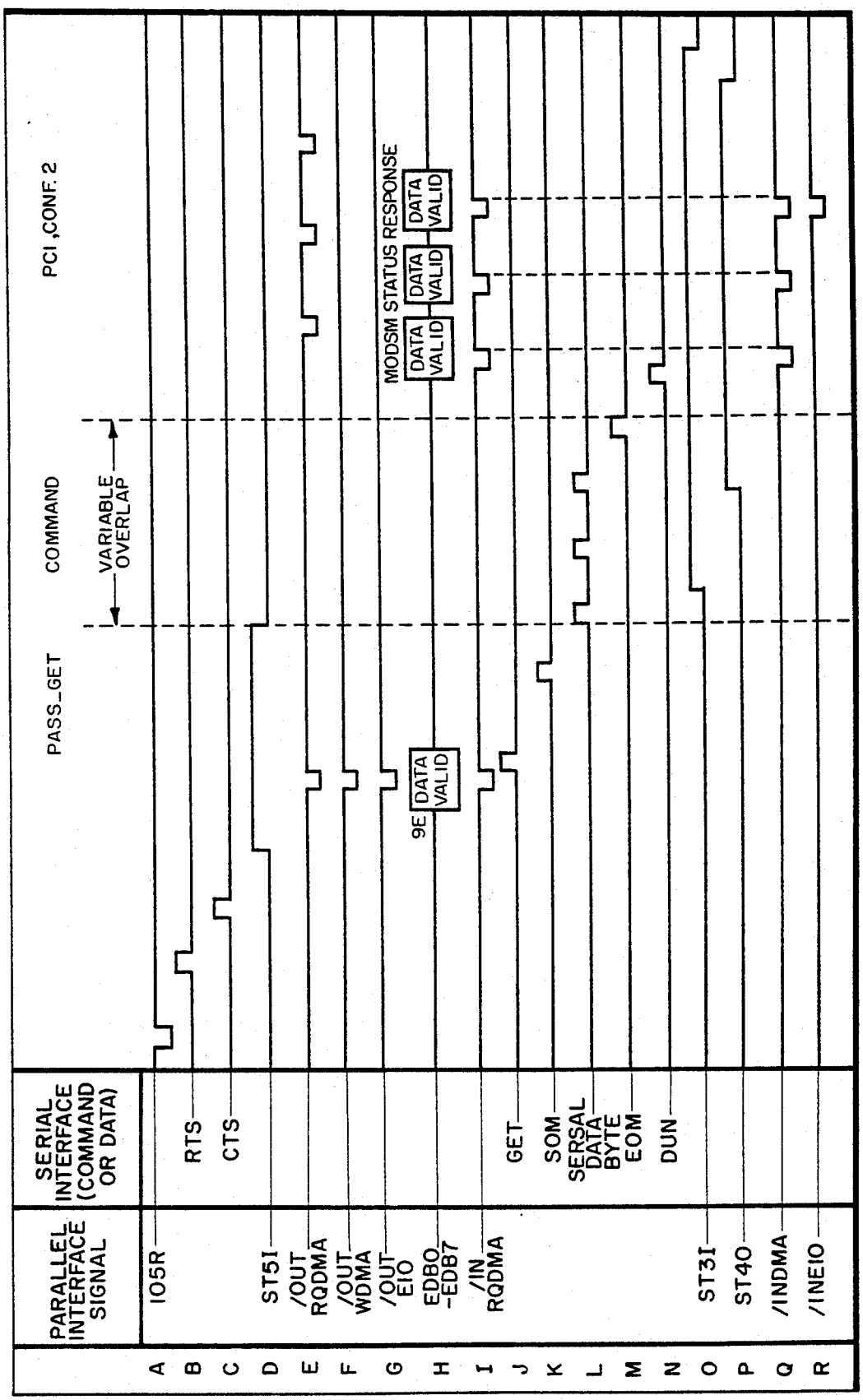
FIGS. 27A-27R illustrate the timing waveforms occurring during the PASS_GET command for PC1 when operating in configuration two.

Referring now to FIGS. 8, 12a, 15a, 15b, 19a, 20 and 27A-27W, the timing waveforms for the pass get command (hexadecimal 9) for protocol converter 55 operating in configuration two are illustrated by FIG. 27. Relay/responder/reporter 43 will provide to protocol converter 55 the /O5R logic zero control signal of FIG. 27A. The inversion of the /O5R logic zero control signal is supplied to command send circuit 115 of erasable programmable logic device 89 which generates the request to send command of FIG. 27B (state $S_0$ to state $S_1$ transition). Upon receiving the request to send command of FIG. 27B, encryption unit 53 will respond with the clear to send command of FIG. 27C. The clear to send command of FIG. 27B is supplied to receive command decode circuit 119 which decodes the clear to send command setting its R_CTS output to the logic one state. This logic one is supplied to command receive circuit 117 which then generates the ST5I control signal of FIG. 27D.

Relay/responder/reporter 43 will provide the pass get command to protocol converter 55 which is a one byte command having a hexadecimal of 9 (EDB7-EDB4) and E (EDB3-EDB0). Data decode circuit 132 upon receiving the pass get command decodes the command and sets its PASS_CMD and PASS_GET outputs to the logic one state. These logic ones are supplied to the PASS_CMD and PASS_GET inputs of send command circuit 481 which along with the logic one supplied to the OI_WDMA input of circuit 481 causes the state machine of FIG. 20 to transition from state $S_1$ to state $S_{11}$. When the state machine of FIG. 20 transitions from state $S_1$ to state $S_{11}$ send command circuit 481 will provide at its PSCMD_SEL, TAXI_STRB and PASS_GET_0 outputs logic ones. The logic one at the PSCMD_SEL output of send command circuit 481 is supplied to the select input of multiplexer 135 allowing the get command of FIG. 27J (hexadecimal 9) to pass through multiplexer 131 to transmitter 83. The TAXI_STRB pulse for latching the get command into transmitter 83 is then provided by Flip-Flop 483 of command send circuit 115 to transmitter 83. The logic one occurring at the PASS_GET_0 output of command send circuit 115 is supplied to the PASS_GET input of command receive circuit 117 thereby enabling AND gate 415.

Encryption unit 53, in response to the get command of FIG. 27J, supplies a start of message command, FIG. 27K to protocol converter 55 followed by the serial data bytes, FIG. 22M and an end of message command, FIG. 22O.

Referring to FIG. 12a when the /O5R_ST3I input to configuration mode circuit 123 is at the logic one state and protocol converter 55 is not in mode PC2, the output of AND gate 172 is a logic zero. However, since protocol converter 55 is operating in configuration two, mode PC1., decoder 151 will provide at its Y13N output a logic zero which is inverted by inverter 159 to a logic one which is then supplied to the first input of AND gate 173. The second input of AND gate is also at the logic one state since the ST5I, FIG. 27D, is now low. This results in a logic zero to one transition occurring at the output of AND gate 173 which passes through OR gate 171 to the EN_PSGET input of command receive circuit 117. This logic zero to one transition passes through AND gate 415, OR gate 319 and AND gate 321 to the clock input of Flip-Flop 323 resulting in the logic one at the D input of Flip-Flop 323 being clocked to its Q output. This, in turn, is the logic zero to one transition of the ST3I signal of FIG. 27O, which is supplied to relay/responder/reporter 43 as a request to send data from protocol converter 55 to relay/responder/reporter 43. Relay/responder/reporter 43 responds with the ST40 control signal of FIG. 27P indicating that relay/responder/reporter 43 is ready to receive data from protocol converter 55.

When protocol converter 55 receives an end of message command, FIG. 27M, from encryption unit 53, receive command decode circuit 119 will decode the end of message command setting its R_EOM output to the logic one state. This logic one is supplied to the R_EOM input of send command circuit 481 causing the state machine of FIG. 20 to transition from state $S_{11}$ to state $S_{12}$. When the state machine of FIG. 20 transitions from state $S_{11}$ to state $S_{12}$ send command circuit 481 will provide at its STC0-STC3 outputs the DUN command of FIG. 27N (hexadecimal 7) as well as the TAXI_STRB signal of FIG. 5(C). The PASS_GET_O of circuit 481 is maintained at the logic one state, thereby maintaining the PASS_GET input to command receive circuit 117 at the logic one state. This logic one is supplied through OR gate 354 and AND gate 355 to the clear input of Flip-Flop 345 so as not to reset Flip-Flop 345. This allows the end of message command of FIG. 27M upon being decoded by receive command decode circuit 119 to clock the logic one at the Q input of Flip-Flop 345 to its Q output enabling AND gate 373 and NAND gate 343.

Enabling NAND gate 343 allows circuit 117 to generate the FIFO_/R pulse which is the inversion of the /OUTRQDMA pulse signal of FIG. 27E. Enabling NAND gate 343 also allows circuit 117 to generate the /INDMA pulse signal of FIG. 27Q and the /INRQDMA control signal of FIG. 27I.

When the last byte of data is read from dual port memory 87 the /EF output will transition to the logic zero state resulting in a logic zero being provided to the FIFO_/EF input of command receive circuit 117 and the FIFO_/EF input of command send circuit 115.

The logic zero at the FIFO_/EF input of command receive circuit 117 is supplied through inverter 377 to AND gate 373 causing a logic zero to one transition at the output of AND gate 373 which when supplied to PULSE3 circuit 386 causes PULSE3 circuit 386 to generate a positive going pulse of 500 nanoseconds. The 500 nanosecond pulse is inverted by inverter 399 resulting the/INEIO control pulse of FIG. 27R which is supplied to relay/responder/reporter 43 that the message transfer is complete.

The logic zero at the FIFO_/EF input of command send circuit 115 causes the state machine of FIG. 20 to transition from state $S_{12}$ to state $S_7$ transitioning the PAS_GET _O output of circuit 115 from a logic one to a logic zero. The state machine then transitions from state $S_7$ to state $S_0$.

Referring to FIGS. 8, 12a, 15a, 15b, 19a and 29 when protocol converter 57 is operating in configuration three, mode PC2 decoder 151 provides a logic zero at its Y10N output which is inverted by inverter 153 and supplied to AND gate 180 and 181 thereby enabling AND gates 180 and 181. In a like manner, when protocol converter 55 is operating in configuration three, mode PC1 decoder 151 provides at its Y11N output a logic zero which is inverted by inverter 155 to a logic one and supplied to the enable inputs of tri-state buffers 178 and 179.

RF I/O logic unit 44 generates a logic zero external reset pulse when it is desired to reset the relay/responder/reporter 43 at the ground station. This external reset pulse is then supplied to erasable programmable logic device 89 within protocol converter 57. The external reset pulse is first provided to inverter 182 within configuration mode circuit 123 which inverts the pulse and then supplies the inverted external reset pulse through AND gate 180 to the I_EXRST input of send command circuit 481. This causes the state machine of FIG. 20 to transition from state $S_0$ to state $S_7$ which results in command send circuit 115 providing at its STC0-STC3 outputs an AP3 command signal having a hexadecimal value of D and a TAXI_STRB pulse, FIG. 5(C), at its TAXI_STRB output. The AP3 command signal is next provided to transmitter 83, latched therein by the TAXI_STRB pulse and transmitted in a serial format to protocol converter 55.

Receiver 81 within protocol converter 55 converts the serial format AP3 command signal to the four bit binary equivalent of hexadecimal D, that is 1101, and supplies the four bits of the AP3 command signal to the RTC0-RTC3 inputs of receive command decode circuit 119 which decodes the four bits of the AP3 command signal and then transitions its R_AP3 output from a logic zero to a logic one. This logic zero to one transition is supplied through the R_AP3 input of command receive circuit 117 to the clock input of Flip-Flop 407 causing the Q output of Flip-Flop 407 to transition from the logic zero state to the logic one state. The iogic one at the Q output of Flip-Flop 401 is supplied to delay circuit 401, which is identical to delay circuit 313, FIG. 15d, and which delays the logic one by approximately 670 nanoseconds. The delayed logic one is inverted by inverter 403 to a logic zero which is supplied to the clear input of Flip-Flop 407 resetting the Q output of Flip-Flop 407 to the logic zero state which results in a positive going pulse having a duration of approximately 670 nanoseconds. This pulse is inverted by inverter 409 to a negative going pulse which passes through receive command decode circuit 119 to relay/responder/reporter 43 resetting relay/responder/reporter 43.

When RF I/O logic unit 44 generates a logic one STOI control signal, this signal is supplied to the configuration mode circuit 123 within erasable programmable logic device 89 of protocol converter 57. Since AND gate 181 within configuration mode circuit 123 is enabled, the STOI control signal passes through AND gate 181 to the I_EXRST input of command send circuit 115. The logic zero to one transition of the STOI control signal sets the Q output of Flip-Flop 465 to the logic one state, while the logic one to zero transition of the STOI control signal sets the Q output of Flip-Flop 461 to the logic one state.

The logic one at the Q output of Flip-Flop 465 is supplied to the SND_AP2 input of circuit 481, the state machine of FIG. 20 transitions from state $S_0$ to state $S_7$ which results in command send circuit 115 providing at its STC0-STC3 outputs an AP2 command signal having a hexadecimal value of C and a TAXI_STRB pulse, FIG. 5(C), at its TAXI_STRB output. The AP2 command signal is next provided to transmitter 83, latched therein by the TAXI_STRB pulse and transmitted in a serial format to protocol converter 55.

In a like manner, the logic one at the Q output of Flip-Flop 461 is supplied to the SND_AP1 input of circuit 481, the state machine of FIG. 20 transitions from state $S_0$ to state $S_7$ which results in command send circuit 115 providing at its STC0-STC3 outputs an AP1 command signal having a hexadecimal value of B and a TAXI_STRB pulse, FIG. 5(C), at its TAXI_STRB output. The AP1 command signal is next provided to transmitter 83, latched therein by the TAXI_STRB pulse and transmitted in a serial format to protocol converter 55.

Receiver 81 within protocol converter 55 converts the serial format AP2 command signal to the four bit binary equivalent of hexadecimal C, that is 1100, and supplies the four bits of the AP2 command signal to the RTC0-RTC3 inputs of receive command decode circuit 119 which decodes the tour bits of the AP2 command signal and then transitions its R_AP2 output from a logic zero to a logic one. This logic zero to one transition is supplied through the R_AP2 input of command receive circuit 117 and NOR gate 411 to the preset input of Flip-Flop 419 causing the Q output of Flip-Flop 419 to transition from the logic zero state to the logic one state.

In a like manner, receiver 81 within protocol converter 55 converts the serial format AP1 command signal to the four bit binary equivalent of hexadecimal B, that is 1011, and supplies the four bits of the AP1 command signal to the RTC0-RTC3 inputs of receive command decode circuit 119 which decodes the four bits of the AP1 command signal and then transitions its R_AP1 output from a logic zero to a logic one. This logic one is supplied through the R_AP1 input of command receive circuit 117 to inverter 413 to the reset input of Flip-Flop 419 causing the Q output of Flip-Flop 419 to transition from the logic one state to the logic zero state, thereby providing the STOI signal at the STOI output of command receive circuit 117. The STOI signal next passes through configuration mode circuit 123 to relay/responder/reporter 43.

Figure 24:
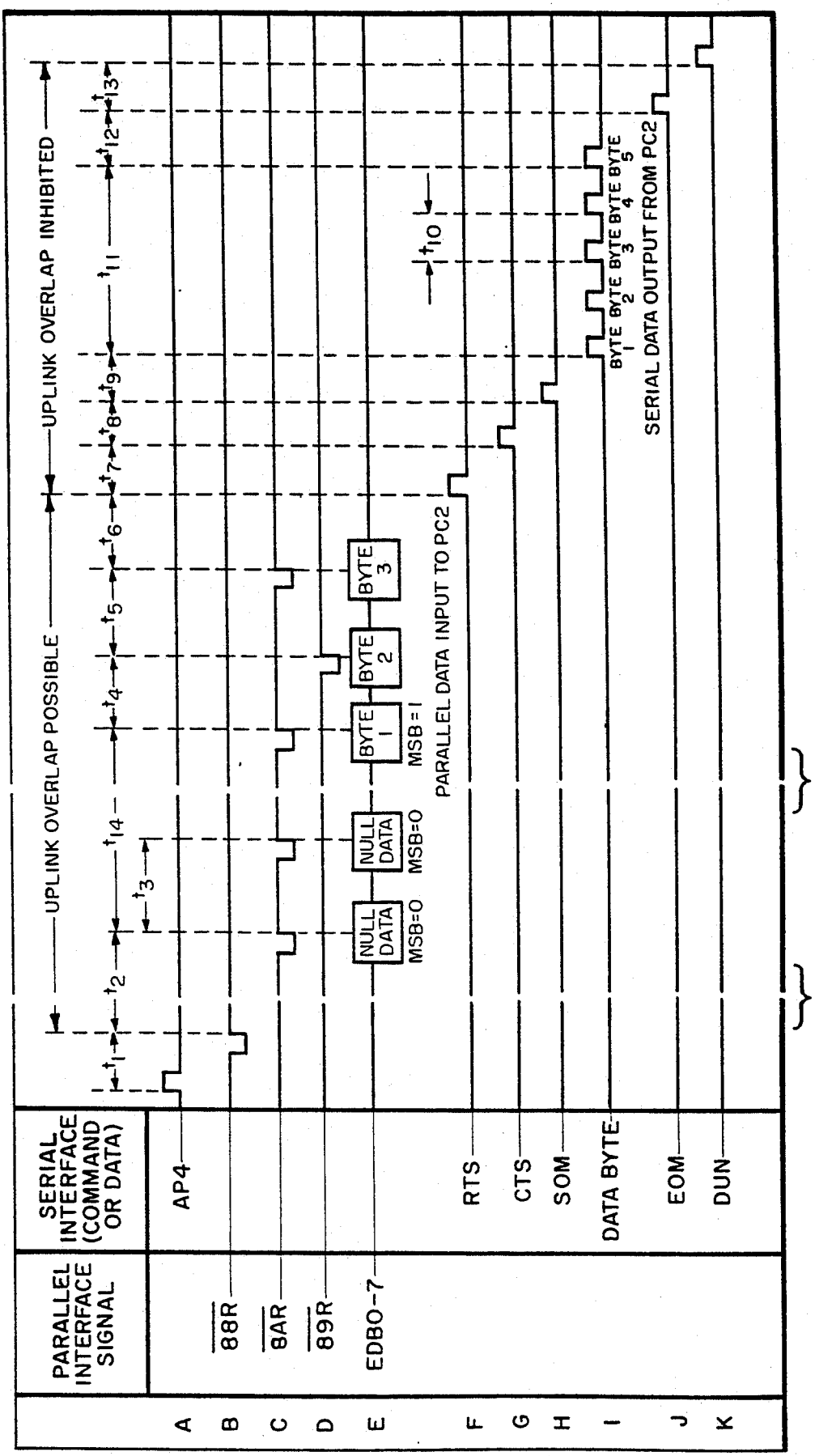
FIGS. 24A-24K illustrate the timing waveforms occurring during the transfer of pressure data from the digital processing unit to the encryption unit via protocol converter PC2.
Figure 25:
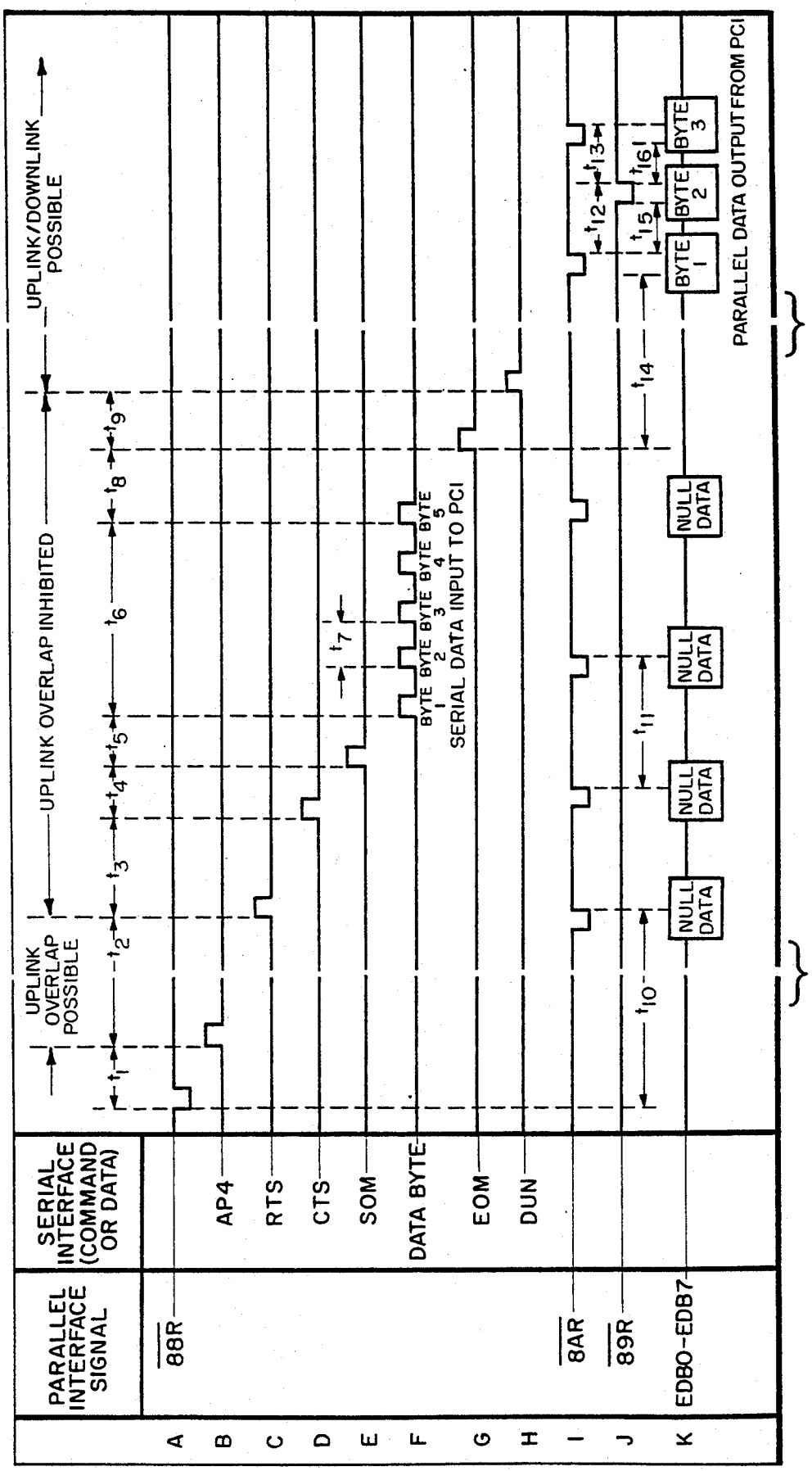
FIGS. 25A-25K illustrate the timing waveforms occurring during the transfer of pressure data from the encryption unit to the relay/responder/reporter via protocol converter PC1.

Referring to FIGS. 2, 8, 11, 12a, 15a, 15b, 19a, 24A-24K and 25A-25K, relay/responder/reporter 43 supplies a logic zero /88R control signal, FIG. 25A, to protocol converter 57. Erasable programmable logic device 89 includes a pressure direction circuit 121 which is a bidirectional circuit dependent upon the mode and configuration under which protocol converter 55 or protocol converter 57 is operating. Since protocol converter 55 the 1_2_PC1 input of pressure direction 121 is a logic one, which is inverted to a logic zero by inverter 144 enabling OR gates 145, 146 and 147. This, in turn, allows the /88R control signal, FIG. 25A, to pass through OR gate 147 and through the /88R_IN input of command receive circuit 117 to the clock input of Flip-Flop 325. The Q output of Flip-Flop 325 is then set to the logic one state by the trailing edge of the /88R control signal. The logic one at the Q output of Flip-Flop 325 is supplied to inverter 327 which inverts the logic one to a logic zero which is supplied to AND gate 321 inhibiting AND gate 321. In addition, the logic one at the Q output of Flip-Flop 325 is supplied to AND gates 360 and 417 enabling AND gate 360 and AND gate 417. Enabling AND gate 417 allows a request to send command from encryption unit 53 upon being decoded by receive command decode circuit 119 to set the PR_RTS output to the logic one state.

The /88R control signal is also supplied to AND gate 427 causing the output of AND gate 427 to transition to the logic zero state which is supplied to the clear input of Flip-Flop 358 thereby resetting the Q output of Flip-Flop 358 to the logic zero state.

The /88R control signal is also provided to the /88R_N input of command send circuit 115 to inverter 471, which inverts the /88R control signal to a logic one pulse and then supplies the logic one pulse to the 88R_IN input of send command circuit 481. The state machine of FIG. 20 then transitions from state $S_0$ to state $S_7$ which results in command send circuit 115 providing at its STC0-STC3 outputs an AP4 command signal, FIG. 25B, having a hexadecimal value of E and a TAXI_STRB pulse, FIG. 5(C), at its TAXI_STRB output.

The AP4 command, FIG. 25B, from protocol converter 55 is supplied to encryption unit 53. Encryption unit 53 then supplies the AP4 command, FIG. 24A, to protocol converter 57. Microcontroller 95 within protocol converter 57 monitors the commands to and from encryption unit 53 and upon detecting the AP4 command, microcontroller will set the signal line UC_EOM to the logic zero and the signal line UC_DSTB to the logic one state before resetting this signal line to the logic zero state. The logic one pulse is supplied to the UC_DSTB of microcontroller decode circuit 125, while the logic zero is supplied to the UC_EOM input of circuit 125. Decoder 191 decodes these inputs providing a logic zero pulse at the /UC88R output of microcontroller decode circuit 125.

The UC_DATAPASS output from microcontroller decode circuit 125 is at the logic one state and the 1_2_PC2 output is a logic one (protocol converter 57 is operating in configuration 2, mode PC2) allowing the logic zero pulse at the /UC88R output of microcontroller decode circuit 125 to pass from circuit 125 through tri-state buffer 143 within pressure direction circuit 121 to the /88R input/output of erasable programmable logic device 89. This logic zero, FIG. 24B, is next supplied to digital processing unit 45 requesting that digital processing unit 45 provide pressure data to encryption unit 53.

After transmitting the /88R pulse of FIG. 24B to digital processing unit 45, microcontroller 95 allows erasable programmable logic device 89 to process a new data transfer. Microcontroller 95 then provides a logic zero to the UC_DSTB input of circuit 125 and a logic one pulse to the UC_EOM input of circuit 125 resulting in a logic zero pulse at the /UC8AR output of circuit 125. This pulse/signal which is the /8AR signal of FIG. 24C, is supplied to digital processing unit 45. For each /8AR pulse, FIG. 24C, provided to digital processing unit 45, digital processing unit 45 will output a data byte, FIG. 24E, to protocol converter 57. The first data byte of FIG. 24E to have its most significant bit at the logic one state (data byte one of FIG. 24E) will indicate that pressure data (data bytes one, two and three of FIG. 24E) is being provided by digital processing unit 45. Since the UC_DATAPASS output of microcontroller decode circuit 125 is at the logic one state the data bytes of FIG. 24E will pass through buffer 127 without a clock signal being provided to the clock inputs of Flip-Flops 221-235. Microcontroller 95 monitors the STD0-STD7 inputs/outputs of erasable programmable logic device 89 and when microcontroller 95 senses a logic one at the STD7 input/output of device 89, microcontroller 95 will provide logic one pulses to the UC_EOM and UC_DSTB inputs of microcontroller decode circuit 125 resulting in a logic zero pulses at the /UC89R output of circuit 125. This /89R pulse, FIG. 25D, is supplied to digital processing unit 45 causing digital processing unit 45 to clock the second data byte of pressure information into protocol converter 57. This second data byte is then stored in microcontroller 95.

Microcontroller 95 next provides a logic zero to the UC_DSTB input of circuit 125 and a logic one pulse to the UC_EOM input of circuit 125 resulting in the last /8AR pulse of FIG. 24 C which is used to clock the third byte of pressure information from digital processing unit 45 to microcontroller 95. It should be noted that the first and third bytes of pressure data are identical.

Microcontroller 95 next provides a request to send command, FIG. 24F, through multiplexer 131 within erasable programmable logic device 89 to encryption unit 53. It should be noted that UC_CMD output of decode circuit 125 is a logic one thereby providing a logic one through OR gate 135 to the select input of multiplexer 95.

Encryption unit 53, in response to the request to send command, supplies a clear to send command, FIG. 24G, to protocol converter 57. Microcontroller 95 within protocol converter 57 next provides to encryption unit 53 a start of message command, FIG. 25H, followed by the pressure data, FIG. 25I and an end of message command, FIG. 25J. After receiving the end of message command, encryption unit 53 responds with a DUN command, FIG. 25K, to protocol converter 57.

It should be noted that whenever microcontroller 95 is controlling an uplink transfer of data such as illustrated by FIG. 24, the UC_UPLINK output of microcontroller decode circuit 125 will be at the logic one state thereby causing the UC_UPLINK input of command receive circuit 117 to be at the logic one state. This logic one is supplied to inverter 307 which inverts the logic one to a logic zero. the logic zero is then supplied to AND gate 305 such that when the clear to send command of FIG. 24G is supplied to protocol converter 57 the logic zero to one transition occurring at the R_CTS input of command receive circuit 117 will not pass through AND gate 305 to the clock input of Flip-Flop 309. This results in the ST5I_40 output of command receive circuit 117 remaining at the logic zero state thereby preventing the ST40 control signal from being supplied to an digital processing unit.

Figure 30:
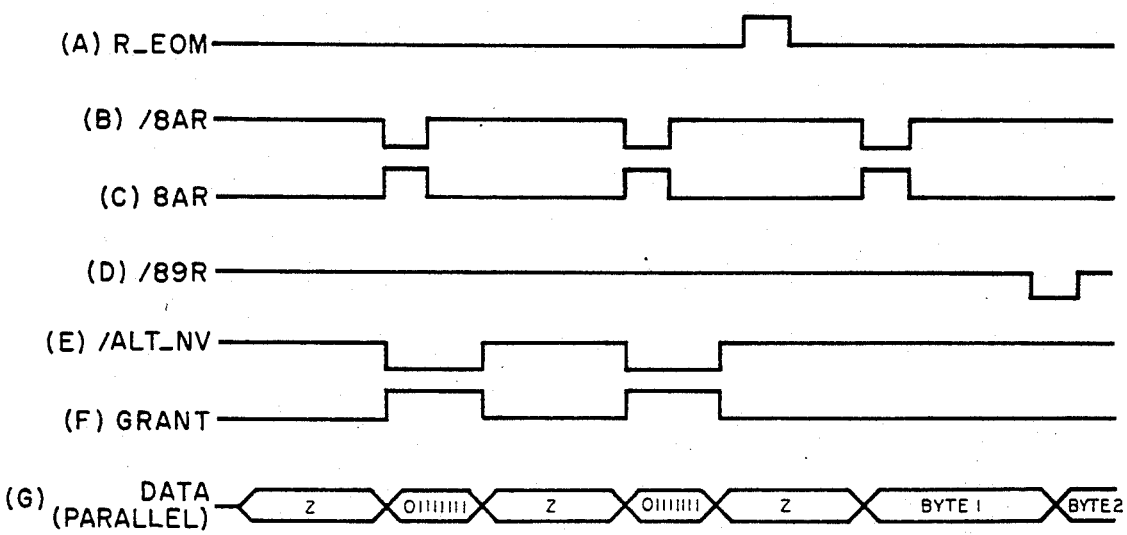
FIGS. 30(A)-30(G) illustrates timing waveforms which occur within protocol converter PC1 during the transfer of pressure data illustrated by FIG. 25.

Relay/responder/reporter 43 generates the control signal /8AR, FIG. 25I, and then supplies the /8AR control signal to protocol converter 55. The /88R control signal of FIG. 25A sets the Q output of Flip-Flop 325 to the logic one state enabling AND gate 360 within command receive circuit 117. This allows the /BAR control signal of FIG. 25I, which is inverted by inverter 356, to pass through AND gate 360 to the input of delay circuit 421 and the first input of NOR gate 423. When the BAR signal, FIG. 30(C), transitions from a logic zero to a logic one, the output of NOR gate 423 will transition to a logic zero resulting in a logic zero being clocked through Flip-Flop 427, FIG. 30(E). The output of Flip-Flop 427 remains at the logic zero state until the 8AR signal, FIG. 30(C), is clocked through delay circuit 421 to the second input of NOR gate 423. Delay circuit 421, which is identical to the delay circuit 313, FIG. 15d, delays the 8AR signal by four clock pulses of the 6 MHz system clock signal. Since the BAR signal is delayed by delay circuit 421, the output of NOR gate 425 will remain at the logic zero state for approximately 1200 nanoseconds before transitioning to the logic one state. The 6 MHz system clock signal, FIG. 5(A), will then clock the logic one to the Q output of Flip-Flop 427, FIG. 30(E). The logic zero/ALT_NV pulse is then supplied to AND gate 133 inhibiting AND gate 133.

Encryption unit 53 supplies a request to send command, FIG. 25C, to protocol converter 55. The request to send command is decoded by receive command decode circuit 119 which transitions its R_RTS output from the logic zero stale to the logic one state. This logic one is then supplied through the R_RTS input of command receive circuit 117 and AND gate 417 to the PR_RTS output of command receive circuit 117. The logic one is next supplied to the PR_RTS input of command send circuit 115 causing the state machine of FIG. 20 to transition from state S$_0$ to state S$_6$ which results in the generation of the clear to command of FIG. 25D and a TAXI_STRB pulse, FIG. 5(C).

Encryption unit 53 responds to the clear to send command of FIG. 25D with a start of message command, FIG. 25E, followed by the pressure data, FIG. 25F, and an end of message command, FIG. 25G. The pressure data is, in turn, stored in dual port memory 87.

Upon receiving the end of message command from encryption unit 53, receive command decode circuit 119 will transition its R_EOM output from a logic zero state to a logic one state resulting in a logic one being supplied to the R_EOM input of command receive circuit 115. This logic one causes the state machine of FIG. 20 to transition from state S$_6$ to state S$_7$ and generate the DUN command of FIG. 25H and a TAXI_STRB pulse, FIG. 5(C).

The logic zero to one transition at the R_EOM output of decode circuit 119 is supplied through the R_EOM input of command receive circuit 117 to the clock input of Flip-Flop 358 clocking the Q output of Flip-flop 358 to the iogic one state. This logic one is then supplied to AND gates 359 and 361 as well as NOR gate 429. The output of NOR gate 429 then transitions to a logic zero which is supplied to the clear input of Flip-Flop 325 setting the Q output of Flip-Flop 325 to the logic zero state. This logic zero is supplied to AND gate 360 inhibiting AND gate 360 which results in the/ALT_NV output of command receive circuit 117 remaining at the logic one state.

The logic zero of the/ALT_NV signal of FIG. 30(E) insures that the most significant bit of each data byte of FIG. 25K is at the logic zero state, FIG. 30K, as until an end of message command is received from encryption unit 53.

The first /8AR pulse, FIG. 25I, after the end of message command, FIG. 25G, is inverted by inverter 356 to a logic one pulse which then passes through AND gate 359 to NOR gate 363 causing NOR gate 363 to transition to a logic zero. This logic zero is supplied to the /R input of dual port memory 87 causing byte one, FIG. 25K, to be read from dual port memory 87 and then transferred to relay/responder/reporter 43. In a like manner, the /89R control pulse of FIG. 25J will cause the byte two to be read from dual port memory 87 to relay/responder/reporter 43, while the second /8AR control pulse of FIG. 25I will cause the byte three to be read from dual port memory 87.

Appendix D (not printed, incorporated by reference) sets forth the program listing/program code for the program used by microcontroller 95. The instruction set for the Intel Model 87C51 microcontroller is commercially available from Intel Corporation of Santa Clara, Calif. and is a published under the title MCS-51 Programmers Guide and Instruction Set.

Referring to FIGS. 2, 3a 28a and 28b, during program step 503 the program of Appendix D initializes itself by assigning symbolic names to the ports, that is the signal inputs and outputs of microcontroller 95. Microcontroller 95 has four eight bit ports designated as ports P0, P1, P2 and P3. Port P0 is an input/output port used to receive data from and provide data to bus 94 (STD0-STD7) and port P1 is used to provide the strobe signals UC_DSTB, UC_EOM AND UC_SOM to erasable programmable logic device 89 and to provide the clear strobe signal CMD_CLR to programmable array logic device 90 as well as to set up test points TP0-TP3. Test points TP0-TP3 indicate the program step microcontroller 95 is currently processing and are identified as a four bit Marker on FIG. 28. Port P2 is used to output strobe signals such as UC2R3 and UC2-TAXI which are supplied to erasable programmable logic device 89 and which effect the direction of data flow. In addition, Port P2 includes an input P2.6 which monitors the ST40_5I input of erasable programmable logic device 89 and a port P2.3 which monitors the TAXI_ACK signal of FIG. 5(D).

Further, when microcontroller 95 provides at its P2.5 output a logic zero which is supplied to the E input (enable input) of octal bus transceiver 99, octal bus transceiver 99 is enabled. This, in turn, places a first eight bit byte, on bus 94 with the bit pattern of the eight bit byte being determined by the closure of switches within switching circuit 100. Thus, for example, whenever a switch is closed within switching circuit 100 a logic zero will be provided to bus 94, while a switch left in the open position will result in a logic one being provided to bus 94. In a like manner, when microcontroller 95 provides at its P2.4 output a logic zero which is supplied to the E input (enable input) of octal bus transceiver 98, octal bus transceiver 98 is enabled allowing octal bus transceiver 98 to place a second eight bit byte on bus 94. The first eight bit byte is the most significant byte of an identification code supplied to encryption unit 53, while second eight bit byte is the least significant byte of the identification code provided to encryption unit 53. This two byte identification is supplied by protocol converter 55 to encryption unit 53 in response to a Get command (hexadecimal nine) from encryption unit 53.

It should be noted that whenever encryption unit 53 is unable to obtain an identification from protocol converter 55, encryption unit 53 will provide a Get command to protocol converter 57 to obtain an identification code from protocol converter 57.

Port P3 of microcontroller 95 is used to monitor commands latched into programmable array logic device 90. Microcontroller 95 monitors only the commands sent to encryption unit 53 via transmitter 83 or received from encryption unit 53 via receiver 81, however microcontroller 95 through software keeps track of all signals occurring on each side of protocol converters 55 and 57.

Microcontroller 95 does not effect the operation of protocol converter 55 during a normal data transfer such as the uplink data transfer of FIG. 6 and the downlink data transfer of FIG. 7. Microcontroller 95 normally functions as a supervisor during uplink and down link data transfers correcting errors that occur during the transfer by a system reset (program step 511). Microcontroller 95 is also utilized in the processing of special commands such as the GET command (hexadecimal nine) which is provided by encryption unit 53.

The program for microcontroller 95 establishes interrupt vectors (program step 505), initializes ports P0-P3 (program step 509) and then activates the logic zero reset signal supplied to the/RESET input of erasable programmable logic device 89, thereby resetting device 89.

At this time, it should be noted that the marker is set at 0000 indicating the beginning of the computer program utilized by microcontroller 95. The marker, in turn, indicates the logic signal levels at test points TP0-TP3.

During program step 517 a fifty millisecond internal "watchdog" timer is set. The program for microcontroller 95 proceeds to program step 519 looking for a command sequence and if a command sequence is detected will reset the "watchdog" timer (program step 521). If, however, a command to or from encryption unit 53 is not detected by microcontroller 95, the program returns through program step 507 to program step 509 which is the initialize for the microcontroller 95.

During program step 519 microcontroller 95 tests to see if there are any commands latched into programmable array logic device 90. If the answer is "yes" the program for microcontroller 95 resets the watchdog timer (program step 521) and then tests to see if the command is a send (STC0-STC3) command, saves the commands (STC0-STC3, RTC0-RTC) in an internal registers, masks the four bits (STC0-STC3) that represent the send command and then compare the present send command with the previous send command to see if it is a new send command (program steps 525-527). If the command is not a new send command, then microcontroller 95 proceeds to program step 561 to test for the presence of a new receive command (RTC0-RTC3) by masking the receive command and then compare the present receive command with the previous receive command to see if it is a new receive command (program steps 561-563).

Figure 28A:
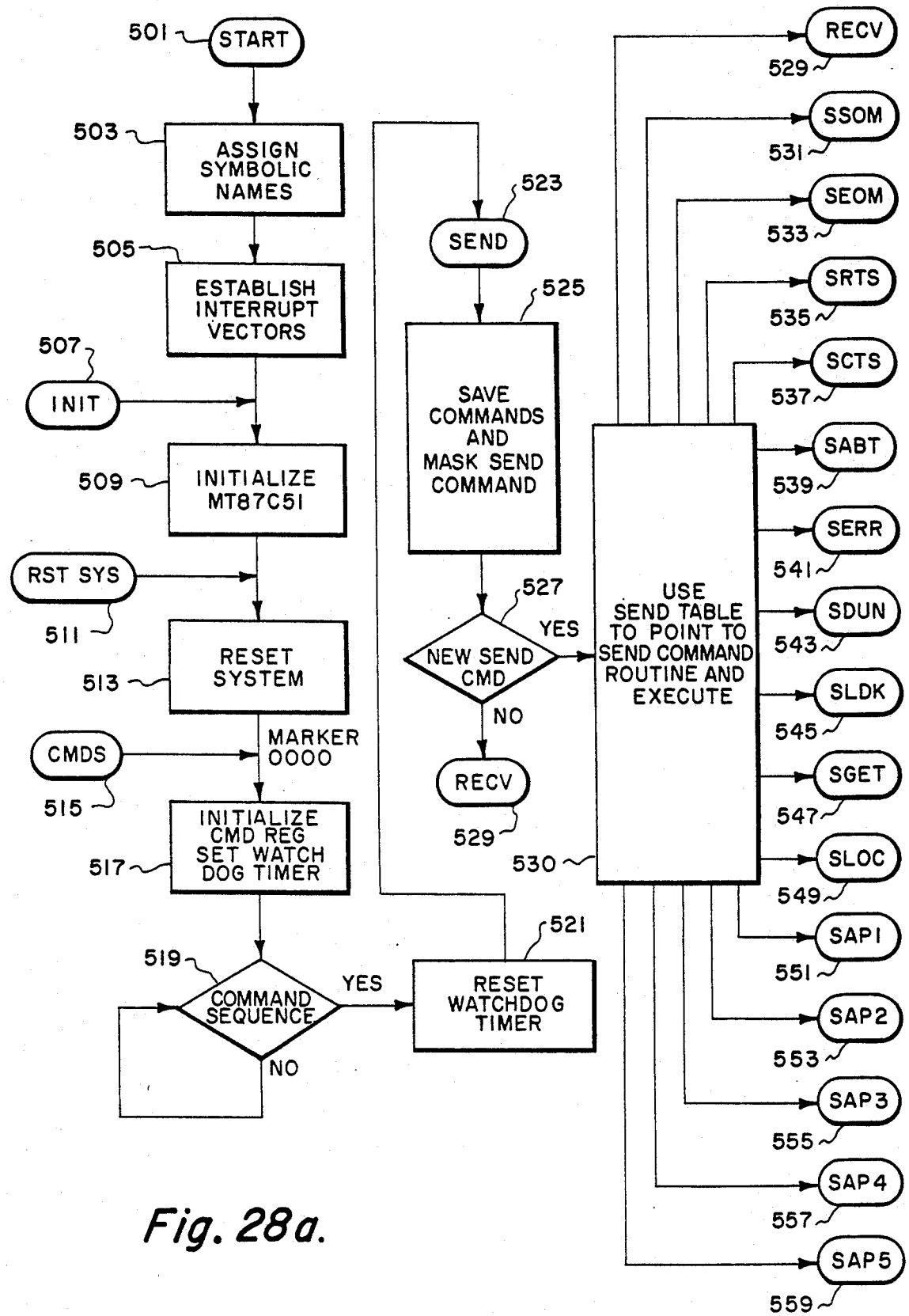
FIGS. 28(A)-28(P) and 28(R)-28(W) is a flow chart for the computer software program which is used by the microcontroller of the present invention.
Figure 28B:
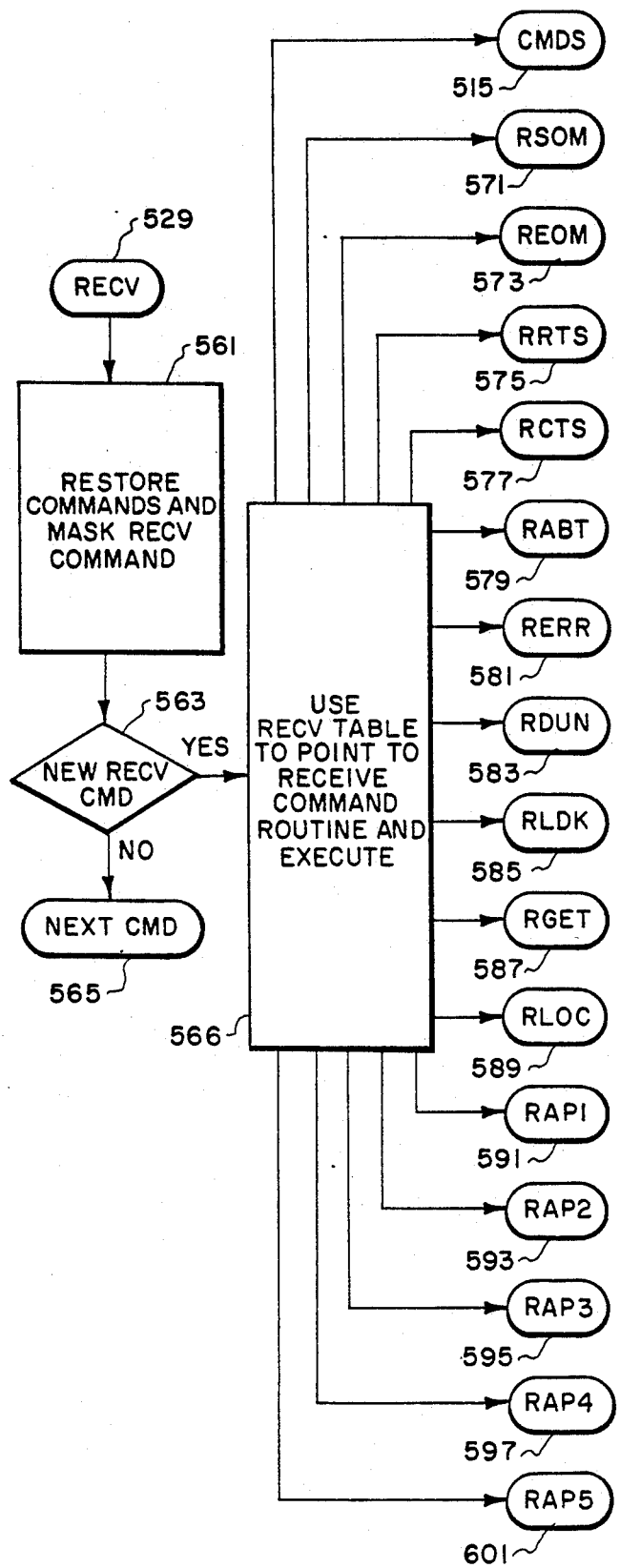

If the command is a new send command, FIG. 28b, microcontroller 95 proceeds to a table that includes each of the send commands (program step 530) and the address for each routine that is used for processing each send command. Microcontroller 95 upon analyzing the command may, for example, point to the Send Start of Message command (SSOM), FIG. 28d, the Send End of Message command (SEOM), FIG. 28e or the Send Request to Send command (SRTS), FIG. 28f.

At this time it should be noted that SABT is an abort command and SERR is an error command. In addition, it should be noted that SLOC is a lock command which is not being utilized by the protocol converter of the present invention and SAP5 is an application command not being utilized by the protocol converter.

Figure 28C:
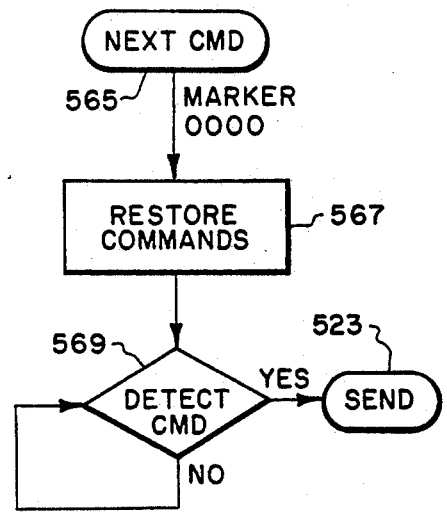
Figure 28D:
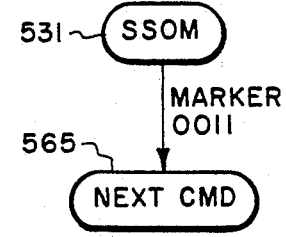
Figure 28F:
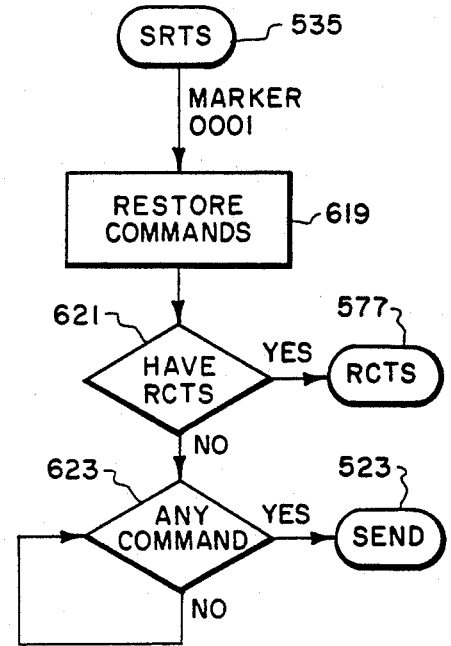
Figure 28H:
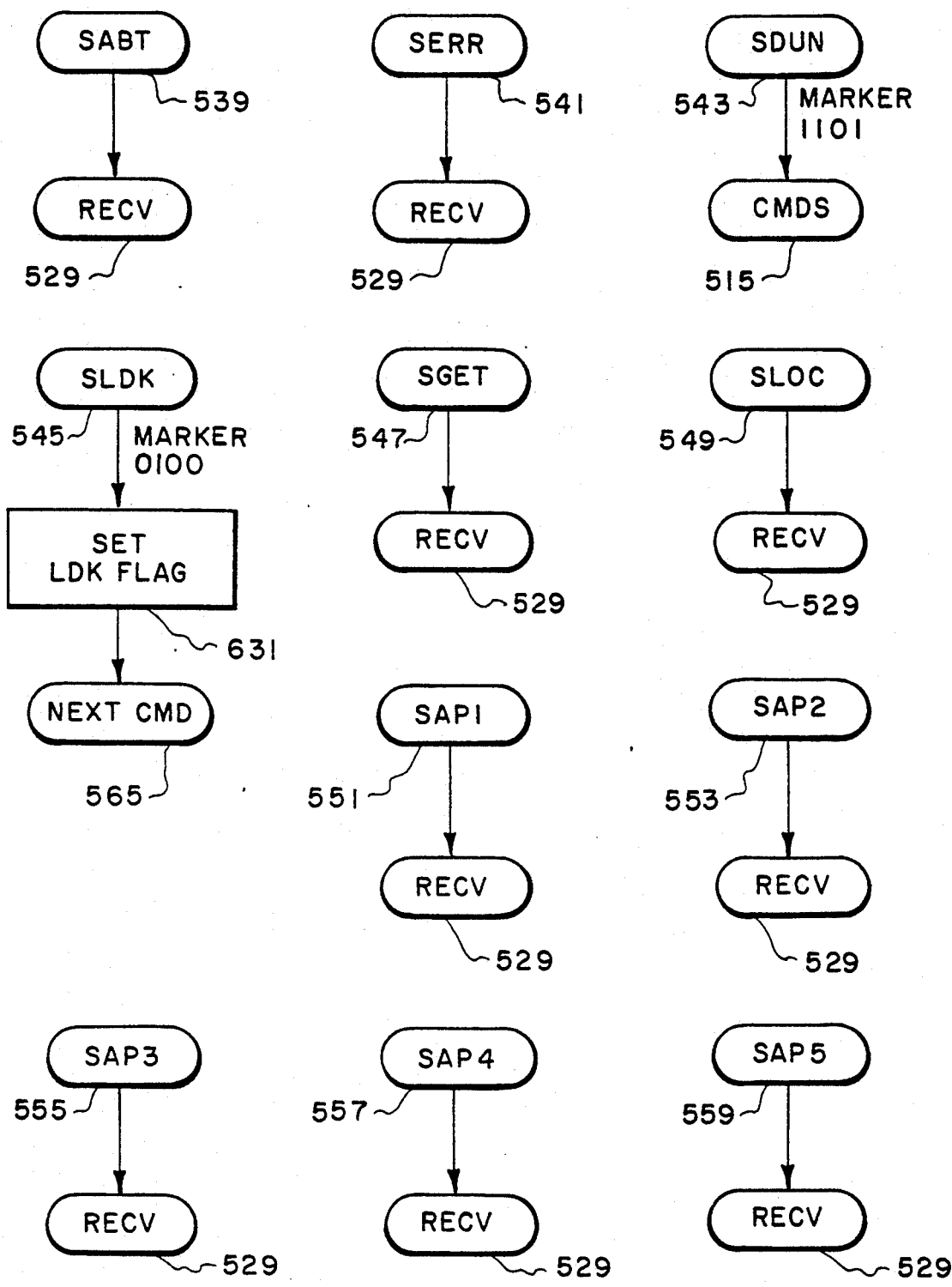
Figure 28J:
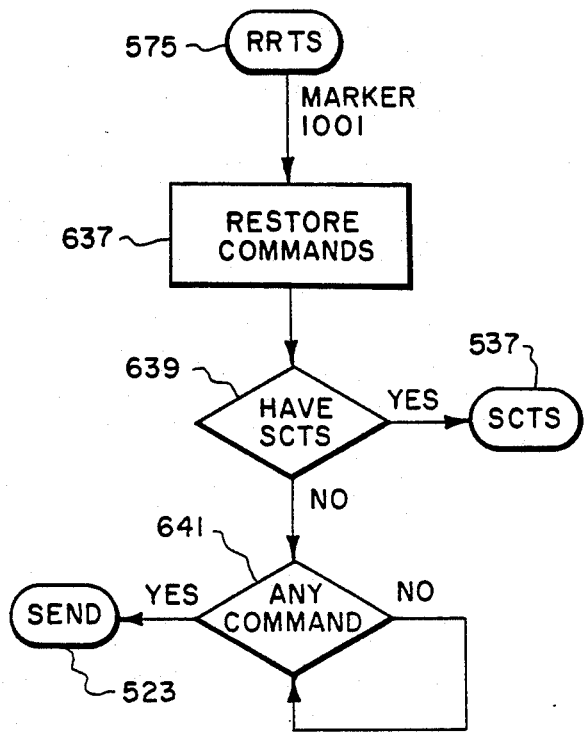
Figure 28K:
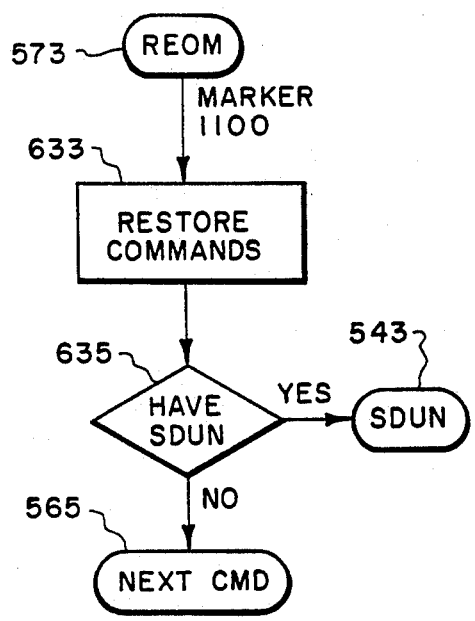
Figure 28O:
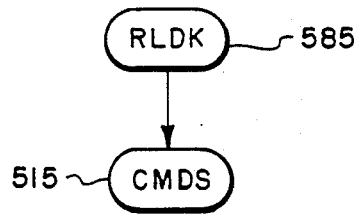
Figure 28P:
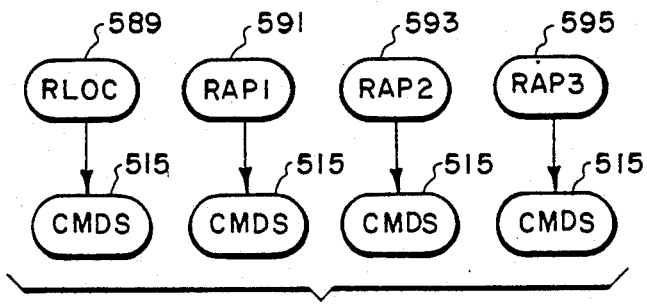
Figure 28L:
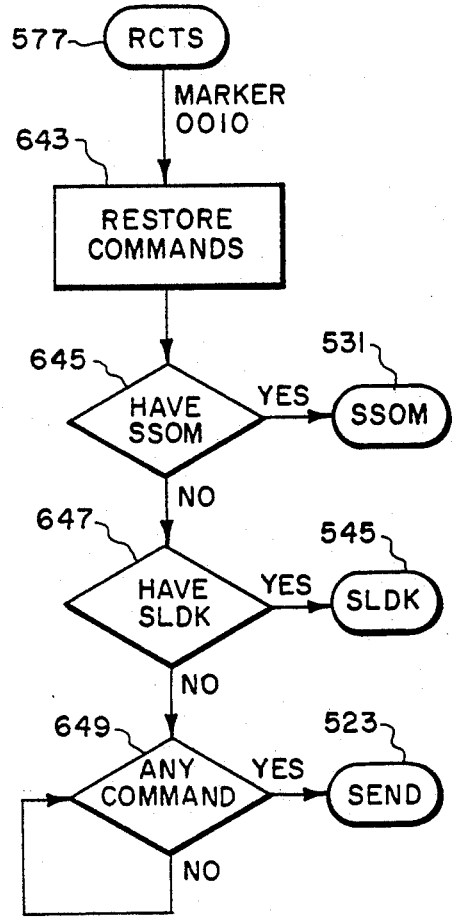

Referring to FIGS. 3a and 28c, if a new receive command is not present, the software for microcontroller 95 will restore the commands (program step 567) and then continue through a loop until a command is detected and then proceed to program step 523. It should be noted that microcontroller 95 will continue in this loop until the watchdog timer for microcontroller 95 times out. The program for microcontroller 95 will then proceed to program step 507 initializing microcontroller 95.

Referring to FIGS. 2, 3a and 21f, when encryption unit 53 provides, for example, a request to send command, FIG. 7E, to protocol converter 55, the program for microcontroller 95 will go to program step 535 sending the marker 0001 to respectively to test points TP1, TP2, TP3 and TP4, and then restore commands (program step 619) from an internal register within microcontroller 95 to the accumulator within microcontroller 95 for the purpose of comparing the receive portion of the command. The microcontroller 95 will then compare the receive portion of the command and if the receive portion of the command is the clear to send command of FIG. 7H then the program proceeds to program step 577.

If, however, the command is not the clear to send command of FIG. 7H, then the program proceeds to program step 623 and test for any command.

Referring to FIGS. 2, 3a, 19a, 20, 21, 28e, 28h, 28m, 28n and 28o when relay/responder/reporter 43 supplies the first data byte of a load key message consisting of 0 EDB4-EDB7), E (EDB0-EDB3) to protocol converter 55, data decode circuit 132 will decode the 0, E data byte and set its LDK_CMD output to the logic one state. This logic one is supplied to the LDK_CMD input of command send circuit 115 causing the state machine of FIG. 20 to transition from state $S_1$ to $S_3$ and thereby generate a load key command (hexadecimal eight).

Microcontroller 95 detects this load key command which protocol converter 55 is providing to encryption unit 53, sets the marker to 0100 and then sets its internal load key flag (program steps 545 and 631). The load key data of the load key message is then provided by relay/responder/reporter 43.

The state machine of FIG. 20 will provide an end of message command (state $S_9$ to state $S_7$ transition) which when detected by microcontroller 95 will cause microcontroller 95 to set the marker to 0101. Microcontroller 95 will check to determine whether the load key flag is set (program step 603). If the load key flag is not set then microcontroller 95 proceeds to program step 515. If however, the Load Key Flag has been set, microcontroller 95 will restore commands to the accumulator (program step 605) and will then test for the presence of the DUN command which is provided by encryption unit 53 and has the hexadecimal value of seven. If the DUN command is present indicating that encryption unit 53 has accepted the load key message, then microcontroller 95 proceeds to program step 583. If, however, microcontroller 95 does not detect the presence of the DUN command, microcontroller 95 will proceed to program step 609 and test for the presence of an error message which has a hexadecimal value of six.

When microcontroller 95 does not detect an error message from encryption unit 53 an internal timer within micrcontroller 95 is set to time out after five hundred microseconds (program step 611). During this five hundred microsecond time period microcontroller 95 will look for any command (program step 613) and if a command is not detected the microcontroller program will proceed to a load key timeout (program step 617).

Figure 28M:
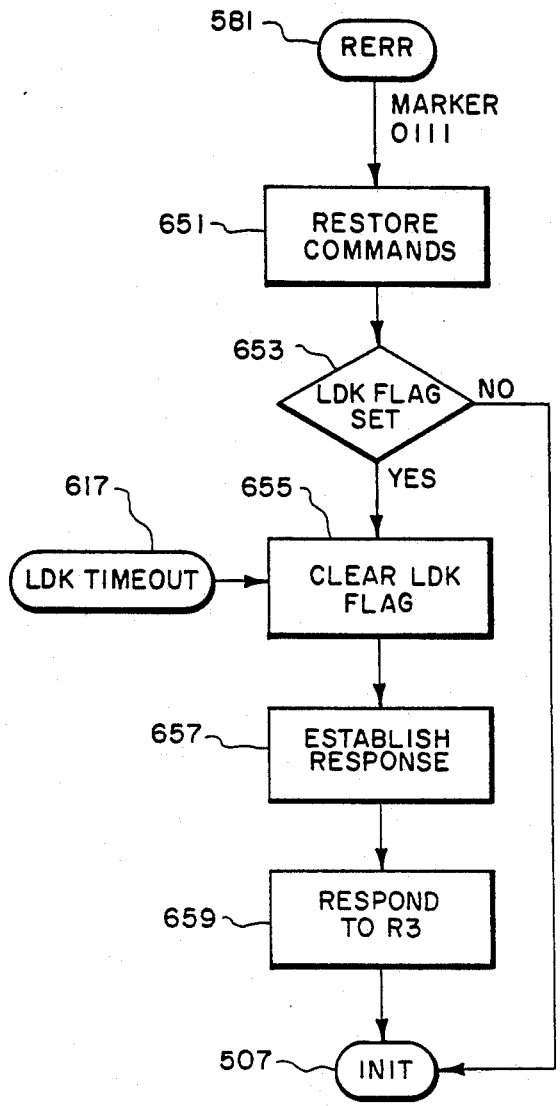

If the internal five hundred microsecond timer within microcontroller 95 times out then microcontroller 95 proceeds to program step 617, FIG. 28m. The load key flag is cleared (program step 655) followed by a one byte message 7, E which is sent by microcontroller 95 to relay/responder/reporter 43 (program steps 657 and 659). This message indicates to relay/responder/reporter 43 that a load key timeout has occurred.

Figure 28N:
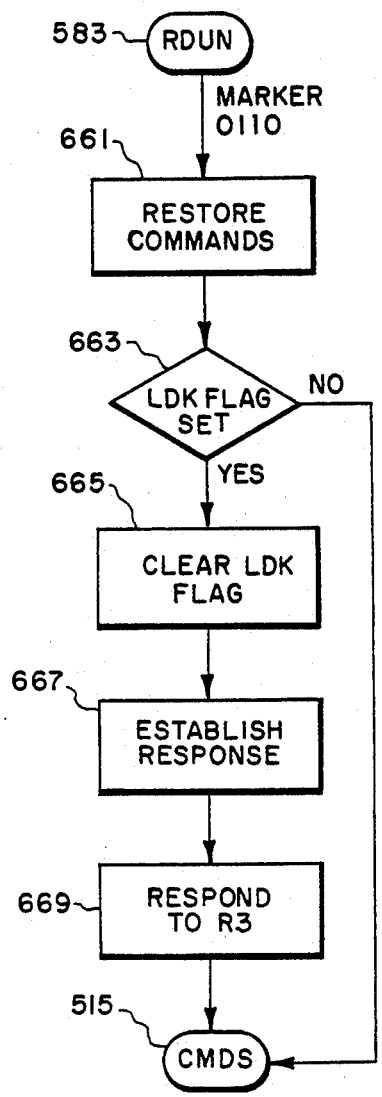
Figure 29:
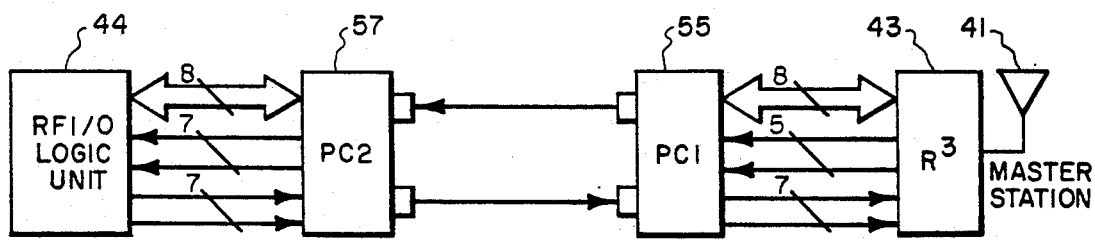
FIG. 29 illustrates the protocol converter of the present invention being configured for use at a ground station.
Figure 28R:
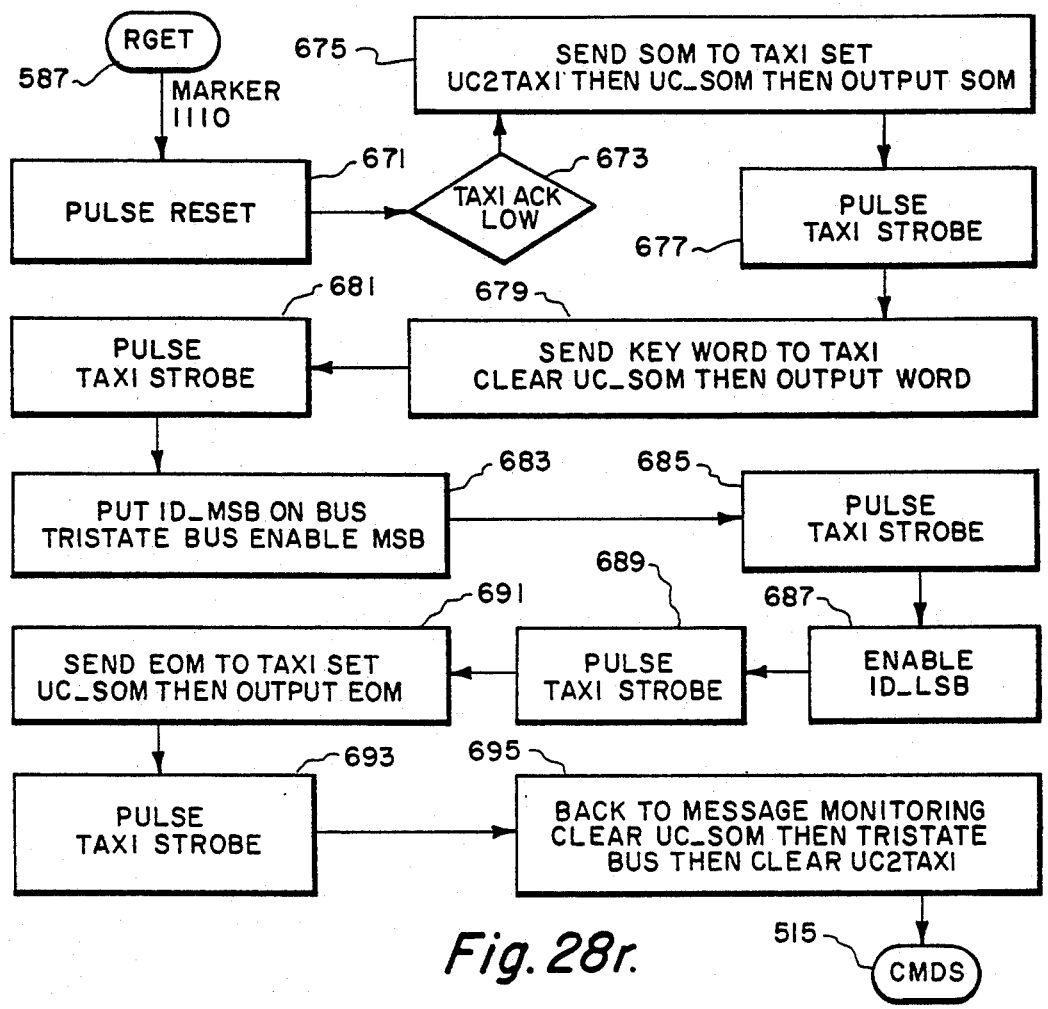

If protocol converter 55 receives a DUN command from encryption unit 53, then the microcontroller program will set the marker 0110, FIG. 28n, restore commands (program step 661) and clear the load key flag (program step 665) if the load flag is set (program step 663).

Microcontroller 95 then responds with a 0, E to relay/responder/reporter 43 (program steps 667 and 669) which indicates that encryption unit 53 has accepted the load key message.

Referring to FIGS. 3a-3c, 8a-8c, 13 and 28r when microcontroller 95 detects a receive get command (program step 587) which is a request by encryption unit 53 to provide to encryption unit 53 the two byte identification code from protocol converter 55, microcontroller 95 sets the marker at 1110, pulses the /RESET input of erasable programmable logic device 89 to the logic zero state (program step 671) and checks to see that TAXI_ACK signal of FIG. 5(D) is at the logic zero state (program step 673). Microcontroller 95 next sends a start of message command to transmitter 83 (program step 675) by setting its UC2TAXI and then its UC_SOM signal outputs to the logic one state, that is the P2.1 and P1.6 ports of microcontroller 95 respectively are set to the logic one state. These UC2TAXI and UC_SOM logic one signals are provided to erasable programmable logic device 89. Microcontroller decode circuit 125 will decode the UC2TAXI and UC_SOM logic one signals set its UC_UPLINK output and UC_CMD outputs to the logic one state. The logic one from the UC_CMD output of decode circuit 125 is supplied to OR gate 135 and then to the select input of multiplexer 131 allowing the start of message command from microcontroller 95 to pass through multiplexer 131 within erasable programmable logic device 89 to transmitter 83. A TAXI_STRB pulse, FIG. 5(C), is next provided to transmitter 83 (program step 677), which latches the start of message command into transmitter 83 which then provides the start of message command to encryption unit 53. The TAXI_STRB pulse is generated by microcontroller 95 and then supplied to the UC_DSTB input of microcontroller decode circuit 125, passes through circuit 125 to its UC2T_STB output. This logic one pulse then passes through OR gate 134 and the TAXI_STRB output of erasable programmable logic device 89 to transmitter 83.

A key word which is F, 5 is generated by microcontroller 95 and then sent to transmitter 83 after microcontroller 95 transitions the UC_SOM logic signal to a logic zero (program step 679). This results in the UC_CMD output of decode circuit 125 transitioning to a logic zero which is then supplied to the select input of multiplexer 131 preventing logic signals or commands at the B1-B4 inputs of multiplexer 131 from passing through multiplexer 131.

A TAXI_STRB pulse, FIG. 5(C), is next provided to by transmitter 83 (program step 681), which latches the key word into transmitter 83 which then provides the key word to encryption unit 53.

During program step 683 port P0 microcontroller 95 is placed in a tri-state mode, that is port P0 of microcontroller 95 is provided logic ones which floats port zero. Microcontroller 95 provides a logic zero from its P2.5 output to the E input of octal bus transceiver 99 enabling octal bus transceiver 99. This, in turn, places the most significant eight bit byte on bus 94 with the bit pattern of the eight bit byte being determined by the closure of switches within switching circuit 102. Thus, for example, whenever a switch is closed within switching circuit 102 a logic zero will be provided to bus 94, while a switch left in the open position will result in a logic one being provided to bus 94.

This eight bit byte is the most significant byte of a two byte identification code provided to encryption unit 53. During program step 685, a TAXI_STRB pulse, FIG. 5(C), is provided to transmitter 83, which latches the MSB byte Into transmitter 83. In a like manner, during program step 687 a second eight bit byte (LSB byte) of the two byte identification is provided to bus 94 for transmission to encryption unit 53 by enabling octal bus transceiver 98. Microcontroller 95 next provides a TAXI_STRB pulse, FIG, 5(C) to transmitter 83, which latches the LSB byte into transmitter 83.

During program step 691 microcontroller 95 sends an end of message command to transmitter 83 by setting its signal output to the logic one state thereby allowing the end of message command from microcontroller 95 pass through multiplexer 131 to transmitter 83. A TAXI_STRB pulse, FIG. 5(C), is next provided to transmitter 83 (program step 693), which latches the end of message command into transmitter 83 which then provides the end of message command to encryption 53. During program step 695, microcontroller 95 returns to a message monitoring mode by clearing the UC-SOM signal to a logic zero state, tristates its port zero output and then clears the UC2TAXI signal to a logic zero state.

Referring to FIGS. 3a-3c, 8a-8c, 13, 14, 28S and 28T when microcontroller 95 within protocol converter 57 detects an AP4 command (hexadecimal E) from encryption unit 53, microcontroller 95 sets the marker 1111 and enters the pressure transducer mode setting its UC2TAXI and UC2R3 signal outputs to the logic one state (program step 697). This results in the UC_DATAPASS output of microcontroller decode circuit 125 transitioning to the logic one state. This logic one is supplied to the UC_DATAPASS input of buffer 127 allowing to pass through buffer 127 with a clock signal being supplied to the clock inputs of D Flip-Flops 221, 223, 225, 227, 229, 231, 233 and 235.

During program step 699, microcontroller sets its UC_DSTB signal output to the logic one state and then clears the output to the logic zero state. This results in a logic zero pulse, which is the /88R pulse of FIG. 24B, occurring at the /88R output of decode circuit 125. Microcontroller 95 next clears its UC2R3 output to the logic zero state and then clear its UC2TAXI output to a logic zero state allowing for the message transfers illustrated by FIG. 22 (program step 701).

Figure 28S:
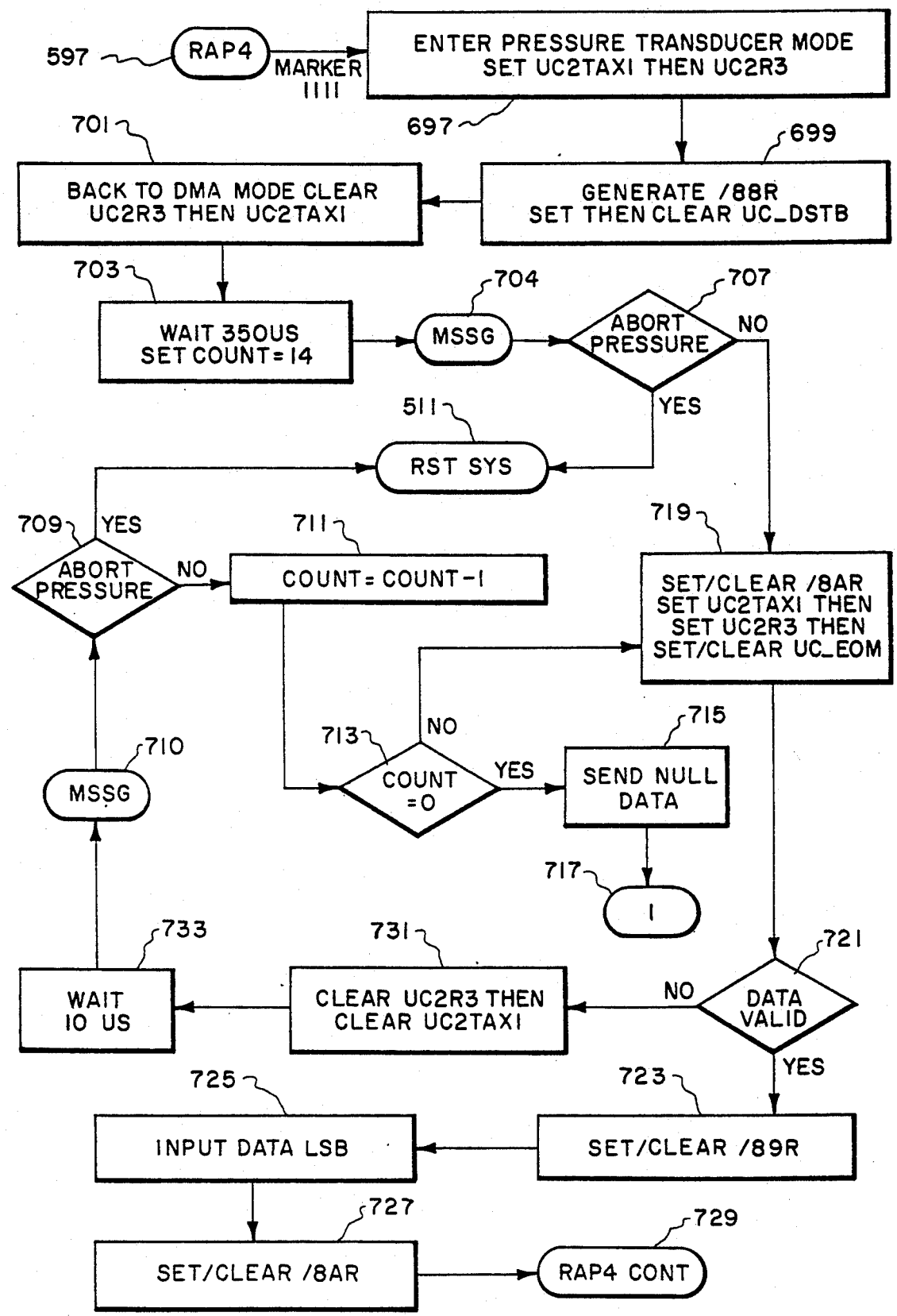
Figure 28T:
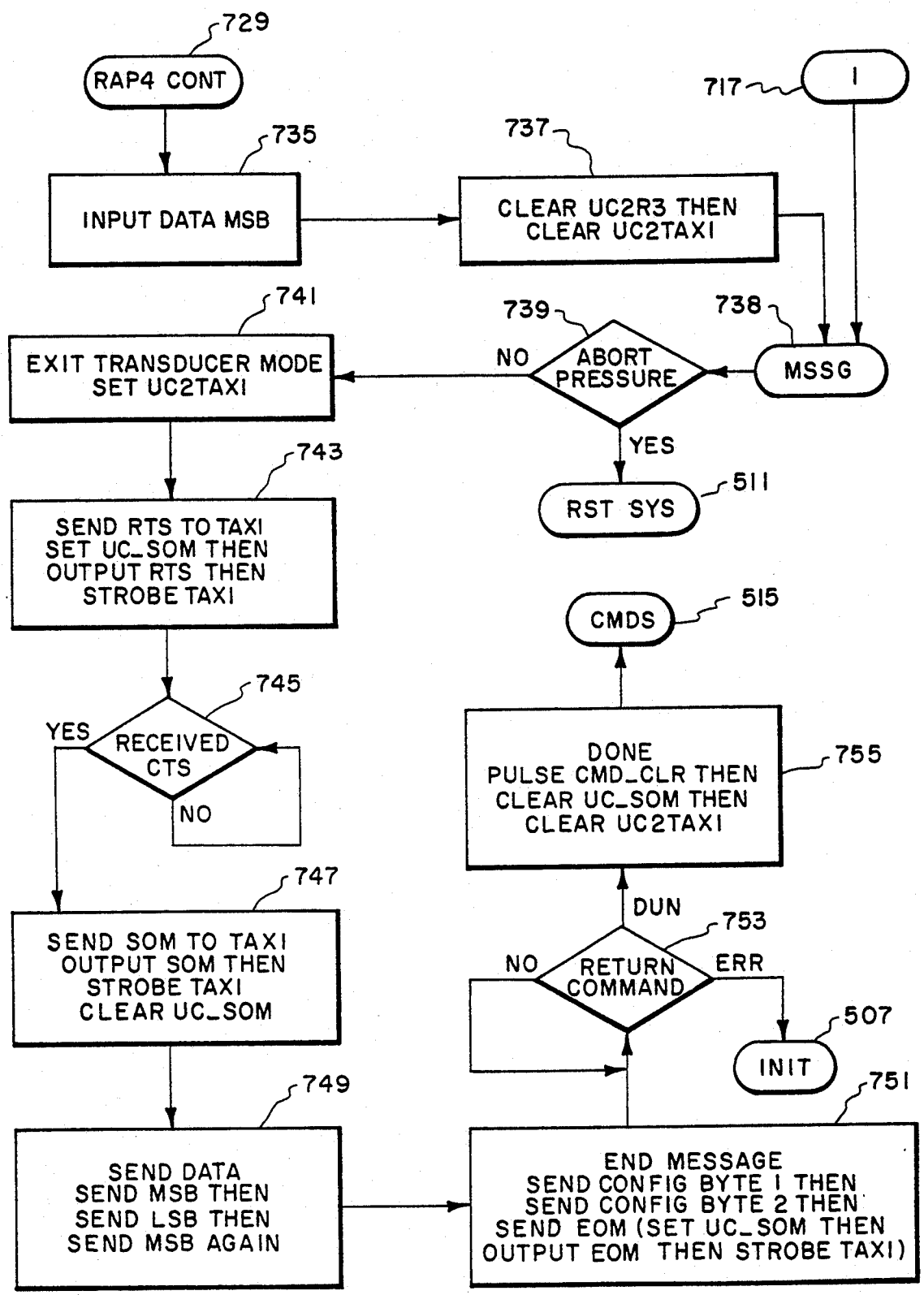
Figure 28U:
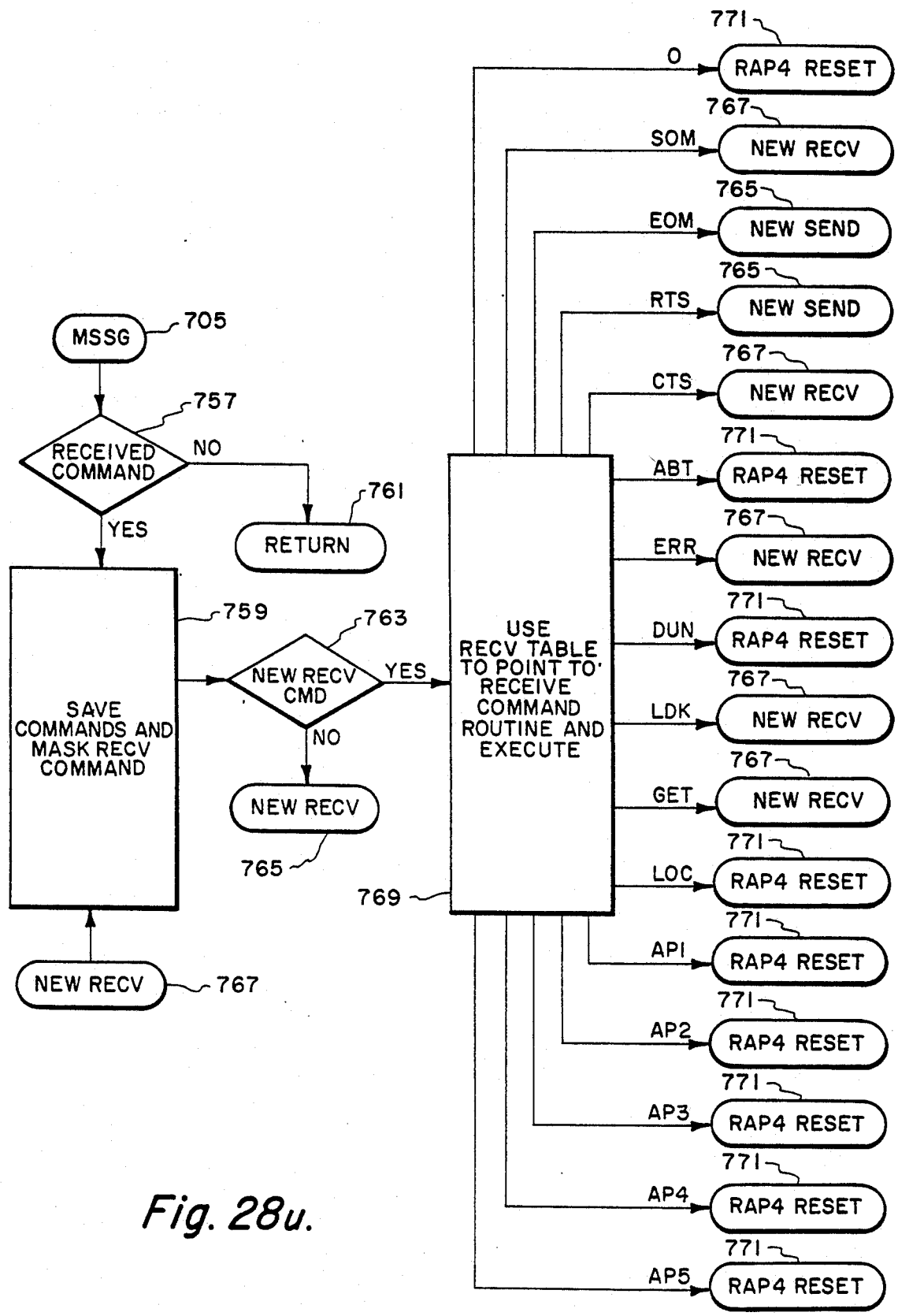
Figure 28V:
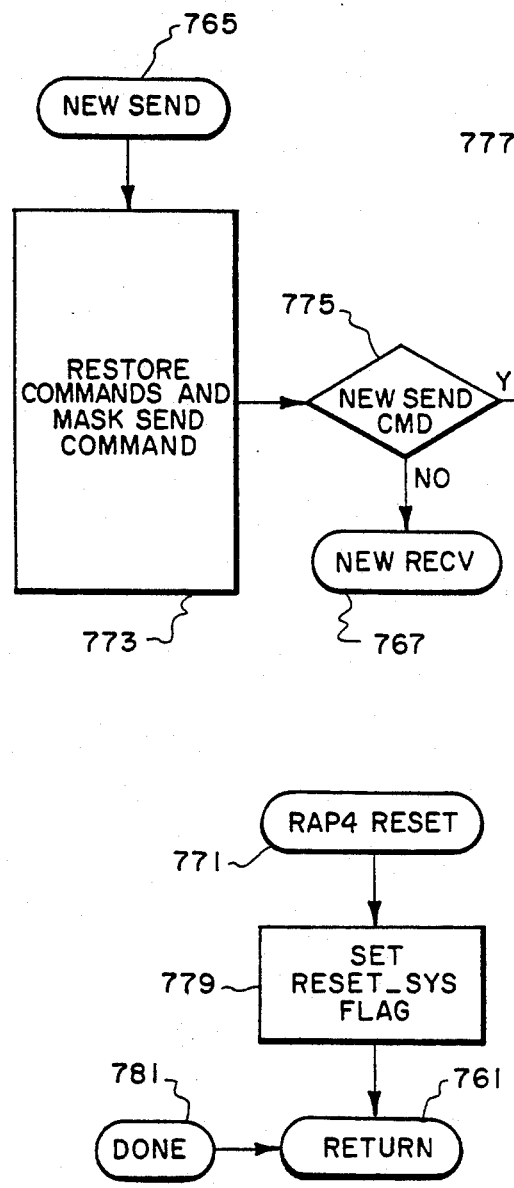
Figure 28W:
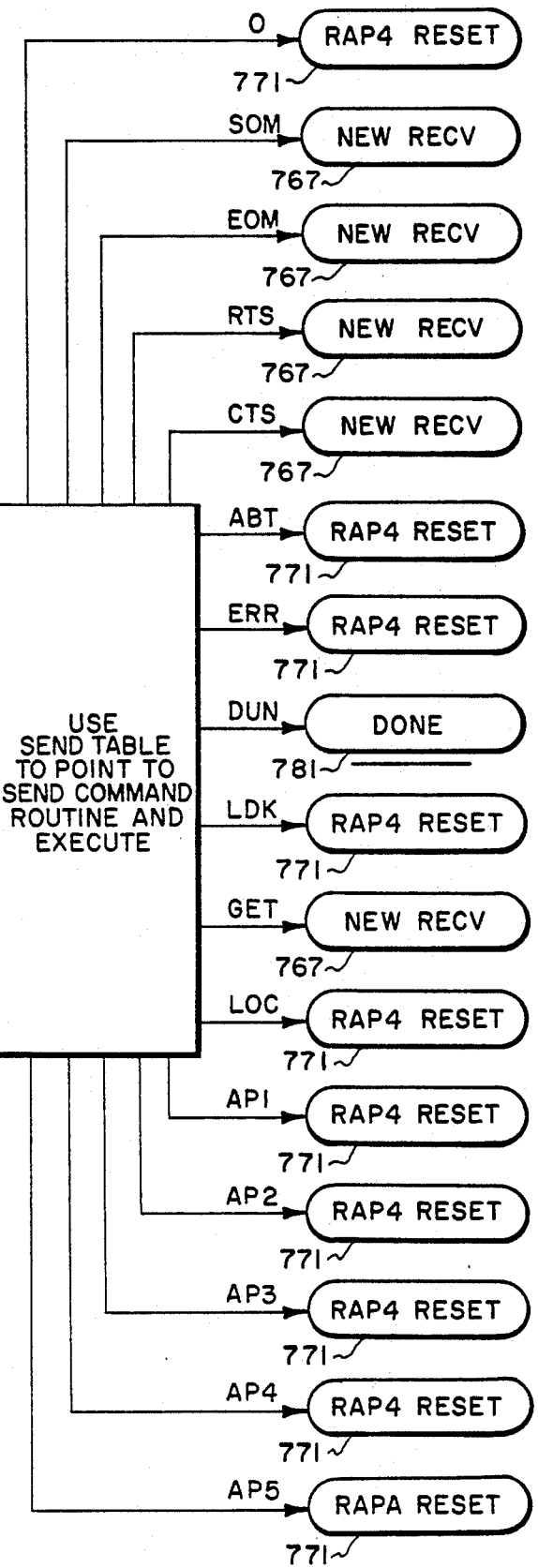

During program step 703 microcontroller 95 waits for a time period of 350 microseconds, sets an internal counter to a count of fourteen and proceeds to the message subroutine of FIGS. 28u and 28w (program step 704). This message subroutine allows microcontroller 95 to monitor message transfers between digital processing unit 45 and encryption unit 53 while waiting for pressure data from digital processing unit 43. The messages being monitored by microcontroller 95 are arranged numerically by hexadecimal value in FIGS. 28u and 28w.

Thus, for example, when microcontroller 95 detects a new receive command (program step 763) and the command is a start of message command, microcontroller 95 will save commands and mask the receive command which is start of message (program step 759). Similarly, when microcontroller 95 detects a new send command (program step 775) and the command is an error command (ERR) having a hexadecimal value of six, the program for microcontroller proceeds to the RAP4 RESET subroutine illustrated in FIG. 28v (program step 771), sets the reset system flag (program step 779) and returns to program step 704. Since the reset system flag is set (program step 779) the program for microcontroller 95 aborts the pressure message transfer (program step 707), proceeds to reset system (program step 511) and resets protocol converter 57 including erasable programmable logic device 89 (program step 513).

When microcontroller 95 detects a new send command (program step 775) and the new send command is a DUN command which is a hexadecimal seven (program step 781), the program within microcontroller 95 returns to the pressure message transfer illustrated in FIG. 24, proceeds through program step 707 to program step 719.

During program step 719, microcontroller 95 generates the first /8AR pulse of FIG. 24c and then proceeds to check the most significant bit of the first data byte from digital processing unit 45 to determine if the first data byte is pressure data (program step 721). If the most significant bit of the first data byte is a logic zero, then microcontroller 95 clears its UC2R3 and UC2TAXI outputs to the logic zero state (program step 731) thereby allowing for normal message transfers between encryption unit 53 and digital processing unit 45 such the message transfers of FIG. 22. The program within microcontroller 95 waits ten microseconds, proceeds to the message subroutine of FIGS. 28u and 28w (program step 710).

When the message subroutine is complete, microcontroller 95 checks the status of reset system flag (program step 709) and if the flag is not set (program step 709) microcontroller 95 decrements the counter set in program step 703 by a count of one (program step 711) until the count equals zero (program step 713) or valid pressure data is detected by microcontroller 95 (program step 721).

If microcontroller 95 detects a logic one in the most significant bit of a data byte, FIG. 24E, from digital processing unit 45 prior to generating fourteen /8AR pulses, FIG. 24C, microcontroller 95 generates the /89R pulse of FIG. 24D (program step 723) which is supplied to digital processing unit 45. Digital processing unit 45 in response to the /89R pulse of FIG. 24D supplies byte two of pressure data, FIG. 24E, to protocol converter 45. Microcontroller 95 then stores this pressure data byte in one of two internal register which are used for pressure data storage (program step 725).

During program step 727 microcontroller 95 generates an /8AR pulse, FIG. 24C, which is supplied to digital processing unit 45. Digital processing unit 45 in response to the /89R supplies the third pressure data byte, FIG. 24E, to protocol converter 57. Microcontroller 95 then stores this pressure data byte in the second of two internal registers which are used for pressure data storage (program step 735). Microcontroller 95 then clears its UC2R3 and UC2TAXI signal outputs to logic zero (program step 737) allowing for normal message transfers such as the message transfers illustrated by FIG. 22 and then proceeds to the message subroutine of FIGS. 28u and 28w (program step 738).

If however microcontroller 95 fails to detect a valid pressure byte from digital processing unit 45 after sending digital processing unit 45 fourteen /8AR pulses, FIG. 24C, microcontroller 95 loads its two pressure data storage registers with logic zeros (program step 715) and then proceeds to the message subroutine of FIGS. 28u and 28w (program step 738).

If the reset system flag is not set (program step 739) then microcontroller 95 exits the transducer mode and sets its UC2TAXI signal output to a logic one (program step 741) causing the UC_UPLNK output of decode circuit 125 to transition to the logic one state. This logic one also enables AND gates 207 and 209. During program step 743 microcontroller 95 generates the request to send command of FIG. 24, sets its UC_SOM signal output to a logic one allowing the request to send command from microcontroller 95 to pass through multiplexer 131 to transmitter 83. A TAXI_STRB pulse, FIG. 5(C), is next provided to transmitter 83 (program step 743), which latches the request to send command into transmitter 83 which then provides the request to send command to encryption unit 53. The TAXI_STRB pulse is generated by microcontroller 95 and then supplied to the UC_DSTB input of microcontroller decode circuit 125, passes through circuit 125 to its UC2T_STB output. This logic one pulse then passes through OR gate 134 and the TAXI_STRB output of erasable programmable logic device 89 to transmitter 83.

When encryption unit 53 supplies a clear to send command, FIG. 24G, to protocol converter 57, microcontroller 95 detects the command (program step 745) and responds with the start of message command of FIG. 24H, followed by a TAXI_STRB pulse, FIG. 5(C). Microcontroller 95 then clears its UC_SOM signal output to the logic zero state which prevents commands (STD4–STD7) provided by microcontroller 95 from passing through multiplexer 131 to encryption unit 53.

During program step 749, microcontroller 95 sends pressure data bytes one, two and three, FIG. 24I, to encryption unit 53 followed by two configuration bytes (bytes four and five of FIG. 24I) and the end of message command of FIG. 24J (program step 751).

When microcontroller 95 detects the DUN command of FIG. 24K provided by encryption unit 53 (program step 753), microcontroller 95 will pulse its CMD_CLR output resetting programmable array logic device 90 and then clear UC_SOM and UC2TAXI signal outputs ending the pressure message transfer of FIG. 24 (program step 755).

From the foregoing, it may readily be seen that the subject invention comprises a new, unique and exceedingly useful interface which may be used to allow for communication between a first device which sends and receives data in a serial format and a second device which sends and receives data in a parallel format. Obviously, many modifications and variations of the present invention are possible in light of the above teachings. It is therefore to be understood that within the scope of the present claims the invention may be practiced otherwise than as specifically described.

What is claimed is:

1. A digital interface unit for controlling data transfers between a first logic device and a second logic device wherein the first logic device transmits and receives data in a serial format and the second logic device transmits and receives data in a parallel format, said digital interface unit comprising:

control means for receiving a first request to send command from said first logic device, said first request to send command initiating a first data transfer from said first logic device to said second logic device;

said control means, responsive to said first request to send command, generating a first request to send control signal, said control means providing said first request to send control signal to said second logic device and then receiving a first clear to send control signal from said second logic device;

said control means, responsive to said first clear to send control signal, generating a first clear to send command, said control means providing said first clear to send command to said first logic device and then receiving a first start of message command from said first logic device;

said control means, responsive to said first start of message command, generating a reset signal;

storage means for receiving said reset signal, said reset signal clearing said storage means;

receiver means for receiving a first plurality of serial data bytes from said first logic device, for converting said first plurality of serial data bytes to a first plurality of parallel data bytes and for providing a data strobe signal;

said storage means receiving said first plurality of parallel data bytes from said receiver means after said reset signal clears said storage means, said storage means, responsive to said data strobe signal, storing said first plurality of parallel data bytes;

said control means receiving a first end of message command from said first logic device after said first logic device transmits a last serial data byte of said first plurality of serial data bytes to said digital interface unit;

said control means, responsive to said first end of message command, generating a done command, said control means providing said done command to said first logic device, said done command when provided to said first logic device acknowledging transmission of said first plurality of serial data bytes from said first logic device to said digital interface unit;

said control means, receiving a first data out request control signal from said second logic device;

said control means, responsive to said first end of message command, said first clear to send control signal and said first data out request control signal, generating a read signal;

said control means providing said read signal to said storage means, said read signal effecting a retrieving of said first plurality of parallel data from said storage means and a transmitting of said first plurality of parallel data from said storage means to said second logic device;

said control means, responsive to said first end of message command, said first clear to send control signal and said first data out request control signal, generating a data in request control signal and a write data in control signal, said control means providing said data in request control signal and said write data in control signal to said second logic device, said data in request control signal and said write data in control signal effecting a writing of said first plurality of parallel data bytes in said second logic device;

said storage means providing a data empty signal after a last parallel data byte of said first plurality of parallel data bytes is read from said storage means, said control means receiving said data empty signal from storage means, said control means, responsive to said data empty signal and said end of message command, generating an end of message control signal and providing said end of message control signal to said second logic device, said end of message control signal completing said first data transfer from said first logic device to said second logic device;

said control means receiving a second request to send control signal from said second logic device, said second request to send control signal initiating a second data transfer from said second logic device to said first logic device;

said control means, responsive to a second request to send control signal from said second logic device, generating a second request to send command;

said control means providing said second request to send command to said first logic device and then receiving a second clear to send command from said first logic device;

said control means, responsive to said second clear to send command, generating a second clear to send control signal, said control means providing said second clear to send control signal to said second logic device and then receiving a write data out control signal from said second logic device;

said control means, responsive to said write data out control signal, generating a second start of message command, said control means providing said second start of message command to said first logic device;

transmitter means for receiving a second plurality of parallel data bytes from said second logic device;

said control means, responsive to said write data out control signal, generating a transmitter strobe signal, said control means providing said transmitter strobe signal to said transmitter means;

said transmitter means, responsive to said transmitter strobe signal, latching said second plurality of parallel data bytes in said transmitter means, said transmitter means converting said second plurality of parallel data bytes to a second plurality of serial data;

said control means transmitting said second plurality of serial data bytes to said first logic device after said control means provides said second start of message command to said first logic device;

said control means, responsive to said write data control signal, generating an acknowledge control signal, said control means providing said acknowledge control signal to said second logic device, said acknowledge control signal indicating to said second logic device that said digital interface unit received each of said second plurality of parallel data bytes from said second logic device;

said control means generating a second end of message command after a last serial data byte of said plurality of serial data bytes is transmitted from said digital interface unit to said first logic device;

said control means providing said second end of message command to said first logic device, said second end of message command completing said second data transfer from said second logic device to said first logic device.

2. The digital interface unit of claim 1 wherein said storage means comprises a dual port memory, said dual port memory storing said first plurality of parallel data bytes from said receiver means and then retrieving said stored first plurality of parallel data bytes during said first data transfer, said dual port memory storing and retrieving said first plurality of parallel data bytes in a first byte in first byte out format.

3. The digital interface unit of claim 1 wherein said control means comprises a programmed logic device.

4. The digital interface unit of claim 1 wherein said control means comprises:

decoding means for receiving said first request to send command, said first start of message command and said first end of message command from said first logic device during said first data transfer and said second clear to send command from said during said second data transfer;

said decoding means decoding said first request to said command, said first start of message command, said first end of message command and said second clear to send command and respectively providing a request to send control bit, a start of message control bit, an end of message control bit and a clear to send control bit;

control signal generating means coupled to said decoding means, for receiving said request to send control bit, said start of message control bit, said end of message control bit and said clear to send control bit from said decoding means, for receiving said first clear to send control signal, said first data out request control signal, said second request to send control signal, said second clear to send control signal and said write data out control signal from said second logic device and for receiving said data empty signal from said storage means;

said control signal generating means, responsive to said request to send control bit, generating said first request to send control signal;

said control signal generating means, responsive to said start of message control bit, generating said reset signal;

said control signal generating means, responsive to said end of message control bit, said first clear to send control signal, and said first data out request control signal generating said read signal, said data in request control signal and said write data in control signal;

said control signal generating means, responsive to said end of message control bit and said data empty signal, generating said end of message control signal;

said control signal generating means, responsive to said clear to send control bit, generating said second clear to send control signal;

said control signal generating means, responsive to said write data out control signal, generating said acknowledge control signal;

said control signal generating means inverting said write data out control signal providing an inverted write data out control signal; and command generating means, coupled to said control signal generating means and said decoding means, for receiving said first clear to send control signal and said second request to send control signal from said first logic device, for receiving said end of message control bit from said decoding means, for receiving said inverted write data out control signal from said control signal generating means;

said command generating means, responsive to said first clear to send control signal, generating said first clear to send command;

said command generating means, responsive to said end of message control bit, generating said done command;

said command generating means, responsive to said second request to send control signal, generating a second request to send command;

said command generating means, responsive to said inverted write data out control signal, generating said second start of message command and said transmitter strobe signal;

said command generating means generating said second end of message command serial data byte of after said last serial data byte of said plurality of serial data bytes is transmitted from said digital interface unit to said first logic device.

5. A digital interface unit for controlling data transfers between a first logic device and a second logic device wherein the first logic device transmits and receives data in a serial format and the second logic device transmits ana receives data in a parallel format, said digital interface unit comprising:

control means for receiving a first request to send command from said first logic device, said first request to send command initiating a first data transfer from said first logic device to said second logic device;

said control means, responsive to said first request to send command, generating a first request to send control signal, said control means providing said first request to send control signal to said second logic device and then receiving a first clear to send control signal from said second logic device;

said control means, responsive to said first clear to send control signal, generating a first clear to send command, said control means providing said first clear to send command to said first logic device and then receiving a first start of message command from said first logic device;

said control means, responsive to said first start of message command, generating a first reset signal;

storage means for receiving said first reset signal, said first reset signal clearing said storage means;

receiver means for receiving a first plurality of serial data bytes from said first logic device, for converting said first plurality of serial data bytes to a first plurality of parallel data bytes and for providing a data strobe signal;

said storage means receiving said first plurality of parallel data bytes from said receiver means after said first reset signal clears said storage means, said storage means, responsive to said data strobe signal, storing said first plurality of parallel data bytes;

said control means receiving a first end of message command from said first logic device after said first logic device transmits a last serial data byte of said first plurality of serial data bytes to said digital interface unit;

said control means, responsive to said first end of message command, generating a done command, said control means providing said done command to said first logic device, said done command when provided to said first logic device acknowledging transmission of said first plurality of serial data bytes from said first logic device to said digital interface unit;

said control means, receiving a first data out request control signal from said second logic device;

said control means, responsive to said first end of message command, said first clear to send control signal and said first data out request control signal, generating a read signal;

said control means providing said read signal to said storage means, said read signal effecting a retrieving of said first plurality of parallel data from said storage means and a transmitting of said first plurality of parallel data from said storage means to said second logic device;

said control means, responsive to said first end of message command, said first clear to send control signal and said first data out request control signal, generating a data in request control signal and a write data in control signal, said control means providing said data in request control signal and said write data in control signal to said second logic device, said data in request control signal and said write data in control signal effecting a writing of said first plurality of parallel data bytes in said second logic device;

said storage means providing a data empty signal after a last parallel data byte of said first plurality of parallel data bytes is read from said storage means;

said control means receiving said data empty signal from storage means, said control means, responsive to said data empty signal and said end of message command, generating an end of message control signal and providing said end of message control signal to said second logic device, said end of message control signal completing said first data transfer from said first logic device to said second logic device;

said control means receiving a second request to send control signal from said second logic device, said second request to send control signal initiating a second data transfer from said second logic device to said first logic device;

said control means, responsive to a second request to send control signal from said second logic device, generating a second request to send command;

said control means providing said second request to send command to said first logic device and then receiving a second clear to send command from said first logic device;

said control means, responsive to said second clear to send command, generating a second clear to send control signal, said control means providing said second clear to send control signal to said second logic device and then receiving a write data out control signal from said second logic device;

said control means, responsive to said write data out control signal, generating a second start of message command, said control means providing said second start of message command to said first logic device;

said control means receiving a second plurality of parallel data bytes from said second logic device and then passing said second plurality of parallel data bytes through said control means;

transmitter means for receiving said second plurality of parallel data bytes from said control means;

said control means, responsive to said write data out control signal, generating a transmitter strobe signal, said control means providing said transmitter strobe signal to said transmitter means, said transmitter means, responsive to said transmitter strobe signal, latching said second plurality of parallel data bytes in said transmitter means, said transmitter means converting said second plurality of parallel data bytes to a second plurality of serial data;

said control means transmitting said second plurality of serial data bytes to said first logic device after said control means provides said second start of message command to said first logic device;

said control means, responsive to said write data control signal, generating an acknowledge control signal, said control means providing said acknowledge control signal to said second logic device, said acknowledge control signal indicating to said second logic device that said digital interface unit received each of said second plurality of parallel data bytes from said second logic device;

said control means generating a second end of message command after a last serial data byte of said plurality of serial data bytes is transmitted from said digital interface unit to said first logic device;

said control means providing said second end of message command to said first logic device, said second end of message command completing said second data transfer from said second logic device to said first logic device; and detecting means for monitoring a first command sequence during said first data transfer and a second command sequence during said second data transfer, said first command sequence including said first request to send command, said first clear to send command, said first start of message command, said first end of message command and said done command, said second command sequence including said second request to send command, said second clear to send command, said second start of message command, said second end of message command;

said detecting means having an internal timer, said detecting means setting said internal timer to a predetermined time period upon detecting said first request to send command of said first command sequence, said detecting means generating a system reset signal upon failing to detect said done command of said first command sequence within said predetermined time period, said detecting means setting said internal timer to a predetermined time period upon detecting said second request to send command of said second command sequence, said detecting means generating said system reset signal upon failing to detect said second end of message command of said second command sequence within said predetermined time period;

said control means receiving said system reset signal, said system reset signal resetting said control means allowing said control means to control another of said first and second data transfers between said first logic and said second logic device.

6. The digital interface unit of claim 5 wherein said storage means comprises a dual port memory, said dual port memory storing said first plurality of parallel data bytes from said receiver means and then retrieving said stored first plurality of parallel data bytes during said first data transfer, said dual port memory storing and retrieving said first plurality of parallel data bytes in a first byte in first byte out format.

7. The digital interface unit of claim 5 wherein said control means comprises a programmed logic device.

8. The digital interface unit of claim 5 wherein said control means comprises:

decoding means for receiving said first request to send command, said first start of message command and said first end of message command from said first logic device during said first data transfer and said second clear to send command from said first logic device during said second data transfer;

said decoding means decoding said first request to send command, said first start of message command, said first end of message command and said second clear to send command and respectively providing a request to send control bit, a start of message control bit, an end of message control bit and a clear to send control bit;

control signal generating means coupled to said decoding means, for receiving said request to send control bit, said start of message control bit, said end of message control bit and said clear to send control bit from said decoding means, for receiving said first clear to send control signal, said first data out request control signal, said second request to send control signal, said second clear to send control signal and said write data out control signal from said second logic device and for receiving said data empty signal from said storage means;

said control signal generating means, responsive to said request to send control bit, generating said first request to send control signal;

said control signal generating means, responsive to said start of message control bit, generating said reset signal;

said control signal generating means, responsive to said end of message control bit, said first clear to send control signal, and said first data out request control signal generating said read signal, said data in request control signal and said write data in control signal;

said control signal generating means, responsive to said end of message control bit and said data empty signal, generating said end of message control signal;

said control signal generating means, responsive to said clear to send control bit, generating said second clear to send control signal;

said control signal generating means, responsive to said write data out control signal, generating said acknowledge control signal;

said control signal generating means inverting said write data out control signal providing an inverted write data out control signal; and command generating means, coupled to said control signal generating means and said decoding means, for receiving said first clear to send control signal and said second request to send control signal from said first logic device, for receiving said end of message control bit from said decoding means, for receiving said inverted write data out control signal from said control signal generating means;

said command generating means, responsive to said first clear to send control signal, generating said first clear to send command;

said command generating means, responsive to said end of message control bit, generating said done command;

said command generating means, responsive to said second request to send control signal, generating a second request to send command;

said command generating means, responsive to said inverted write data out control signal, generating said second start of message command and said transmitter strobe signal;

said command generating means generating said second end of message command after said last serial data byte of said plurality of serial data bytes is transmitted from said digital interface unit to said first logic device.

9. The digital interface of claim 8 further comprising buffer means coupled to said control signal generating means for receiving said second plurality of parallel data bytes from said second logic device and said inverted write data out control signal from said control signal generating means, said buffer means, responsive to said inverted write data out control signal, passing said second plurality of parallel data bytes through said buffer means to said transmitter means.

10. The digital interface of claim 6 wherein said detecting means comprises a microprocessor.

* * * * *